United States Patent [19]

Lamping et al.

[11] Patent Number: 5,590,250
[45] Date of Patent: Dec. 31, 1996

[54] LAYOUT OF NODE-LINK STRUCTURES IN SPACE WITH NEGATIVE CURVATURE

[75] Inventors: John O. Lamping, Los Altos; Ramana B. Rao, San Francisco, both of Calif.

[73] Assignee: Xerox Corporation, Stamford, Conn.

[21] Appl. No.: 306,043

[22] Filed: Sep. 14, 1994

[51] Int. Cl.⁶ .................................................. G06T 1/40
[52] U.S. Cl. ......................................... 395/127; 395/326
[58] Field of Search .................................. 395/155, 157, 395/156, 161, 127, 164

[56] References Cited

U.S. PATENT DOCUMENTS

| | | | |
|---|---|---|---|
| 4,528,643 | 7/1985 | Freeny, Jr. | 364/900 |
| 4,710,763 | 12/1987 | Franke et al. | 340/723 |
| 5,295,243 | 3/1994 | Robertson et al. | 395/160 |
| 5,297,241 | 3/1994 | Hirr, Jr. et al. | 395/127 |
| 5,333,254 | 7/1994 | Robertson | 395/155 |
| 5,337,404 | 8/1994 | Baudelaire et al. | 395/127 X |
| 5,339,390 | 8/1994 | Robertson et al. | 395/157 |
| 5,428,744 | 6/1995 | Webb et al. | 395/127 X |
| 5,515,488 | 5/1996 | Hoppe et al. | 395/140 |

FOREIGN PATENT DOCUMENTS

| | | |
|---|---|---|
| 260144A2 | 3/1988 | European Pat. Off. . |
| 2139846 | 11/1984 | United Kingdom . |
| 9209967 | 6/1992 | WIPO ............ G06F 15/72 |

OTHER PUBLICATIONS

Robertson, G. G., Mackinlay, J. D., Card, S. K., "Cone Trees: Animated 3D Visualizations of Hierarchical Information," Reaching Thru Technology—CHI '91 Conference Proceedings, New Orleans, Louisiana, Apr. 27–May 2, 1991, pp. 189–194.

Austin, J. D., Castellanos, J., Darnell, E., Estrada, M., "An Empirical Exploration of the Poincaré Model for Hyperbolic Geometry," Mathematics and Computer Education, Winter 1993, pp. 51–68.

Johnson, B., "TreeViz: Treemap Visualization of Hierarchically Structured Information," Striking a Balance—CHI'92 Conference Proceedings, Monterey, California, May 3–7, 1992, pp. 369–370.

Hirtle, S. C., Ghiselli–Crippa, T., "Visualization Tools for Clustering, Trees and Ordered Trees," *Advances in Classification Research*, vol. III, 1992, pp. 37–46.

Matsuura, T., Taniguchi, K., Masuda, S., Nakamura, T., "A Graph Editor for Large Trees with Browsing and Zooming Capabilities," *Systems and Computers in Japan*, 1993, pp. 35–46.

(List continued on next page.)

*Primary Examiner*—Heather R. Herndon
*Assistant Examiner*—Cliff N. Vo

[57] ABSTRACT

Layout data indicate positions in a negatively curved layout space for nodes in a hierarchical branch of a node-link structure. The layout data indicate a parent position for parent nodes and, for children that share a parent node, child positions approximately along a circle in the layout space with the parent position approximately at the circle's center. Adjacent child positions are separated by approximately a base spacing. The radii of circles within the branch together approximate a function that increases slowly with number of child nodes such that the radii and spacings along circles are all approximately uniform within the branch. The layout data can be obtained from data defining the node-link structure. The layout data can be used to perform mappings, each obtaining positions for a subset of the nodes. The layout data can be used to present a first representation of the node-link structure on a display. In response to a user signal indicating a change from a first display position near a first feature to a second display position, a second representation can be presented that is perceptible as a changed continuation of the first. The second representation includes, near the second display position, a second feature representing the same part of the node-link structure as the first feature. The second representation can be obtained by a transformation of the layout space, which can be a discrete approximation of a hyperbolic plane.

40 Claims, 16 Drawing Sheets

OTHER PUBLICATIONS

Munzner, T., and Burchard, P., "Visualizing the Structure of the World Wide Web in 3D Hyperbolic Space," hardcopied from Web site URL http://www.geom.umn.edu:80/docs/research/webviz/and following sequence of nodes, dated Nov. 21, 1995, also published in *Proceedings of VRML '95*, (San Diego, CA Dec. 14–15 1995), special issue of *Computer Graphics*, ACM SIGGRAPH, New York, 1995, pp. 33–38.

Munzner, T., Chi, E. H., and Burchard, P., "Visualization through the World Wide Web with Geomview, Cyberview, W3Kit, and WebOOGL," a single page hardcopied from the Web site designated by the URL http://www.ncsa.uiuc.edu/SDG/IT94/Proceedings/VR/munzner/munzner–abstract.html.

Hardcopy of changes file from the Web site designated by the URL http://www.geom.umn.edu/software/download/geomview.html, bearing date Oct. 21, 1994.

"Visual Recall—Sophisticated document management and visualization technology for NetWare workgroups," Xerox Corporation, 1994.

Vizard, M., "Document manager taps data visualizer." PC Week, Apr. 18, 1994, pp. 63, 66.

"The Latest Word—XSoft brings document management to PCs," The Seybold Report on Desktop Publishing, vol. 8, No. 8, Apr. 4, 1994, pp. 29 and 30.

Bertin, J., Semiology of Graphics—Diagrams Networks Maps, Berg, W. J., Trans., Madison, Wis.: U. of Wisconsin press, 1983, pp. 269–283.

Levy, S., "Automatic Generation of Hyperbolic Tilings," in Emmer, M., Ed., *The Visual Mind: Art and Mathematics*, Cambridge, Mass.: MIT Press, 1993, pp. 165–170.

Rigby, J. F., "Compound Tilings and Perfect Colourings," in Emmer, M., Ed., *The Visual Mind: Art and Mathematics*, Cambridge, Mass.: MIT Press, 1993, pp. 177–186.

Farrand, W. A., "Information Display in Interactive Design," Ph.D. Thesis, Department of Engineering, University of California Los Angeles, 1973.

Leung, Y. K., "A Review and Taxonomy of Distortion–Oriented Presentation Techniques," *ACM Transactions on Computer–Human Interactions*, vol. 1, No. 2, Jun. 1994, pp. 126–160.

Koike, H., and Yoshihara, H., "Fractal Approaches for Visualizing Huge Hierarchies," Proceedings of 1993 IEEE/CS Symposium on Visual Languages, Aug. 24–27, 1993, IEEE, 1993, pp. 55–60.

Sarkar, M., and Brown, M. H., "Graphical Fisheye Views of Graphs," Proceedings of ACM CHI '92 Conference on Human Factors in Computing Systems, 1992, pp. 83–91.

Beier, T., and Neely, S., "Feature–Based Image Metamorphosis," SIGGRAPH '92, Chicago, *Computer Graphics Proceedings*, vol. 26, No. 2, Jul. 1992, pp. 35–42.

Sederberg, T. W., and Parry, S. R., "Free–Form Deformation of Solid Geometric Models," SIGGRAPH '86, Dallas, *Computer Graphics Proceedings*, vol. 20, No. 4, Aug. 1986, pp. 151–160.

Wolberg, G., *Digital Image Warping*, IEEE Computer Society Press, Los Alamitos, California, 1990, pp. 1–10, 222–240, and 301–314.

Fairchild, K. M., Poltrock, S. E., and Furnas, G. W., "SemNet: Three–Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233.

Austin, J. D., Castellanos, J., Darnell, E., and Estrada, M., "An Empirical Exploration of the Poincaré Model for Hyperbolic Geometry," *Computer Graphics and Mathmatics Conference*, 1991, Mathmatics and Computer Education Journal, Winter 1993, vol. 27, No. 1, pp. 51–68.

Turo, D., and Johnson, B., "Improving the Visualization of Hierarchies with Treemaps: Design Issues and Experimentation," *Proceedings of Visualization* '92, IEEE, pp. 124–131.

Ahlfors, L. V., *Complex Analysis*, McGraw–Hill, 1966, pp. 76–89.

Phillips, M., and Gunn, C., "Visualizing Hyperbolic Space: Unusual Uses of 4×4 Matrices," *Symposium Proceedings Interactive 3D Graphics*, ACM, 1992, pp. 209–214.

LAYOUT OF NODE-LINK STRUCTURES IN SPACE WITH NEGATIVE CURVATURE

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to layout of node-link structures.

Fairchild, K. M., Poltrock, S. E., and Furnas, G. W., "SemNet: Three-Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233, describe SemNet, a three-dimensional graphical interface. SemNet presents views that allow users to examine local detail while maintaining a global representation of the rest of a knowledge base. SeroNet also provides semantic navigation techniques such as relative movement, absolute movement, and teleportation.

As shown and described in relation to FIG. 1-1, SemNet represents a knowledge base as a directed graph in a three-dimensional space, with elements of knowledge represented as labeled rectangles connected by lines or arcs. Page 207 notes the problem of assigning positions to knowledge elements so that the organization or structure of the knowledge base is maximally apparent to the user, and indicates that, while a general solution probably does not exist, a knowledge base may contain information that can be used to compute effective positions or a user may have information allowing the user to assign effective positions. Section 3.1 describes how mapping functions can map properties of elements to positions in three-dimensional space; section 3.2, on pages 209–213, describes proximity based functions, including multidimensional scaling and heuristics, that move related knowledge elements close together and unrelated knowledge elements far apart, and section 3.3, on pages 213–214, describes personalized positioning in which a user moves knowledge elements to positions, which can be combined with other positioning techniques.

Pages 214–222 describe strategies for large knowledge bases. Section 4.1 describes fisheye viewing strategies, including fisheye views from clusters, from three-dimensional point perspective, and from sampling density. Section 4.2 describes strategies for displaying arcs. Pages 223–228 describe navigation and browsing, including recognizing locations and controlling location, such as by relative movement, absolute movement, teleportation, hyperspace movement, and moving the space.

SUMMARY OF THE INVENTION

One aspect of the invention alleviates a basic problem in layout of node-link structures. The information in a node-link structure tends to grow exponentially as one traverses the structure. For example, if the node-link structure is a tree or other hierarchical structure with a root node and levels of nodes below the root, the number of nodes, and therefore the amount of information in the tree, tends to increase exponentially as one goes from the root through the levels below the root. For some applications, such as displaying a representation of a node-link structure, it is useful to lay out the node-link structure in a space so that each node has a unique position spaced well apart from other nodes. Exponential growth makes it difficult to lay out a node-link structure in a space.

Some conventional techniques lay out a node-link structure in a two-, three-, or other n-dimensional Euclidean space. For example, the technique of Fairchild et al. described above, positions nodes in a three-dimensional space, in part because arcs would intersect if nodes were positioned in a plane. Robertson et al., U.S. Pat. No. 5,295,243, describe techniques in which a hierarchical structure with rotating substructures is positioned in three-dimensional space.

Layout in Euclidean space can, for example, begin at a root node and traverse the structure, positioning each node in space. A layout in Euclidean space tends to include large variations in density because of exponential growth. Nodes in branches tend to be much denser than nodes nearer the root. Large variations in density cause problems in using the layout because a user of a browser based on such a layout has difficulty understanding relationships between nodes in regions of different densities.

The techniques of the invention are based on the discovery that a node-link structure with exponentially growing branches can be laid out without large variations in density in a space with negative curvature. A space has negative curvature if parallel lines diverge. Examples include n-dimensional hyperbolic spaces, with a two-dimensional hyperbolic space being referred to as a "hyperbolic plane." In a hyperbolic plane, for example, a circle's area is proportional to an exponential function of its radius, making it easy to obtain a uniform layout for a node-link structure that has exponentially growing branches. A layout space with negative curvature is referred to as a "discrete approximation" to a hyperbolic plane or other continuous space with negative curvature if positions in the layout space are only specified with limited precision, so that every position in the layout space maps to a position in the hyperbolic plane or other continuous space with negative curvature but not vice versa.

Each of the techniques uses layout data indicating positions of parts of a node-link structure in a layout space with negative curvature. The layout data can, for example, include coordinates indicating positions in the layout space. The layout data indicate positions in the layout space for each of a set of nodes that form a branch. For each of a set of parent nodes, lower level nodes that share the parent node lie approximately along a circle in the space or along an arc of the circle, while the parent node is positioned approximately at the center of the circle. As used herein, the term "along a circle" includes an arrangement along an arc of the circle. The positions of adjacent lower level nodes along each circle are separated by approximately a base spacing. The radii of the circles for all the parent nodes in the set together approximate a radial spacing function that increases slowly with number of lower level nodes such that the radii and the spacings between adjacent lower level nodes along circles are all approximately uniform within the branch.

An approximately uniform layout of a branch can be very useful. For example, in displaying representations of a node-link structure that includes the branch, further layout is unnecessary-representations can be obtained by performing rigid transformations on the layout space to obtain transformed position data and by mapping from the transformed positions to a planar Euclidean region that can be presented on a display, such as a circular, disk-shaped region or any other appropriately shaped region.

The layout space can be a discrete approximation of a hyperbolic plane, for example, and the layout data can indicate, for each node, two coordinates that together indicate a position in the hyperbolic plane. The node-link structure can be an acyclic graph such as a tree.

One aspect of the invention relates to the display of representations of a node-link structure. In one technique, the layout data can be used to present a first representation of the node-link structure on a display. In response to a signal from a user indicating a change from a first display position to a second display position, the technique then presents a second representation that is perceptible as a moved continuation of the first representation. The first representation includes a first feature near the first display position, representing a first part of the node-link structure, and the second representation includes a second feature representing the first part, but near the second display position.

The first representation can be presented by using the layout data to obtain mapped data. The mapped data can indicate positions in a region of the display for a subset of the nodes in which the first representation is presented, and the first representation includes a node feature for each node in the subset. If a node maps to a position that is within a minimum spacing from the display region's perimeter and there is no chance the node has descendants further from the perimeter than the minimum spacing, the node and its descendants can be excluded from the subset for which node features are presented.

The mapped data can be obtained by mapping to a circular display region such as a planar unit disk, for example. Either of two canonical mappings can be performed from the hyperbolic plane to a planar unit disk—the projective mapping, or Klein model, in which lines in the hyperbolic plane are taken to lines in the unit disk but angles are distorted, and the conformal mapping, or Poincaré model, in which angles are preserved but lines in the hyperbolic plane are distorted into arcs on the unit disk. If the Poincaré model is also used as the representation of points in the hyperbolic plane, then the Poincaré mapping to the unit disk is the identity operation on the representation, so that a pair of values indicating a position in the hyperbolic plane can be used directly as coordinates along orthogonal axes in the unit disk.

The second representation can be presented by obtaining transformation data indicating a rigid transformation of the layout space and then using the transformation data to obtain transformed position data. The rigid transformation would move a first layout position that maps to the first display position to a second layout position that maps to the second display position. Therefore, the transformed position data indicate a position for the first part of the node-link structure such that a feature representing the first part would be presented near the second display position.

A rigid transformation can be found that preserves or establishes the orientation of certain features after mapping. In one variation, the rigid transformation preserves the orientation of children of some node with respect to that node; the parent node can, for example, be the root node. In another, the rigid transformation establishes parent-child orientation in a region of greater spacings in the representations.

To preserve a perception of continuity, the technique can also present intermediate representations. The intermediate representations can include intermediate first part features which, together with the second feature in the second representation, are all perceptible as moved continuations of the first feature in the first representation.

Another aspect of the invention provides techniques for obtaining layout data as described above. One technique uses node-link data defining a node-link structure to obtain layout data as described above. The technique then uses the layout data to perform two or more different mappings. The mapped data obtained by each mapping indicate positions for a subset of the set of nodes. The positions can, for example, be display positions or positions in another appropriate space.

Layout data can be obtained by first obtaining, for a parent node, a parent position and a parent wedge in the layout space; the parent wedge has a vertex at the parent position and is a part of the layout space between two rays extending from the vertex. Then parent node data indicating the parent position and the parent wedge can be used to obtain child node data for each of the child nodes of the parent node. A child node's data can indicate a child position approximately along an arc within the parent wedge, and a child wedge with a vertex at the child position and extending between rays from the vertex. Each child wedge is contained inside the parent wedge and does not overlap any other child wedge. While the children of a root node can be spread over any arc up to 360°, the children of parent nodes below the root node must be spread over arcs smaller than 360°.

In one implementation, the rays of each child wedge diverge from the vertex at approximately the same angle as the rays of the parent wedge; in this case, adjacent child positions can be equally separated along the arc by the base spacing. In another, the rays meet at angles that depend on how large an angle the descendants of each child node would occupy were the descendant nodes of all children uniformly spaced.

Yet another aspect of the invention is based on the recognition of a problem that arises in implementing the technique of obtaining transformation data as described above when the layout data indicate positions in a discrete approximation of a hyperbolic plane. If the transformation is a pure translation, a problem with rotation arises. Translation performed with respect to a line in a hyperbolic plane rotates points not on the line with respect to a point on the line, which can be counterintuitive. Furthermore, a series of translations that form a closed loop, each preserving orientation along its line of translation, also causes a counterintuitive rotation.

This aspect of the invention provides techniques for alleviating the rotation problem. Each technique provides a transformation that includes a rotation component. One technique rotates so that children nodes in a region of greater spacings are presented in a canonical orientation, such as always to the right of their parent node. Another technique rotates to preserve orientation of a root node of the node-link structure.

The above techniques can be implemented in a machine with memory storing program data indicating instructions the machine's processor executes. The above techniques can also be implemented in an article of manufacture for use in a machine. The article of manufacture can include a storage medium and data stored by the storage medium. The stored data can include data units positioned on the storage medium so that a storage medium access device can access the data units and provide the data units to the machine's processor in a sequence. The sequence of data units indicates instructions the processor executes. The above techniques can also be implemented in a method that operates a first machine to transfer instruction data indicating such instructions over a network to a second machine with a processor that executes the instructions.

For example, a machine's processor can use layout data indicating positions in a layout space with negative curvature as described above to provide first representation data to cause a display to present a first representation of a node-link structure. The processor can receive user signal data indicating a change from a first display position near a first feature in the first representation to a second display position, where the first feature represents a first part of the node-link structure. In response, the processor can automatically present a second representation in which a second part feature near the second display position represents the first part. The second representation can be perceptible as a moved continuation of the first.

A machine's processor can also use node-link data defining a node-link structure to obtain layout data indicating positions in a layout space with negative curvature as described above. The processor can use the layout data to perform two or more different mappings that obtain mapped data, with the mapped data for each mapping indicating positions for a subset of the nodes in a region of the display.

The techniques described above are advantageous because an exponentially growing node-link structure can be laid out uniformly in a space with negative curvature. Once it is laid out in a hyperbolic plane, for example, there is no need to lay it out again-the same layout can be transformed to produce other desired representations. The hyperbolic plane can be mapped to a display region such as a disk to show a part in greater detail and to show other parts with less detail, so that the context of the detailed part is visible. Furthermore, any transformation between two representations can be done in the same amount of time, allowing high quality animated navigation. A sequence of images presented at animation speeds can provide perception of continuity, while changing positions of parts of the structure. Therefore, a user can indicate a change in position of a part and a machine can automatically present an image in which the part is moved as indicated. This makes it possible for the user to change focus to any part of a structure.

The following description, the drawings, and the claims further set forth these and other aspects, objects, features, and advantages of the invention.

DETAILED DESCRIPTION

A. Conceptual Framework

Figure 1:
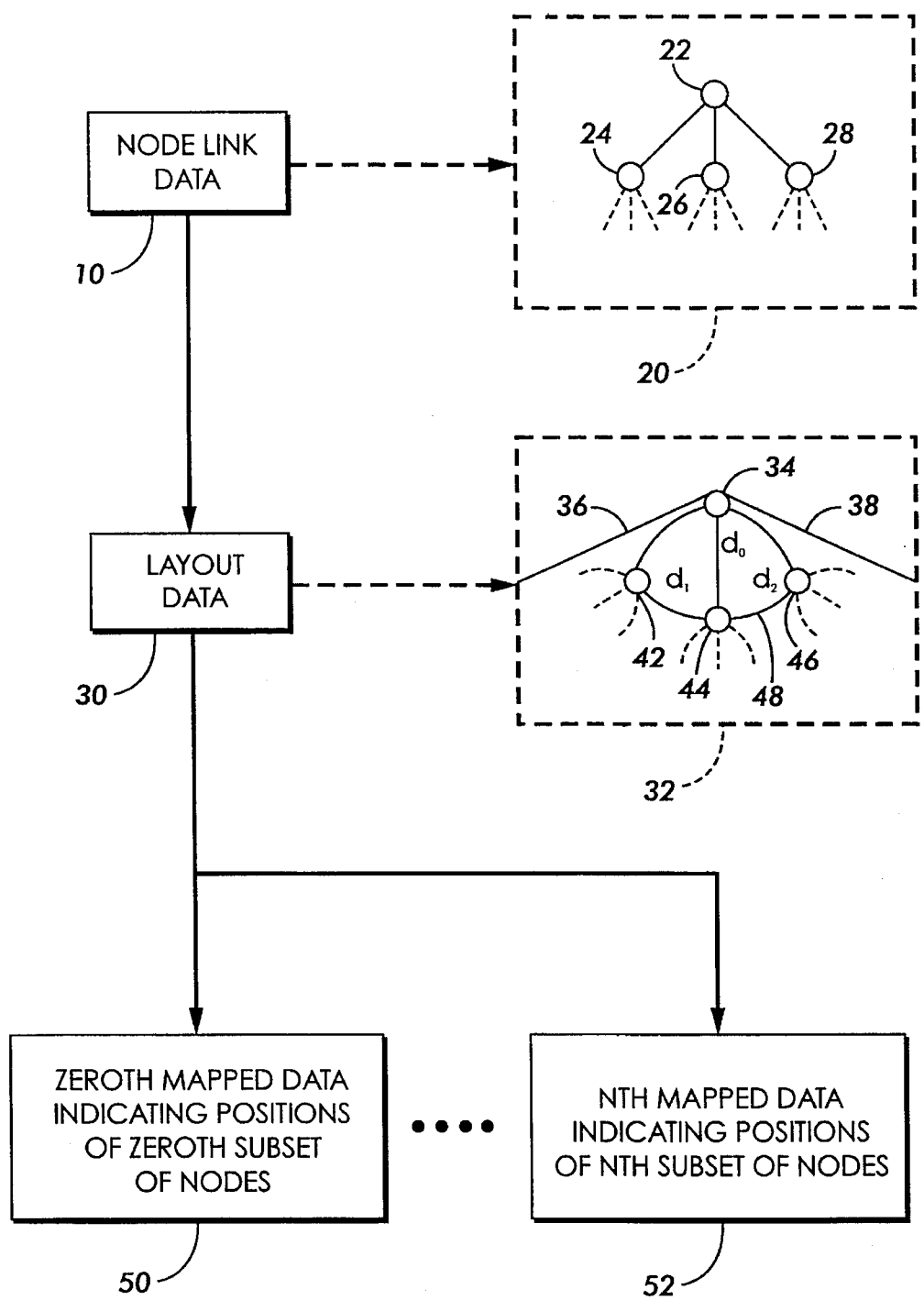
FIG. 1 is a schematic flow diagram showing how node-link data can be used to obtain layout data indicating positions in a space with negative curvature, from which two or more different mappings can be performed.

The following conceptual flamework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A processor performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A first item of data that is stored in a memory can be "accessed using" or "accessible using" a second item of data if the memory storing the first item responds to the second item by permitting access to the first data. For example, the second item may be an address, an offset used to produce an address, or a content-addressable value stored with the first item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

A processor or other component of circuitry "uses" an item of data in performing an operation when the result of the operation depends on the value of the item.

An "instruction" is an item of data that a processor can use to determine its own operation. A processor "executes" a set of instructions when it uses the instructions to determine its operations.

A "program" is an item of data that indicates a sequence of instructions that a processor can execute.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation. Signals from user input circuitry may include a "request" for an operation, in which case a system may perform the requested operation in response.

An "image" is a pattern of physical light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

When an image is a pattern of physical light in the visible portion of the electromagnetic spectrum, the image can produce human perceptions. The term "graphical feature", or "feature", refers to any human perception produced by, or that could be produced by, an image.

A "pointer" is a graphical feature that indicates a position within an image. A pointer is "at a position" when the pointer is indicating the position.

A "pointer control device" is a user input device that can be used to control position of a pointer within an image presented on a display. Examples of pointer control devices include a mouse, a joystick, a track ball, a portion of a keyboard with directional keys, and so forth. An action of a user "moves a pointer" if the action causes a pointer control device to provide signals causing a change in position of the pointer. An action of a user moves a pointer "to a position" if, at the end of the action, the pointer is at the position.

In general, an action by a user "indicates" a thing, an event, or a characteristic when the action demonstrates or points out the thing, event or characteristic in a manner that is distinguishable from actions that do not indicate the thing, event, or characteristic. The user can, for example, use a pointer control device such as a mouse to indicate a position by positioning a pointer at the position and clicking a button on the pointer control device while the pointer is at the position.

An image "shows" or "includes" a feature when the image produces, or could produce, a perception of the feature.

An item of data "defines" an image when the item of data includes sufficient information to produce the image, such as by presenting it on a display. An item of data "defines" a feature when the item defines one or more images that show or include the feature.

A "structure" is a group of items, all of which are related to form a unity. A "node-link structure" is a structure that includes items called nodes and links. Each link relates two or more of the nodes. Two nodes are "related through one link" or "related through a link" if the node-link structure includes a link that relates the two nodes. A link "relates a pair" of nodes if the link relates only two nodes.

A "graph" is a node-link structure in which each link relates two nodes. An "acyclic graph" is a graph in which the links provide only one path between any two nodes in the graph. A "directed graph" is a graph in which each link indicates direction between the nodes it relates, with one node being a source of the link and the other being a destination. A "tree" is an acyclic directed graph with exactly one root node such that every other node in the tree can be reached by only one path that begins at the root node and follows each link in the path in its indicated direction.

A "branch" of a node-link structure is a set of nodes that forms a tree within the node-link structure if the links are treated as relating pairs of nodes and as indicating direction. A branch therefore includes two or more levels, with the "top level node" being the node that is the root node of the tree and "lower level nodes" being nodes at one or more levels of the tree below the top level node. Each lower level node has a "parent node" at the next higher level to which the lower level node is related through one link. A parent node has a set of "child nodes" at the next lower level to each of which the parent node is related through one link. The child nodes of a parent "share" the parent node. A parent node also has a set of "descendant nodes" that includes its child nodes and all of their child nodes, and so forth.

An "exponentially growing branch" of a node-link structure is a branch in which the number of nodes at successively lower levels increases approximately as an exponential function of the number of links m relating nodes at a lower level to the top level node of the branch. For example, if parent nodes within the branch have an average of three children, the number of nodes at the mth lower level would be approximately $3^m$.

An item of data "defines" a node-link structure if the item of data includes information indicating how the links relate the nodes. For example, the item of data could include, for each link, an identifier of each of the nodes that it relates.

A graphical feature "represents" a node-link structure when the graphical feature itself includes features that map one-to-one with a set of nodes and links in the node-link structure. A feature that maps to a node "represents" the node and a feature that maps to a link "represents" the link. A "node feature" is a feature that represents only one node, and a "link feature" is a feature that represents only one link.

A "graphical representation" or "representation" is a composite graphical feature that includes graphical features that are spatially related in a configuration that represents information.

A signal or an item of data indicates "a display position" when the signal or item of data indicates a position on the display. A feature within a representation is "presented at" or "presented near" a display position if a viewer looking at the display position sees the feature at or nearby the display position. A signal indicates "a change" from a first display position to a second display position when the signal requests a change from the presented representation to a changed representation such that features at or near the first display position in the presented representation be presented at or near the second display position in the changed representation. A feature has "a position between" two display positions if a viewer can perceive the feature as being between the two display positions.

A "sequence of representations" is a sequence that includes at least two representations. A sequence of representations begins with a "first representation" and the first representation is followed by a "sequence of at least one following representation" that ends with a "last representation." Each following representation follows a "preceding representation." A sequence of representations may also include one or more "intermediate representations" between the first and last representations. A sequence of representations may include a "subsequence of representations" that is also a sequence of representations as defined above.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

The last representation of a sequence of representations is perceptible as a "changed continuation" of the first representation when the last representation is perceptible as a continuation of the first representation but with at least one change. An intermediate representation is similarly perceptible as an "intermediate changed continuation" of the first representation when the intermediate representation is perceptible as a continuation of the first representation but with at least one change.

A second display feature is perceptible as a "moved continuation" of a first display feature if it is perceptible as a continuation in a different position.

An operation includes a "sequence of iterations" when the operation includes a sequence of substantially similar suboperations, each referred to as an "iteration," where each iteration after the first uses starting data produced by the preceding iteration to obtain ending data. Each iteration's ending data can in turn be used by the following iteration.

An item of data "defines" a representation when the item defines an image that includes the representation. A representation "is presented" when an image that includes the representation is presented. Providing data to a display "causes" presentation of a representation or sequence of representations when the display responds to the data by presenting the representation or sequence of representations.

A "region" of a display is a bounded area of the display. The "perimeter" of a region is a boundary around it. A display position is "within a minimum spacing" from the perimeter of a region if the distance from the display position to the nearest position in the perimeter is less than the minimum spacing.

A "region" of a representation is a bounded area of the representation; for example, a single point is the smallest possible region of any representation. A representation "includes" a feature or a region if presentation of the representation can produce perception of the feature or region.

A "representation of a node-link structure" is a graphical representation that represents the node-link structure. In a representation of a node-link structure, for example, link features can be lines, such as arcs or straight lines, that extend between node features.

A "bounded node feature" is a node feature that has a perceptible boundary. The "center of area" of a bounded node feature is the center of area of the region within the node feature's boundary. The position of a bounded node feature's center of area can therefore be computed from the node feature's boundary or estimated by viewing the representation.

The "nearest other node feature" of a first bounded node feature in a representation is a second bounded node feature whose center of area is spaced from the first node feature's center of area by a distance no greater than the spacing from the first node feature's center of area to any other bounded node feature's center of area. The distance is referred to herein as the node feature's "nearest node spacing." A bounded node feature may have more than one nearest other node feature, all with centers of area at the nearest node spacing.

Bounded node features in a first region have nearest node spacings that are "in general perceptibly greater" than in a second region if a viewer can see that the nearest node spacings are generally greater in the first region than in the second. A region in which bounded node features have nearest node spacings that are in general perceptibly greater than in other regions of a representation may be referred to as a "region of greater spacings."

In a representation of a node-link structure, a relation between a parent node feature's display position and a child node feature's display position is such that "it is unlikely that any of the descendant nodes are further than" a minimum spacing from the perimeter of a region if, given display positions of a parent node feature and a child node feature and a way in which the display positions were obtained, it is unlikely that a descendant of the child would be positioned further than the minimum spacing from the perimeter. For example, in an implementation described below, a test for unlikelihood would be whether the relation between the two display positions is such that the child node feature's display position is nearly as close to the perimeter as the parent node feature's display position.

An operation "excludes" a node and its descendant from a subset of nodes for which a representation of a node-link structure includes node features representing nodes if the operation ensures that the representation does not include node features representing the excluded node and descendants.

The terms "space" and "position" have related meanings as follows: A "space" is a set of "positions" over any pair of which a distance measure for the space can be applied to obtain a distance between the pair of positions. Examples of types of spaces include one-dimensional spaces such as lines or rays; other n-dimensional spaces; continuous spaces; discrete approximations of continuous spaces; and so forth.

In some spaces, a position can be uniquely specified by one or more numbers, each referred to as a "coordinate."

A "planar unit disk" is a two-dimensional Euclidean space bounded by a circular perimeter, with first and second perpendicular axes that cross at the center of the perimeter, and with a radius along each axis from the center to the perimeter of one. As a result, each position in the planar unit disk can be uniquely identified by two coordinates, each between +1 and −1.

Two straight lines are "parallel" if they do not intersect.

A "space with negative curvature" is a space in which parallel lines diverge. Therefore, through any position in a space with negative curvature that is not on a given straight line, there are multiple other straight lines parallel to the given straight line. An example of a space with negative curvature is hyperbolic n-space. A "hyperbolic plane" is a hyperbolic 2-space.

A "discrete approximation" of a continuous space is a space in which positions can be uniquely specified by a subset of the continuous range of numbers for the continuous space, and the subset is such that positions in the discrete approximation can only be specified with limited precision in comparison with the continuous space. For example, if positions in a continuous space can be specified by the real numbers, positions in a discrete approximation might be specified only by the integers or by n-bit numbers, and so forth.

An operation "lays out" a structure in a space if the operation obtains data indicating positions in the space for items in the structure. A "layout space" is a space in which a structure can be laid out.

An item of data indicates "positions in a layout space" for parts of a node-link structure when the item of data indicates, for each of the parts, a position in the layout space. For example, the item of data could indicate each part's position by indicating coordinates of the position. Such an item of data can be referred to as "layout data."

An item of data indicates a position in a layout space "for a node" if the item of data can be accessed with a handle or other identifier of the node to obtain another item of data indicating the node's position. A node-link structure can be laid out, for example, by obtaining an item of data indicating positions in a layout space for a set of the nodes in the structure.

An item of data indicates positions "approximately along a circle" or "approximately along an arc" in a layout space if an arc of an ellipse or a circle can exist within the layout space such that each position is closer to the arc than to an adjacent one of the positions. Adjacent positions that are approximately along a circle are "separated by approximately a base spacing" if the distances in the layout space between the adjacent positions are within an order of magnitude of the base spacing.

An item of data indicates a position "approximately at the center" of a circle in a layout space if the position is closer to the center of the circle than to the circle.

Within a branch that includes two or more parent nodes for each of which an item of data indicates positions for child nodes sharing the parent node approximately along a circle and a position for the parent node approximately at the center of the circle, the radii of circles and spacings between adjacent child positions along circles are "all approximately uniform within the branch" if the greatest and the smallest of the radii and spacings are within an order of magnitude of each other. The circles have radii that, together, "approximate a function that increases slowly with number of lower level nodes" if mean lengths of radii of the circles that have each number of child nodes form a curve that approximates a function with monotonic positive slope and whose slope decreases with increasing number of children.

Descendant nodes in a part of a branch of a node-link structure would be "uniformly spaced" if, within the part of the branch, each group of child nodes sharing a parent node was positioned along a circle with the parent node at the circle's center and with the radii of circles and spacings between adjacent child nodes along circles all approximately uniform within the part of the branch.

A part of a branch that includes descendant nodes "would occupy" an angle if the descendant nodes were uniformly spaced if the angle is equal to the wedge angle of the smallest wedge that would include the entire part of the branch if the descendant nodes were uniformly spaced.

A "wedge" in a layout space is a partially bounded region of the space that has a vertex and is between two rays that extend from the vertex. A "wedge angle" is the angle at which the rays bounding a wedge diverge from the wedge's vertex. A wedge angle may be greater than 180°, and may even be 360° if the two rays are identical, in which case the wedge includes all of the layout space.

An item of data "indicates" a wedge if the item of data includes sufficient information to specify the wedge. For example, the item of data could indicate the position of the vertex, the direction in which the wedge extends from the vertex, and the wedge angle.

An arc is "within" a wedge in a layout space if the arc does not extend across the boundary between the wedge and the part of the layout space outside the wedge.

Two or more wedges "do not overlap" or "are not overlapping" if none of the wedges includes any part of any of the other wedges.

A "mapping" is an operation that uses data indicating positions in a first space to obtain data indicating positions in a second space. To "map" is to perform a mapping. The data obtained by a mapping may be called "mapped data." Mapped data can, for example, indicate positions in a display space, in a layout space, or in another appropriate space. A position in a layout space "maps to" a display position, for example, if a mapping of positions in the layout space to display positions would obtain mapped data indicating the display position for the position in the layout space.

A "conformal mapping" from a hyperbolic plane to a planar unit disk is a mapping that preserves angles but distorts lines in the hyperbolic space into arcs in the unit disk. One conformal mapping is sometimes referred to as the "Poincaré model."

A "projective mapping" from a hyperbolic plane to a planar unit disk is a mapping that takes lines in the hyperbolic space into lines in the unit disk but distorts angles. One projective mapping is sometimes referred to as the "Klein model."

A "transformation" is a mapping from a space to the same space. "Transformed position data" are data obtained by applying a transformation to data indicating positions in the space. Transformed position data can, for example, indicate "transformed positions" in a layout space for parts of a node-link structure, in which the transformed position data can also serve as layout data for subsequent operations.

A "rigid transformation" is a transformation of a space in which distances between positions in the space are preserved. A rigid transformation of a plane may include a "translation" in which position of a line within the plane is preserved and a "rotation" in which the position of a center of rotation within the plane is preserved.

A rigid transformation of a layout space "would move" a first position to a second position if the rigid transformation applied to layout data indicating the first position would obtain transformed position data indicating the second position.

Transformed positions have a relation to positions indicated by layout data "equivalent to" a rigid transformation if the rigid transformation would move the positions indicated by the layout data to the transformed positions.

An "orientation" of features in a representation is a positioning of the features relative to the position in which the representation is ordinarily viewed. For example, a representation ordinarily has top, left, right, and bottom sides, so that an orientation could be described as upward, leftward, rightward, or downward. A feature has an orientation "with respect to" another feature if the orientation correctly describes the relation between the positions of the two features. For example, a feature may be oriented upward, leftward, rightward, or downward with respect to another feature.

Where layout data are used to present a first representation and a rigid transformation applied to the layout data obtains transformed position data that are, in turn, used to present a second representation, the rigid transformation "preserves" in the second representation an orientation of features in the first representation that represent parts of a node-link structure if each of the first and second representations includes features that represent the parts of the node-link structure and if the features representing the parts have approximately the same orientation in both representations. For example, if the parts include a parent node and its child nodes, and the features representing the child nodes have first and second orientations with respect to the parent in the first and second representations, respectively, orientation is preserved if the first and second orientations are approximately equal. In contrast, if features have a new orientation, the rigid transformation "establishes" the orientation.

B. General Features

Figure 2:
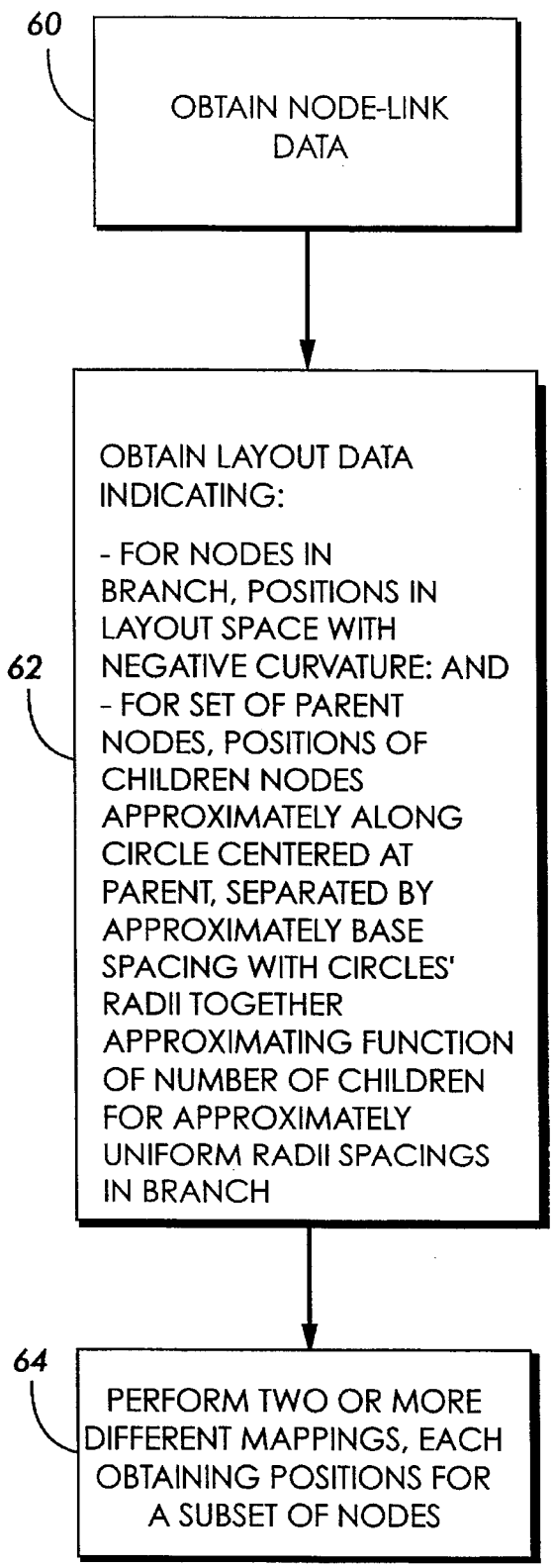
FIG. 2 is a flow chart showing general acts in obtaining layout data and performing mappings as in FIG. 1.
Figure 3:
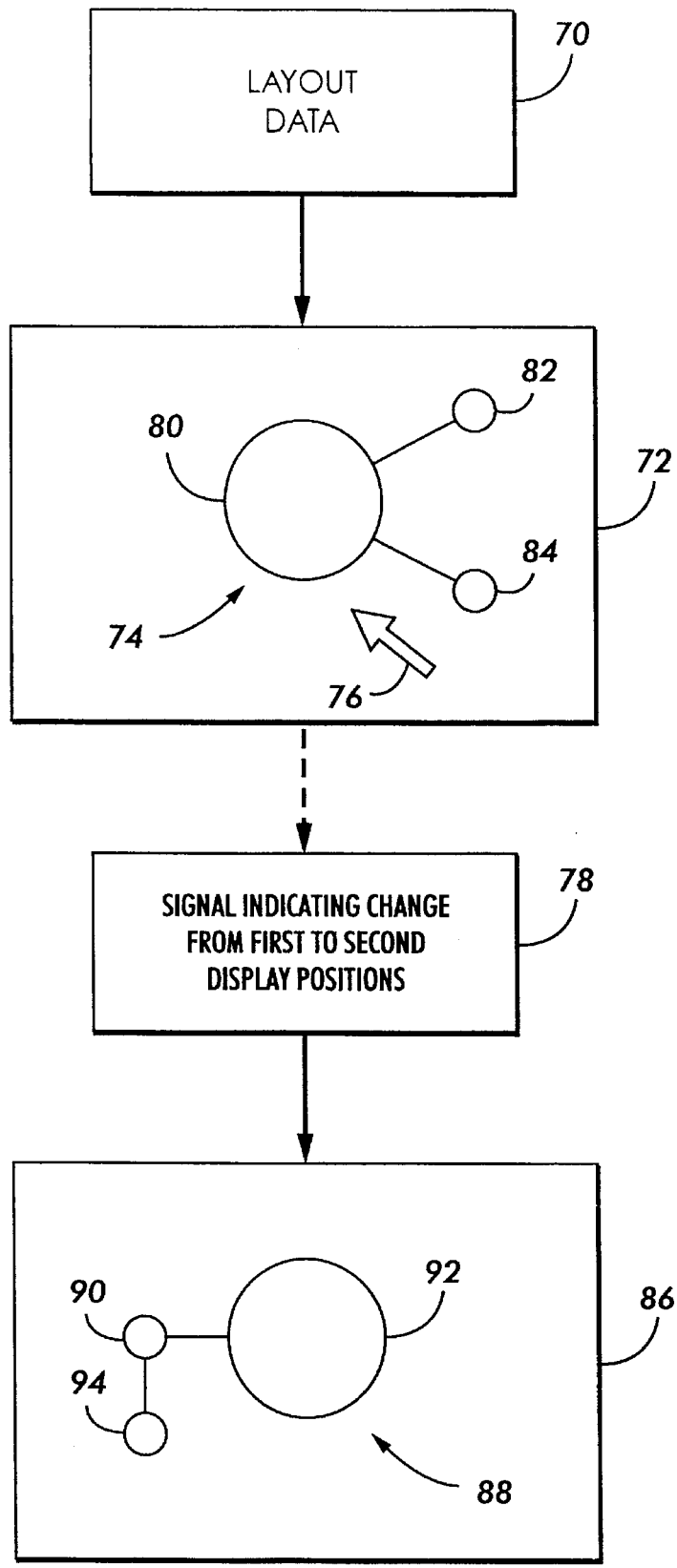
FIG. 3 is a schematic flow diagram showing how first and second representations of a node-link structure can be presented, with the second representation automatically presented in response to a signal indicating a change from a first display position to a second display position in the first representation.
Figure 4:
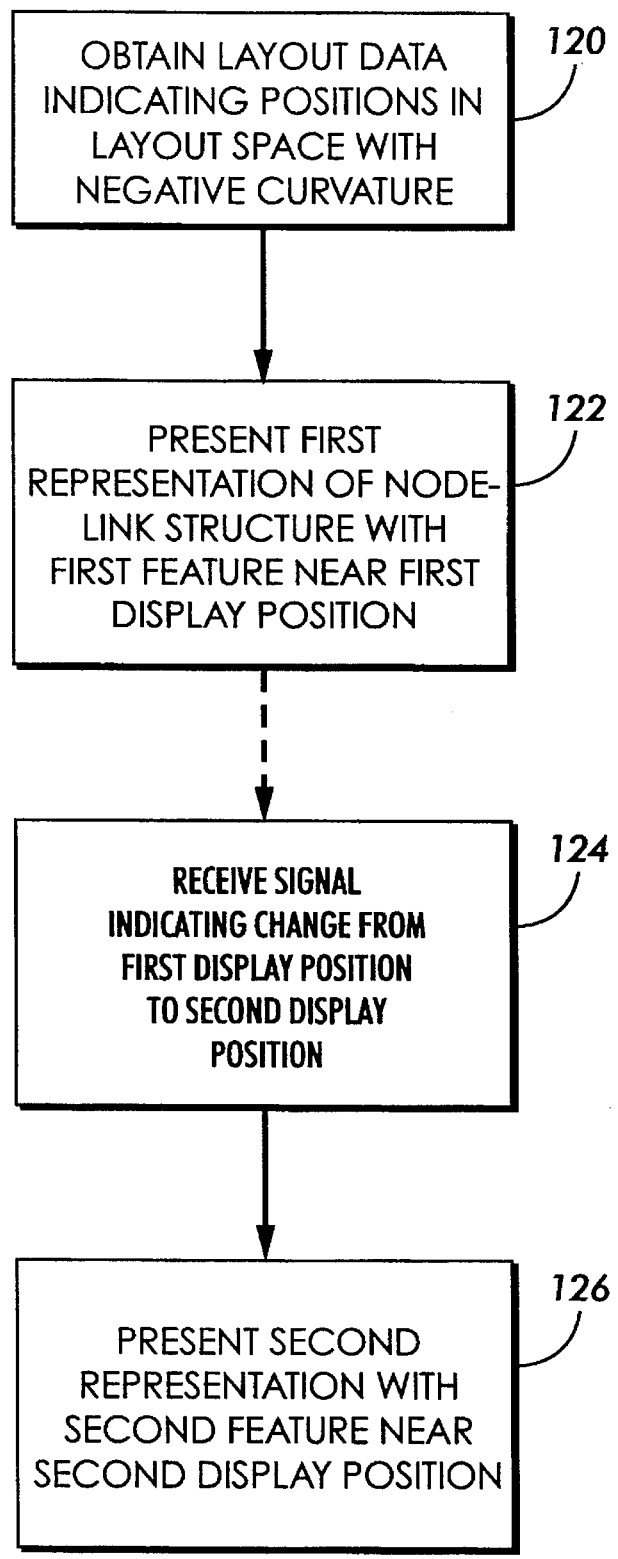
FIG. 4 is a flow chart showing general acts in presenting first and second representations as in FIG. 3.
Figure 5:
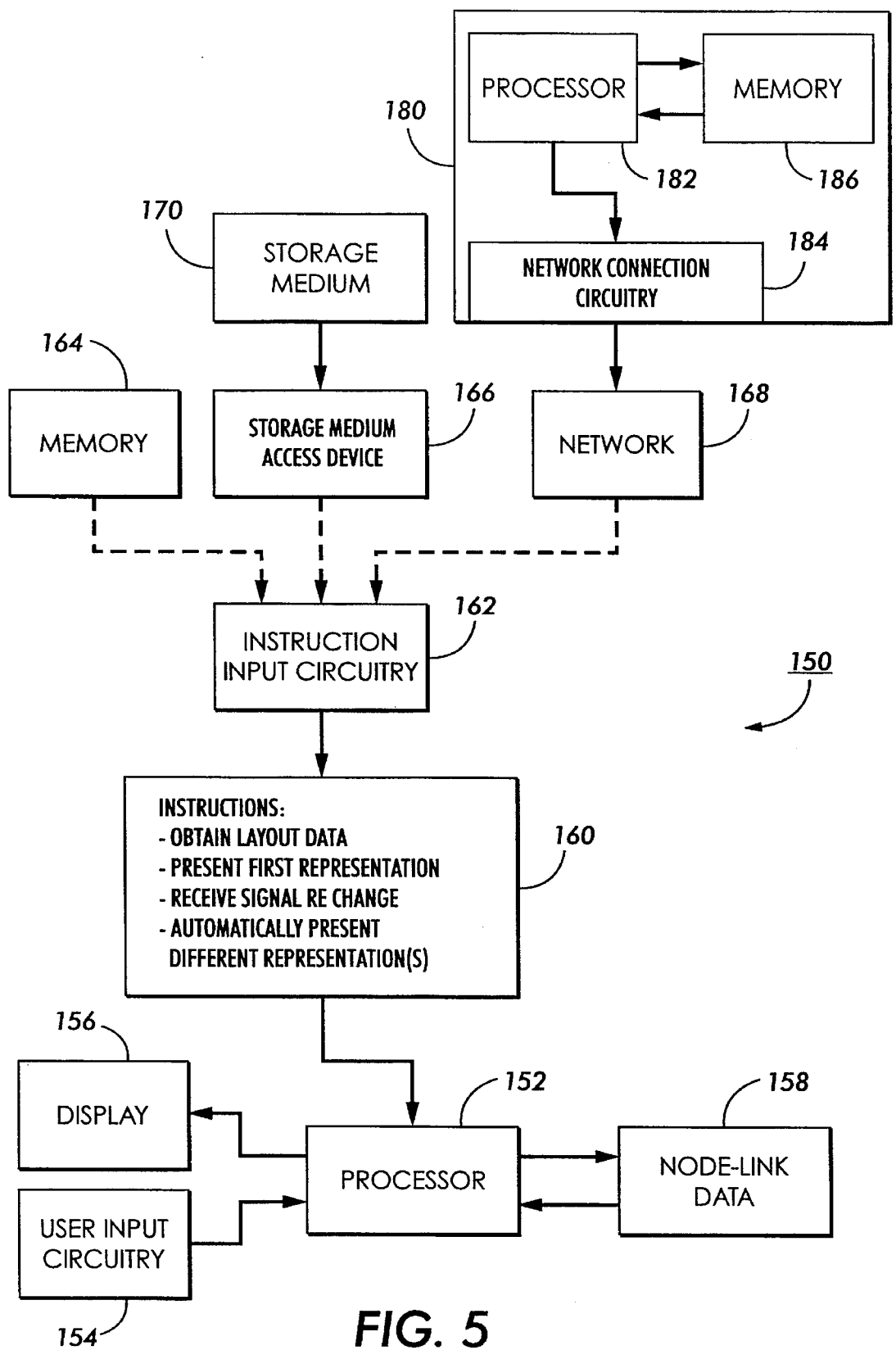
FIG. 5 is a schematic diagram showing general components of a machine that obtains layout data and performs mappings as in FIG. 1 and presents first and second representations as in FIG. 3.

FIGS. 1–5 show general features of the invention. FIG. 1 shows how node-link data defining a node-link structure can be used to obtain layout data indicating positions in a layout space with negative curvature, from which two or more different mappings can be performed. FIG. 2 shows general acts in using node-link data to obtain layout data and perform mappings as in FIG. 1. FIG. 3 shows how first and second representations can be presented, with the second representation being automatically presented in response to signals from a user indicating a change from a first display position in the first representation to a second display position. FIG. 4 shows general acts in presenting first and second representations as in FIG. 3. FIG. 5 shows general components of a machine that can obtain layout data and use it to perform mappings as in FIG. 1 and can present first and second representations as in FIG. 3.

In FIG. 1, node-link data 10 define node-link structure 20, part of which is illustratively shown. As shown, node-link structure 20 includes nodes and links that relate the nodes. FIG. 1 shows an exponentially growing branch of node-link structure 20, with a top level node 22 related to each of lower level nodes 24, 26, and 28 through one link. As suggested by the dashed lines, each of lower level nodes 24, 26, and 28 is in turn related to three nodes at a next lower level. If this rate of increase continues, the number of nodes at a lower level of the exponentially growing branch would be approximately $3^m$, where m is the number of links relating nodes at the level to top level node 22. As suggested in FIG. 1, it is difficult to lay out an exponentially growing branch on a two-dimensional Euclidean plane because of space constraints.

Layout data 30, however, indicate positions in negatively curved space 32 for nodes in the exponentially growing branch of node-link structure 20. Space 32 is schematically illustrated with position 34 of top level node 22 at the vertex of a wedge that extends between rays 36 and 38 from the vertex. This top level wedge is allocated to top level node 22. Lower level nodes 24, 26, and 28 can have positions 42, 44, and 46 approximately along circle 48 whose center in space 32 is approximately at position 34, the vertex of the top level wedge.

Positions 42, 44, and 46 all lie within the top level wedge and all the other descendants of top level node 22 at lower levels can also be positioned within the top level wedge. For example, nodes at a next lower level of the exponentially growing branch can similarly be approximately positioned along circles whose centers in space 32 are approximately at positions 42, 44, and 46. Because space 32 is negatively curved, each of lower level nodes 24, 26, and 28 can be allocated a lower level wedge between rays that diverge from the vertex of the wedge at approximately the same angle as the angle at which rays 36 and 38 diverge from position 34, even though the lower level wedges do not overlap each other and all are contained within the top level wedge.

Adjacent child positions 42 and 44 on circle 48 are separated by distance $d_1$, while adjacent child positions 44 and 46 are separated by distance $d_2$. Each of the distances $d_1$ or $d_2$ is approximately equal to a base spacing, and radius $d_0$ of circle 48 and the radii of other circles in the branch together approximate a function that increases slowly with number of lower level nodes such that the radii and spacings between adjacent child positions along circles are all approximately uniform within the branch.

As shown in FIG. 1, layout data 30 can be used to perform two or more different mappings. Each mapping obtains mapped data, as illustrated by zeroth mapped data 50 and Nth mapped data 52. The mapped data obtained by each mapping indicate positions for a subset of the nodes in node-link structure 20. The positions could, for example, be display positions or positions in another space other than the layout space.

In FIG. 2, the act in box 60 begins by obtaining node-link data defining a node-link structure. The node-link structure includes nodes and links, with each link relating at least two nodes.

The act in box 62 uses the node-link data obtained in box 60 to obtain layout data indicating, for nodes in a branch, positions in a layout space with negative curvature. For each of a set of parent nodes, the positions of children sharing a parent node are approximately along a circle centered approximately at the position of the parent node, with adjacent children nodes separated by distances that approximate a base spacing. The radii of circles in the branch together approximate a function that increases slowly with number of children nodes sharing a parent such that the radii and spacings between adjacent child positions along the circles are all approximately uniform within the branch.

The act in box 64 then uses the layout data from box 62 to obtain mapped data for at least two different mappings. The mapped data for each mapping indicate positions for a subset of the nodes.

In FIG. 3, layout data 70 indicate positions in a layout space with negative curvature for parts of a node-link structure. Layout data 70 is used to present image 72 with first representation 74 of the node-link structure. Image 72 illustratively also includes pointer 76, which can be controlled by a mouse or other pointer control device to provide signals indicating display positions.

As suggested by the dashed line in FIG. 3, an uncertain amount of time passes before the user provides signal 78 indicating a change from a first display position to a second display position. First representation 82 has a first feature representing a first part of the node-link structure near the first display position. For example, one of node features 80, 82, and 84 could be near the first display position.

In response to signal 78, image 86 is presented with second representation 88 of the node-link structure. Second representation 88 is perceptible as a changed continuation of first representation 74.

In second representation 88, a second feature representing the first part of the node-link structure is near the second display position. For example, if node feature 80 in first representation 82 was near the first display position, and node feature 90 represents the same node, the second display position could have been indicated by a dragging signal from the position of node feature 80 to the position of node feature 90. Similarly, if node features 92 and 94 represent the same nodes, respectively, as node features 82 and 84, the second position could have been indicated by a dragging signal from the position of node feature 82 or node feature 84 to the position of node feature 92 or node feature 94, respectively. Also, the second position could have been indicated by clicking on node feature 82 in first representation 74 to indicate a second position at the center of a region of greater spacings, as suggested by the increase in size from node feature 82 to node feature 92.

FIG. 4 shows general acts implementing the operations illustrated in FIG. 3. In the act in box 120, layout data is obtained, indicating positions in a layout space with negative curvature for parts of a node-link structure.

The act in box 122 uses the layout data from box 120 to present a first representation of the node-link structure. The first representation includes a first feature representing a first part of the node-link structure, and the first feature is near a first display position.

After an uncertain amount of time, as indicated by the dashed line, the act in box 124 receives a signal from a user indicating a change from the first display position to a second display position.

The act in box 126 responds to the signal in box 124 by presenting a second representation of the node-link structure. The second representation includes a second feature representing the first part of the node-link structure. The second feature is near the second display position.

Machine 150 in FIG. 5 includes processor 152 connected for receiving data indicating user actions from user input circuitry 154 and for providing data defining images to display 156. Processor 152 is also connected for accessing node-link data 158, which define a node-link structure as described above in relation to FIG. 2. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 uses node-link data 158 to obtain layout data indicating positions of parts of the node-link structure in a layout space with negative curvature, as in box 62 in FIG. 2 and box 120 in FIG. 4. Processor 152 then uses the layout data to present a first representation of the node-link structure on display 156 as in box 122 in FIG. 4, which can be done by performing a first mapping for a subset of the nodes to a region of the display, as in box 64 in FIG. 2. When processor 152 receives data indicating a user signal from user input device 154 and the signal indicates a change from a first display position to a second display position as in box 124 in FIG. 4, processor 152 can automatically present a second representation of the node-link structure on display 106, with the position of a feature near the first display position changed to near the second display position, as in box 126 in FIG. 4. The second representation can be presented by performing a second mapping as in box 64 in FIG. 2.

As noted above, FIG. 5 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a part of a software product. In each of these cases, storage medium 170 is an article of manufacture that can be used in machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to obtain and use layout data indicating positions in a layout space with negative curvature for parts of node-link structures. An implementation described below has been implemented on a Sun SPARCStation running a Unix/X operating system. Another implementation has been done on an Apple Macintosh personal computer. The Unix implementation executes instructions written in a Common Lisp programming environment extended with the Common Lisp Interface Manager (CLIM). Commercial Common Lisp environments and CLIM extensions are available from Lucid Inc. and Franz Inc.

C.1. System

Figure 6:
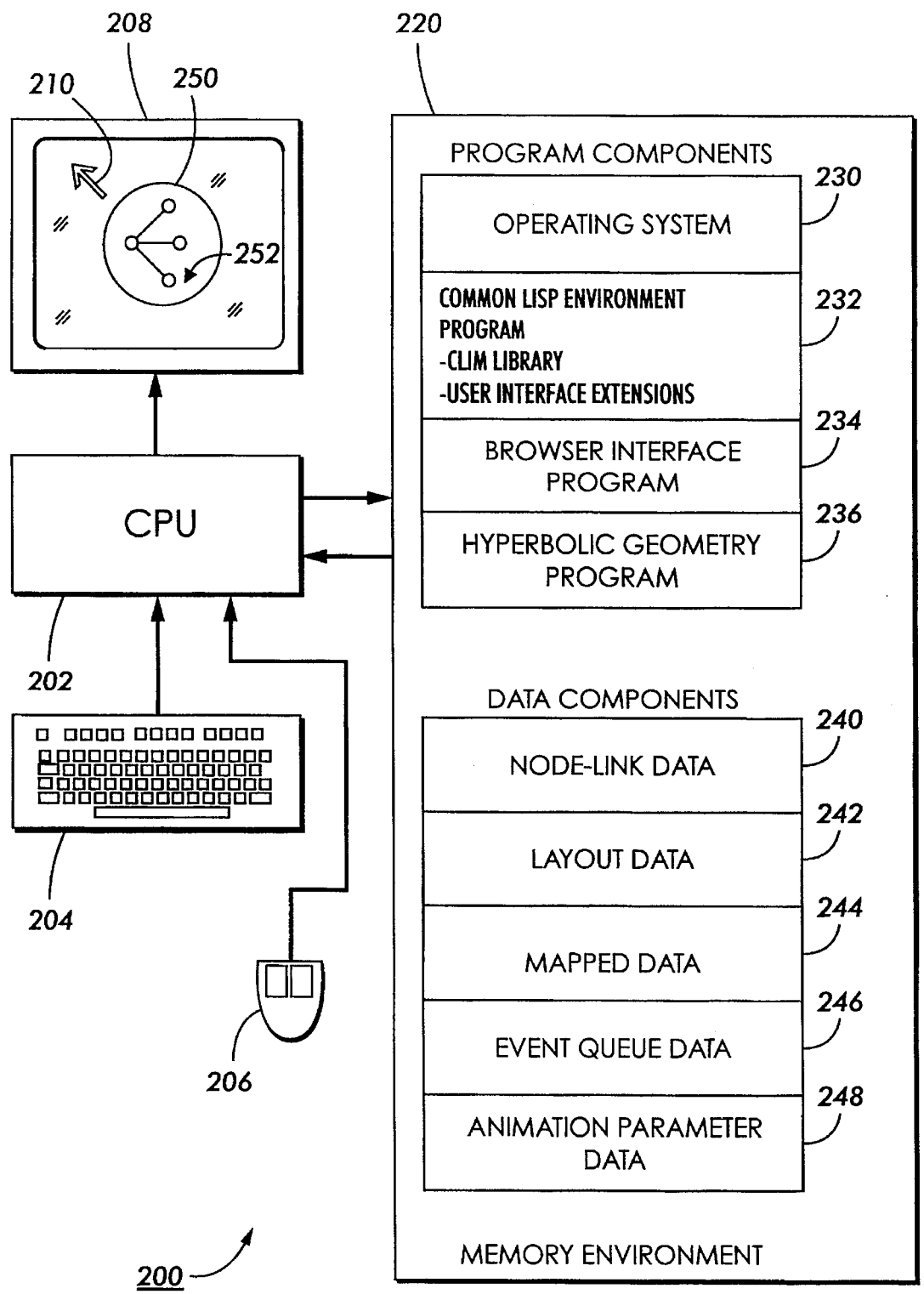
FIG. 6 is a schematic block diagram showing components of a system that can layout a node-link structure in a layout space with negative curvature, then map to present representations of the node-link structure on a display.

FIG. 6 illustrates components of systems in which the invention has been implemented.

Machine 200 in FIG. 6 includes central processing unit (CPU) 202, a microprocessor or other appropriate processor. CPU 202 is connected to receive data indicating user signals from user input devices that illustratively include keyboard 204 and mouse 206. CPU 202 is also connected to provide data to cause presentation of images on display 208. Images presented on display 208 can include pointer 210 controlled by mouse 206 or another pointer control device.

CPU 202 is connected to one or more memory components that together provide memory environment 220. The memory components conventionally include resident RAM connected directly to CPU 202, one or more internal disk drives or other storage medium access devices connected to CPU 202 through an internal bus, and one or more external memory components such as peripheral devices or remote servers that include storage medium access devices and that are connected to CPU 202 through external connections of machine 200. CPU 202 conventionally accesses data stored in any memory component in environment 220 by providing addresses.

FIG. 6 illustratively shows program components and data components stored in memory environment 220; program and data components are illustratively shown separately, but need not be stored separately within a given memory component. Program components include data that indicate instructions CPU 202 can execute, and can be stored in object code form or source code form; if appropriate, the program components can also include any compilers and interpreters needed to obtain instructions from program components stored in source code form. In executing instructions indicated by program components, CPU 202 accesses and uses data components.

In executing instructions indicated by operating system program 230, CPU 202 performs operations that transfer data between CPU 202 and other components of machine 200. Such operations can include, for example, mapping logical addresses in the memory space of CPU 202 to physical addresses for accessing a memory component in environment 220.

In executing instructions indicated by Common Lisp environment program 232, which includes a CLIM library and user interface extensions, CPU 202 provides the standard CLIM interface defined in the CLIM 2.0 specification available from Franz Inc. As a result, CPU 202 can execute CLIM source code, so that browser interface program 234 and hyperbolic geometry program 236 can be implemented in Common Lisp extended with CLIM.

In executing instructions indicated by browser interface program 234, CPU 202 first initializes machine 200. Then CPU 202 uses node-link data 240 defining a node-link structure to obtain layout data 242, indicating positions for parts of the node-link structure in a hyperbolic plane. Then CPU 202 uses layout data 242 to obtain mapped data 244 for an initial representation of the node-link structure. CPU 202 provides data to display 208 to cause presentation of the initial representation.

In executing instructions indicated by browser interface program 234, CPU 202 also receives data indicating user signal events from keyboard 204 and mouse 206. CPU 202 sets up, maintains, and handles a queue of steps for responding to an event by accessing event queue data 246. When the steps responding to a user signal event are completed, CPU 202 can set up steps for responding to the next event.

In executing instructions indicated by browser interface program 234, CPU 202 can also modify animation parameters by accessing animation parameter data 248. Or CPU 202 can use layout data 242 to obtain mapped data 244 for a changed representation of the node-link structure, then provide data to display 208 to cause its presentation.

CPU 202 can execute instructions indicated by hyperbolic geometry program 238 for various purposes, such as to obtain layout data 242, to obtain mapping data 244, and to map from a position of pointer 210 to a part of the node-link structure. As shown in FIG. 6, a representation can include a background 250 on which a FIG. 252 is shown, and a position of pointer 210 within FIG. 252 can be mapped to the nearest node, for example.

C.2. Browser Overview

Figure 7:
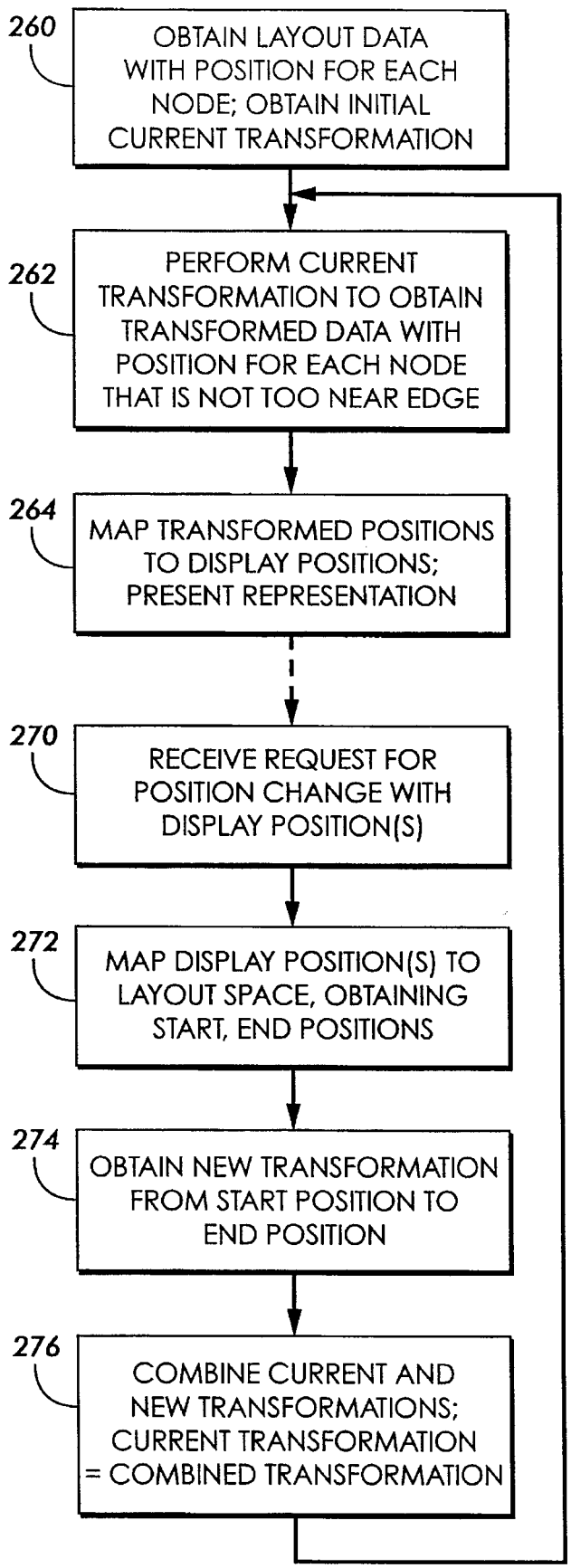
FIG. 7 is a flow chart showing acts by which the machine in FIG. 6 can provide a browser interface by transforming and mapping positions for a subset of nodes not too near an edge in response to requests for position changes.
Figure 8:
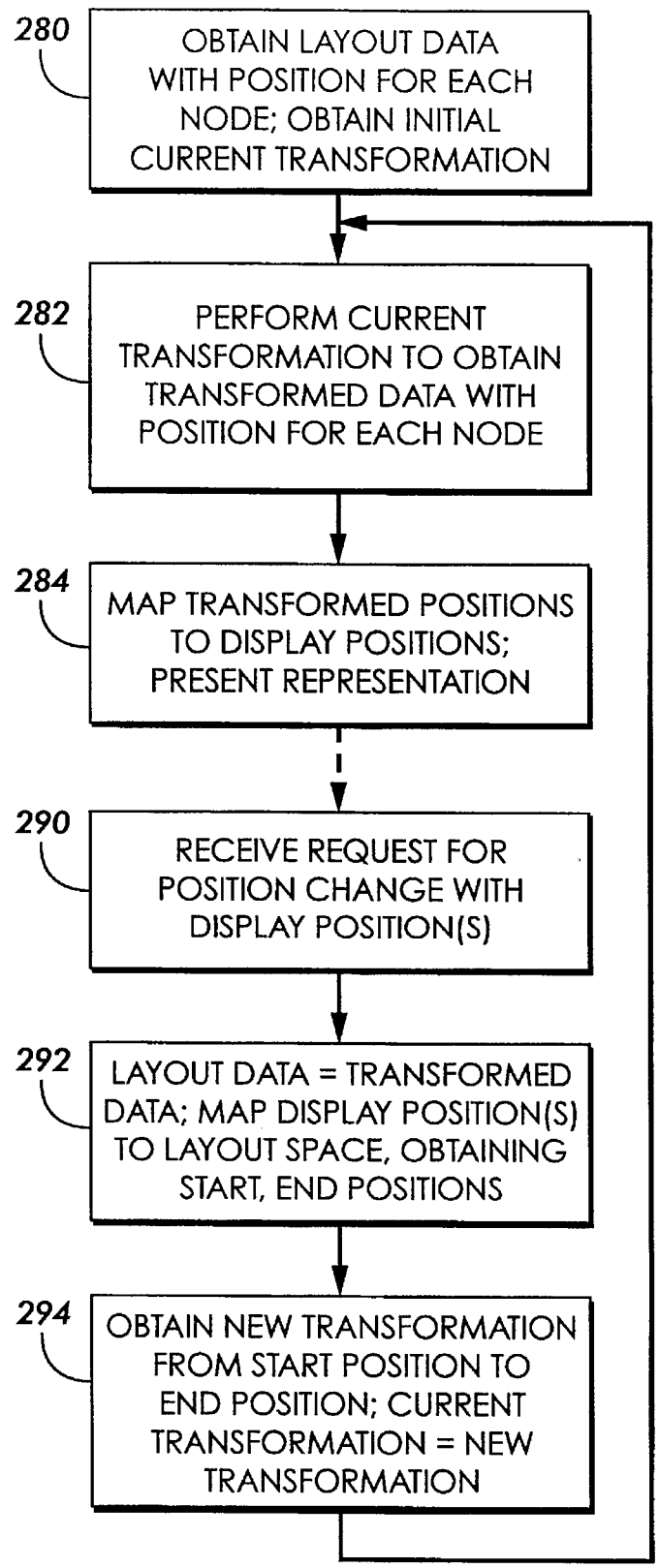
FIG. 8 is a flow chart showing acts by which the machine in FIG. 6 can provide a browser interface by successively transforming and mapping positions for all nodes in response to requests for position changes.

The operations of CPU 202 described above can be implemented in many ways to provide a browser for a node-link structure laid out in a space with negative curvature. FIG. 7 shows how the machine in FIG. 6 can provide a browser by transforming positions for nodes not too near an edge. FIG. 8 shows how the machine in FIG. 6 can provide a browser by successively transforming layout data for all nodes.

The general approach in FIGS. 7 and 8 is that positions of nodes can be transformed in a layout space; then, a representation can be presented by mapping from the layout space to display positions. As mentioned above, the layout space can be a hyperbolic plane or another appropriate space with negative curvature. The display positions can be positions within a circular display region, to facilitate mapping between the hyperbolic plane and the display region.

The act in box 260 in FIG. 7 obtains layout data indicating a position in a layout space for each node in a node-link structure. The layout space can, for example, be a hyperbolic plane. The act in box 260 also initializes a current transformation that can be performed on the layout data to obtain transformed positions. The initial current transformation could, for example, be a null transformation that does not change the positions of the nodes in the layout space.

The act in box 262 then performs the current transformation on the layout data from box 260 to obtain transformed data indicating transformed positions for each node except those nodes with positions in the layout space that are too near an edge. The edge bounds the part of the layout space that is presented when a representation of the node-link structure is displayed.

The act in box 264 then maps the transformed positions from box 262 to obtain a position on a display for each node that is not too near the edge. The act in box 264 then presents a representation on the display. The representation includes, for each node that is not too near the edge, a node feature at the node's display position.

As indicated by the dashed line in FIG. 7, the act in box 264 can be followed after an unspecified time by the act in box 270, which receives a request from a user for a position change. The request includes an indication of at least one position on the display.

The act in box 272 maps the display position(s) indicated in box 270 back to the layout space to obtain start and end positions in layout space. For example, if only one display position is indicated, as by a mouse click, the position of the pointer when the click occurs can be used to obtain the start position and the end position can be the position in layout space of the center of the representation. Or, if two display positions are indicated, as during a dragging motion from a button press to a button release, the position of the pointer when the button press occurs can be used to obtain the start position and the position when the button release occurs can be used to obtain the end position.

The act in box 274 obtains a transformation of the layout space that moves the start position to the end position. The act in box 276 combines the current transformation with the new transformation from box 274 to obtain a combined transformation. The combined transformation becomes the current transformation when the acts in boxes 262 and 264 are performed to present another representation.

As described below, the technique in FIG. 7 has been implemented to present a sequence of representations in response to a click rather than just one representation. This modification can provide a perception of continuous motion from the start position to the end position.

The technique in FIG. 8 is similar to FIG. 7, with the act in box 280, for example, being the same as the act in box 260. A key difference, however, is that the act in box 282 obtains a transformed position for each node in the node-link structure, including those that are treated as too near the edge in box 262. As a result, the technique of FIG. 8 is not as efficient as the technique of FIG. 7 for large node-link structures.

The act in box 284 maps the transformed positions from box 282 to display positions, as in box 264 in FIG. 7, and uses the display positions to present a representation as in box 264.

The act in box 290 receives a request as in box 270. The act in box 292 responds by first updating the layout data to be the transformed data from box 282 rather than the layout data from box 280. Then the act in box 292 maps from the display position(s) indicated in box 290 to the transformed layout space to obtain start and end positions. The act in box 294 obtains a new transformation that moves the start position to the end position, and updates the current transformation to be the new transformation before the acts in boxes 282 and 284 are performed to present another representation.

As noted above, the technique of FIG. 7 can handle large node-link structures better than the technique of FIG. 8 because the act in box 262 is not performed for nodes that are too near the edge. The technique of FIG. 8 has been found to be impractical for large structures. In addition, because some information is lost in obtaining a transformation, the technique of FIG. 7 is more precise, because it continues to use the original layout data from box 260.

C.3. Operations

The following implementation of CPU 202 operations follows the browser technique of FIG. 7, but the basic operations described below could also be used to implement the browser technique of FIG. 8.

The implementation described below lays out a node-link structure in a uniform way in the hyperbolic plane and maps this plane onto a circular display region. The hyperbolic plane is a mathematical construct in which parallel lines diverge away from each other. This leads to the convenient property that the circumference of a circle grows exponentially with its radius, which means that exponentially more space is available with increasing distance. Thus an exponentially growing node-link structure can be laid out in hyperbolic space in a uniform way, so that the distance between parents, children, and siblings is approximately the same everywhere in the hierarchy.

While the hyperbolic plane is a mathematical object, it can be mapped in a natural way onto the unit disk, which provides a way to display it on a two-dimensional (Euclidean) display. This mapping displays portions of the plane near the origin using more display space than other portions of the plane. Very remote parts of the hyperbolic plane get miniscule amounts of space near the edge of the disk. The projection onto the unit disk thus provides a natural mechanism for assigning more space to a portion of the node-link structure while still embedding it in the context of the entire structure.

Translating the structure on the hyperbolic plane provides a mechanism for controlling which portion of the structure receives the most space without compromising the illusion of viewing the entire structure. The structure is initially displayed with its root at the center of a region of greater spacings, but the implementation includes effective procedures for manipulating focus using pointer clicks as well as interactive dragging and for smoothly animating transitions across such manipulations. The context always includes several generations of parents, siblings, and children, making it easier for the user to explore the structure without getting lost.

The browser described below supports effective interaction with much larger structures than conventional hierarchy viewers and compares favorably with other novel browsers such as those described in Robertson et al., U.S. Pat. No. 5,295,243. In a 600 pixel by 600 pixel window, a standard two-dimensional hierarchy browser can typically display 100 nodes, each with a three character text string. The browser described below can display 1000 nodes of which about the 50 nearest the focus can show from three to dozens of characters of text. Thus the can display up to ten times as many nodes while providing more effective navigation around a node-link structure. The scale advantage is obtained by the dynamic distortion of the structure display according to the varying interest levels of its parts.

The following description is based on the source code in Appendices A–C, which contain code that has been executed successfully. Ambiguities may be resolved by consulting the code.

C.3.a. Layout

Figure 9:
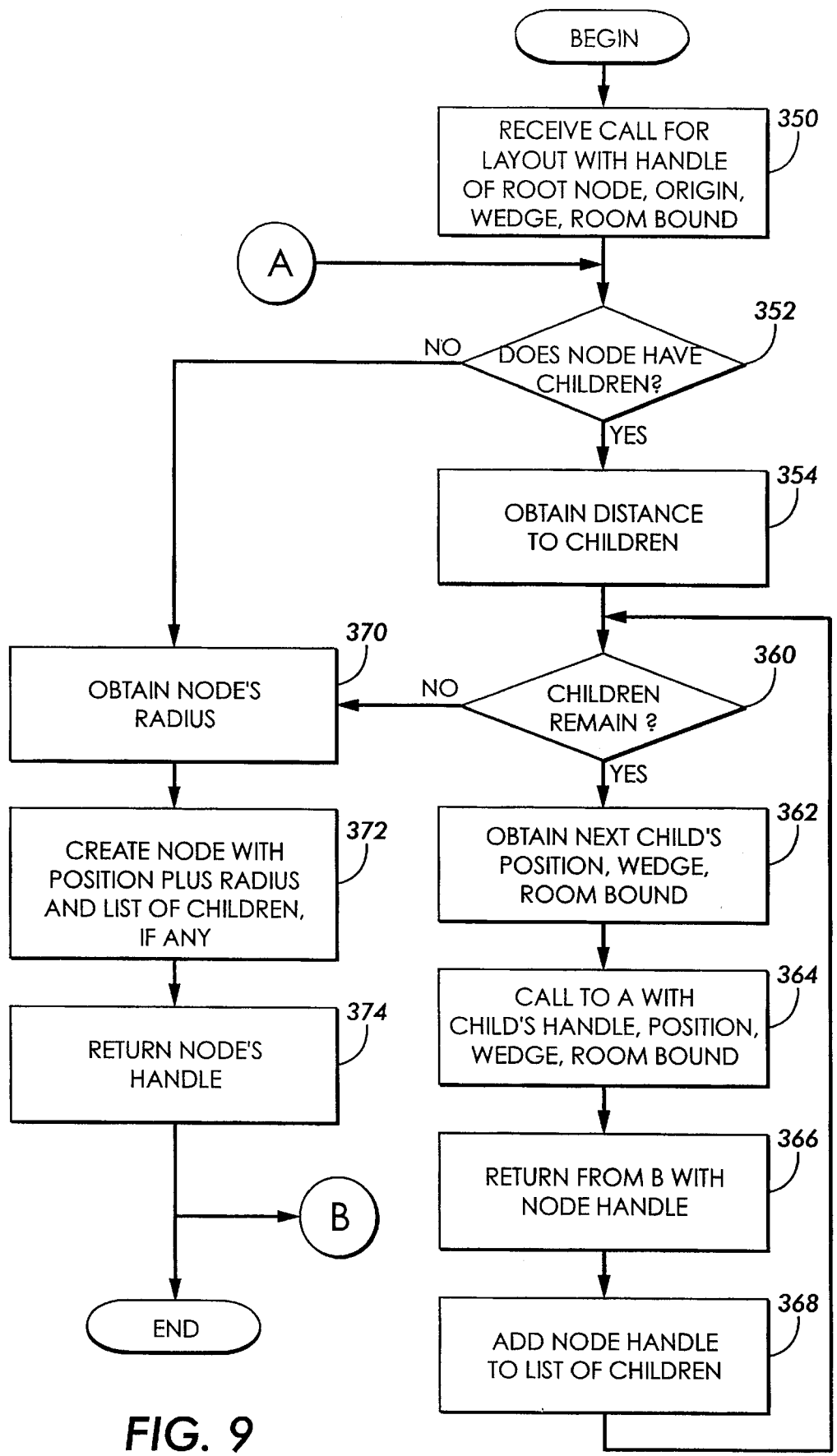
FIG. 9 is a flow chart showing acts in a layout operation by the system of FIG. 6 implementing the technique of FIG. 7.
Figure 10:
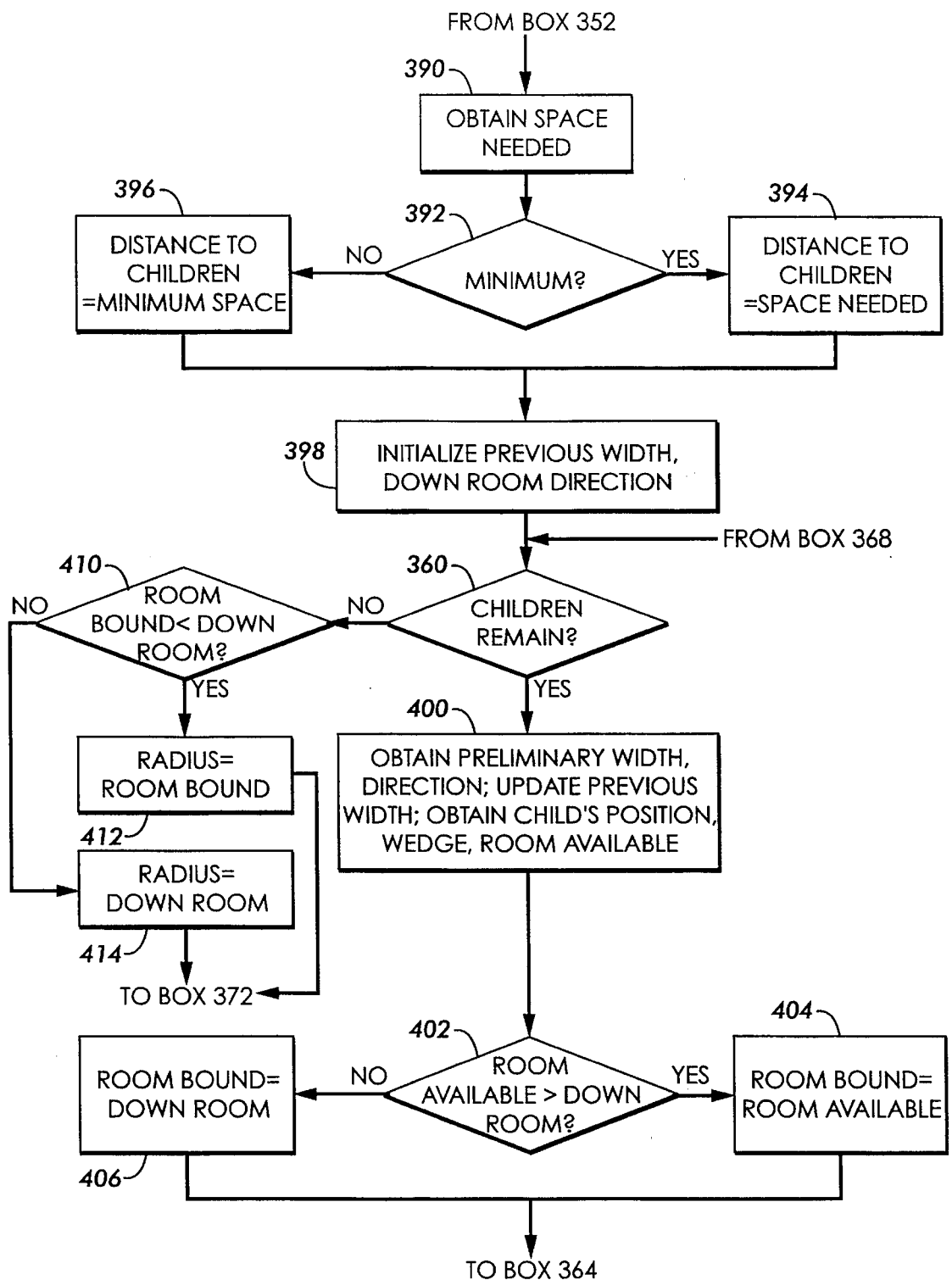
FIG. 10 is a flow chart showing acts that can obtain a node's distance to children; a child's position, wedge, and room bound; and a node's radius in FIG. 9.

FIGS. 9 and 10 illustrate acts in layout operations. FIG. 9 illustrates how CPU 202 lays out a node-link structure in a hyperbolic plane; the technique of FIG. 9 can be used to implement the acts in box 260 in FIG. 7 and box 280 in FIG. 8. FIG. 10 illustrates how a distance to a node's children; a child's position, wedge, and room bound; and a node's radius can be obtained in FIG. 9.

The layout technique in FIG. 9 recursively lays out each node in a node-link structure based on local information. A node is allocated a wedge of the hyperbolic plane, angling out from itself, in which its descendants can be positioned. All of a node's children are positioned along an arc in that wedge, at an equal distance from the node, and far enough out so that the children are some minimum distance apart from each other. Each of the children then gets a sub-wedge for its descendants.

Because of the way parallel lines diverge in hyperbolic geometry, each child will typically get a wedge that spans about as big an angle as does its parent's wedge. To obtain a more compact layout for non-uniform structures, this is modified so that siblings that themselves have many descendants get more room than siblings that don't; this modification tends to put grandchildren more nearly the same distance from their grandparent.

The technique of FIG. 9 can also be modified by changing the angle occupied by the children of the root node. The children of the root node can be spread out over an entire 360° circle, or can all be put on one side. In some cases, the second option is better.

The act in box 350 in FIG. 9 begins by receiving a call to perform a layout operation with the handle of a root node in the node-link data, with coordinates of the origin of a hyperbolic plane, with a wedge of the hyperbolic plane that is available for the descendants of the root node, and with a room bound. The layout operation of FIG. 9 can be used with node-link data defining an acyclic hierarchical node-link structure such that the handle of the node-link data is also the root node's handle. The wedge of the hyperbolic plane can be defined by a wedge angle and a direction. For a radial orientation, the wedge angle can be 360° and the direction does not matter, but for a canonical orientation such as rightward, the wedge angle is smaller, such as 120°, and the direction determines the orientation. The room bound can be initialized to 0.9 for the root node.

The act in box 352 tests whether the node currently being handled has children. If so, the act in box 354 obtains a distance to the children in the hyperbolic plane, as described below. Then the act in box 360 begins an iterative loop that handles each of the current node's children in turn.

The act in box 362 begins each iteration by obtaining, for the next child node, a position in the hyperbolic plane, a wedge, and a room bound, as described below. The act in box 364 then makes a recursive call for a layout operation with the handle of the next child and with its position, wedge, and room bound from box 362. The act in box 366 returns from the recursive call and the act in box 368 then adds the child's handle to a list of children for the current node.

When all of the current node's children have been handled, the act in box 370 obtains a radius for the current node, by taking either the room bound received in the call in box 350 or box 364 or one-half the distance to the current node's children from box 354, whichever is smaller, as described below in relation to FIG. 10. If the current node has no children, the act in box 370 takes the room bound from box 350 as the radius.

The act in box 372 then creates a data structure for the current node. The current node's data structure includes its position and its radius from box 370, and, if the current node has children, its node data structure also includes a handle or other link to the list of its children from box 368. The data structure can also include other relevant information. Then, the act in box 374 ends by returning the handle of the current node's data structure.

FIG. 10 shows how the acts in boxes 354, 362, and 370 in FIG. 9 can be implemented.

In the following description, each distance between a pair of points is encoded as the distance between the points in the Poincaré model with one point at the origin. This distance is the inverse hyperbolic tangent of the distance between the points in hyperbolic space.

The act in box 390 begins by obtaining the distance to a node's children by obtaining a value for space needed, using a base spacing S that is the same for all nodes. The space needed depends on the angles that would be occupied by the descendants of each of a node's children if the descendants were uniformly spaced; these angles are referred to as "weights" herein. A value for each child's weight can be obtained by taking the larger of 1.0 and ln (1.0+Grandchildren), where the variable Grandchildren is equal to the summation of the greater of 1.0 and ln (1.0 + (Number of Children)) for all grandchildren of the node that are children of the child.

To obtain the value for space needed, the act in box 390 also obtains an angle fraction by dividing the total angle available by the sum of the weights for all the children of the current node. The angle fraction is multiplied by the smallest of the weights to obtain an angle unit α. The space needed is then equal to $((ssin^2+1.0)^{1/2}-ssin)$, where $ssin=(((1.0-S^2)/2S)(\sin \alpha))$.

The act in box 392 then determines whether the space needed from box 390 is larger than the minimum space, which is the hyperbolic sum of the base spacing S with itself, calculated as $2S/(1+S^2)$. If so, the act in box 394 sets the distance equal to the space needed, but if not, the act in box 396 sets the distance equal to the minimum space.

The act in box 398 then initializes a value for previous width $W_o$ to zero; a value for down room, which can be initialized to the hyperbolic half of the distance D from box 394 or 396, calculated as $D/(1.0+(1.0-D^2)^{1/2})$; and values indicating direction, which can be initialized using values indicating the angular width W of the current node's wedge and the direction of the current node's wedge in the form of $(\theta_x, \theta_y)$, x- and y- coordinates of a point on the unit disk. A starting direction $(\theta_x, \theta_y)$ for calculating the first child's direction can have the calculated values $(((\theta_x(\cos(-W)))-(\theta_y(\sin(-W)))), ((\theta_y(\cos(-W)))+(\theta_x(\sin(-W)))))$.

Then the act in box 360 begins an iterative loop as described above in relation to FIG. 9. Part of the iterative loop is shown in boxes 400, 402, 404, and 406.

The act in box 400 obtains preliminary width and direction of the next child node's wedge, then uses the preliminary width to update last width. The act in box 400 also obtains the next child node's position, wedge, and room available.

The act in box 400 can obtain preliminary width angle $W_n$ as the product of the child's weight and the angle fraction, both obtained in box 390. The act in box 400 can use $(\theta_x, \theta_y)$ and the previous width angle $W_o$, either from box 398 or from the previous iteration, to calculate child direction $(\theta_x, \theta_y)$ having coordinate values equal to $(((\theta_x(\cos(W_o+W_n)))-(\theta_y(\sin(W_o+W_n)))), ((\theta_y(\cos(W_o+W_n)))+(\theta_x(\sin(W_o+W_n)))))$. Then the act in box 400 updates previous width $W_o$ to have the value of the preliminary width $W_n$.

The act in box 400 can obtain the next child node's position using the position (x, y) of the parent node, from box 350 if the parent node is the root node or from box 364 when performed for the parent node; using the child direction $(\theta_x, \theta_y)$; and using the distance D from box 394 or 396. The position include values $(x, y, \theta_x, \theta_y)$ that are calculated using transformations.

A rigid transformation of the hyperbolic plane represented by a Poincaré model is determined by a point ρ and an angle α, where ρ indicates the final position of the point that was the origin prior to the transformation and where α represents a rotation. The transformation of a point (x, y) is then $((\theta z+P)/(P^*\theta z+1))$, where z is a complex number with real part x and imaginary part y; P is the complex number representing ρ; θ is the complex number of magnitude one representing rotation by the angle α; and $P^*$ is the complex conjugate of P. The real and imaginary parts of the result are the x-and y-coordinates, respectively, of the transformed point ρ in the Poincaré model.

Given values defining a point p and the cosine and sine of an angle α, together represented by the four coordinates $(x, y, \theta_x, \theta_y)$, a transformation can be obtained by obtaining P as a complex number with real part x and imaginary part y and θ as a complex number with real part $\theta_x$ and imaginary part $\theta_y$.

To obtain a transformation from the origin to a point (x, y), a transformation can therefore be obtained from the point and direction (x, y, 1.0, 0.0), where the coordinates 1.0 and 0.0 indicate the rightward direction, the zero direction from which other directions are measured. This transformation is referred to herein as the "translator from the origin." Conversely, to obtain a transformation from a point (x, y) to the origin, a transformation can therefore be obtained from the point and direction (−x, −y, 1.0, 0.0). This transformation is referred to herein as the "translator to the origin."

The act in box 400 can obtain a first translator from the origin to the position of the parent node, then obtain the new x- and y-coordinates by applying the first translator to the x- and y-components of the distance D, $(D\theta_x, D\theta_y)$, where $(\theta_x, \theta_y)$ is the child direction described above. The act in box 400 can then obtain a second translator to the origin for the new x- and y- coordinates, and apply the second translator to the results of applying the first translator to the child direction $(\theta_x, \theta_y)$, to obtain the new values for $(\theta_x, \theta_y)$.

The new values for $(\theta_x, \theta_y)$ indicate the direction for the child node's wedge. The act in box 400 can obtain the angle of the next child's wedge by using the preliminary width $W_n$ and the distance D from box 394 or box 396. The act in box 400 can obtain a translator to the origin for the coordinates (D, 0.0), then apply this translator to $\cos W_n$ and $\sin W_n$, to obtain values that have a ratio R. The angle of the wedge can then be calculated as $((n/2) - \arctan R)$.

Finally, the act in box 400 can obtain the room available to be used in obtaining the room bound to be passed in the recursive call in box 364. The room available can be calculated using the distance D from box 394 or box 396 and the preliminary width $W_n$. The room available can then be calculated as $((s^2+1.0)^{1/2}-s)$, where $s=(((1.0-D^2)/2D)/(\sin W_n))$.

The act in box 402 then branches based on whether the room available from box 400 is greater than the down room from box 398. If so, the act in box 404 sets room bound to the value of room available. If not, the act in box 406 sets room bound to the value of down room.

Then, when every child of the current node has been handled by an iterative loop, the act in box 410 branches based on whether the room bound received in box 350 is greater than the down room from box 398. If so, the act in box 412 sets the node's radius to the value of room bound. If not, the act in box 414 sets the radius to the value of down room.

The operations in FIG. 10 result in approximately uniform spacings between nodes within a branch, because the base spacing S is a minimum below which spacings do not occur and because other spacings turn out to be not much larger than S, because they grow only slowly with the number of children of a node.

C.3.b. Mapping to Display Positions

Figure 11:
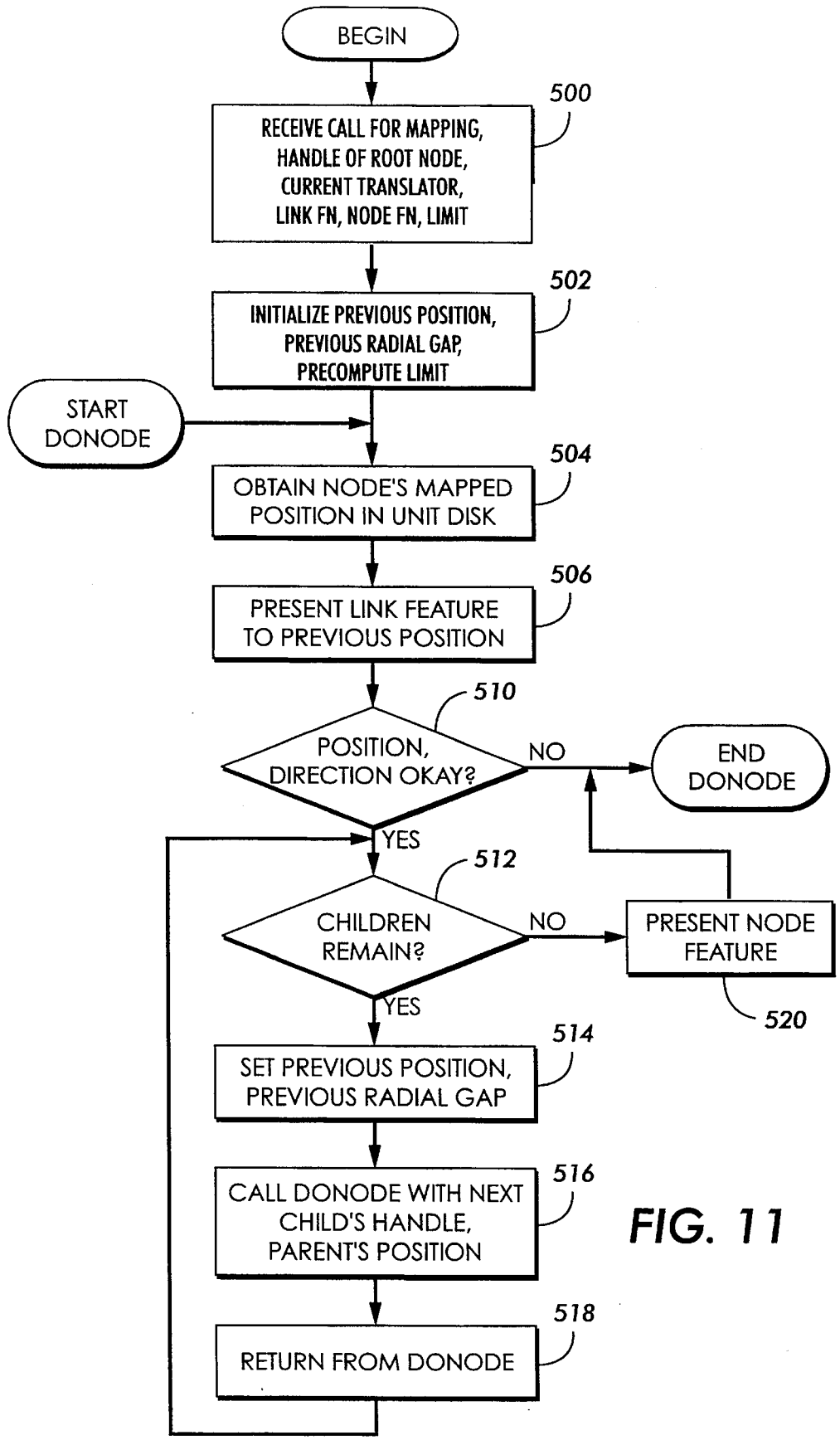
FIG. 11 is a flow chart showing acts in mapping from layout to display by the system of FIG. 6 implementing the technique of FIG. 7.
Figure 12:
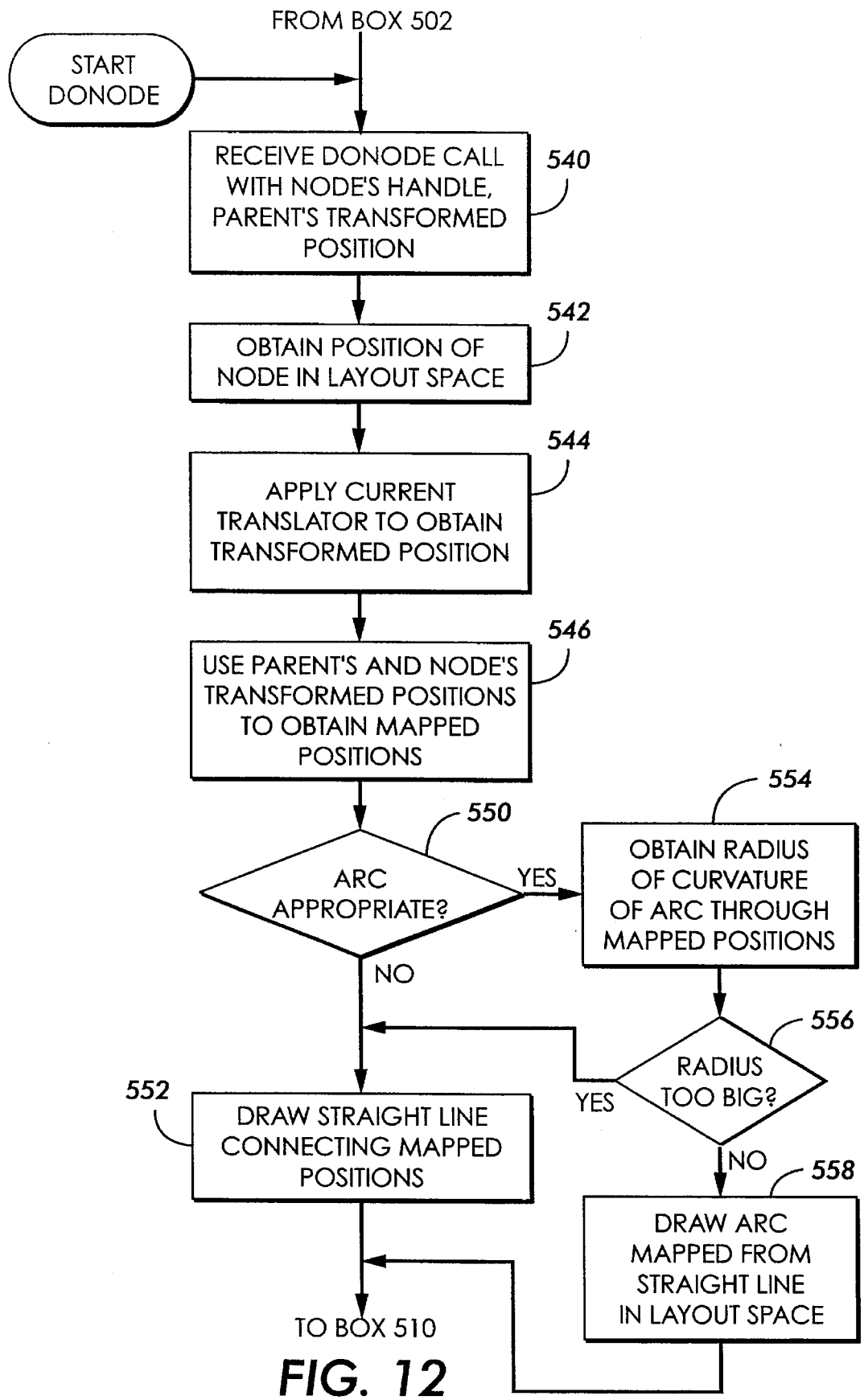
FIG. 12 is a flow chart showing acts that can obtain a node's mapped position in a unit disk and present a link feature in FIG. 11.
Figure 13:
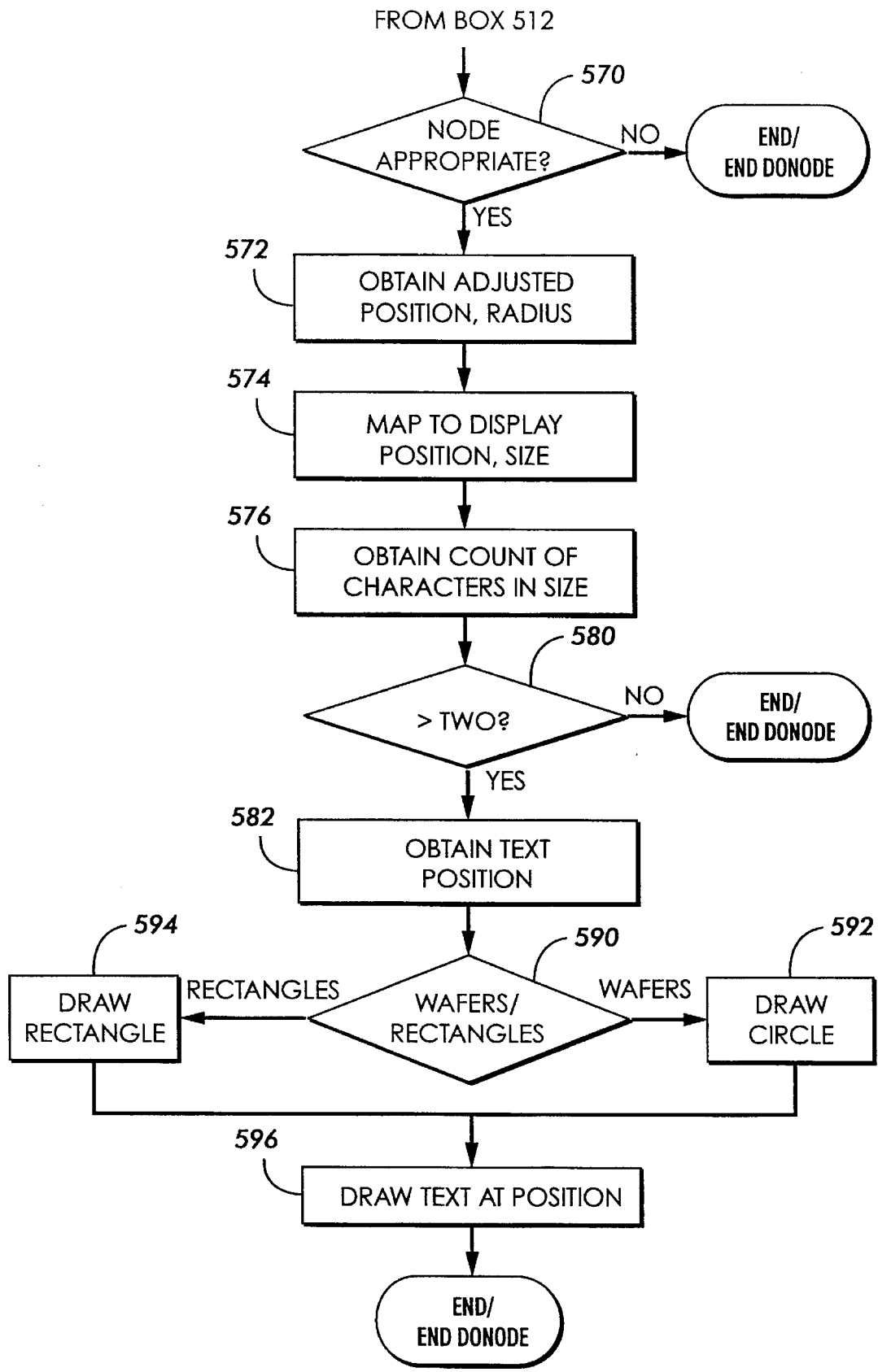
FIG. 13 is a flow chart showing acts that can present a node feature in FIG. 11.

FIGS. 11–13 illustrate operations mapping from a hyperbolic plane to a display region. FIG. 11 shows how mapping from layout space to display positions can be performed; the technique of FIG. 11 can be used to implement the acts in boxes 262 and 264 in FIG. 7, and a similar technique could be used to implement the acts in boxes 282 and 284 in FIG. 8. FIG. 12 shows how a node's mapped position on a unit disk can be obtained and also shows related operations in presenting a link feature. FIG. 13 shows operations in presenting a node feature.

The technique in FIG. 11 maps from the hyperbolic plane layout space described above to the unit disk, and from the unit disk to a circular display region. There are two canonical ways of mapping the hyperbolic plane to the unit disk. In both of them, one vicinity in the hyperbolic plane is in focus at the center of the disk while the rest of the hyperbolic plane fades off in a perspective-like fashion toward the perimeter of the disk. The projective mapping, or Klein model, takes lines in the hyperbolic plane to lines in the unit disk, but distorts angles. The conformal mapping, or Poincar é model, preserves angles, but distorts lines in the hyperbolic space into arcs on the unit disk.

It is easy to convert between the two mappings by recomputing the distance from the origin according to $r_e=((2r_p)/(1+r_p^2))$, and both have been tested experimentally for use in implementing the browser. The Poincaré model works much better, because it preserves the shapes of fan-outs at nodes and does a better job of using the screen real-estate. In addition, the arcs in the display give a hint of the kind of distortion that is occurring in mapping to the display. Therefore, the technique in FIG. 11 uses the Poincaré model. Rigid transformations of the hyperbolic plane correspond, under the Poincaré model, to linear fractional transformations on the complex plane that send the unit disk to itself. Ahlfors, L. V., *Complex Analysis*, McGraw-Hill, 1966, pp. 76–89, describes the theory of linear fractional transformations.

The Poincaré projection maps circles on the hyperbolic plane into circles on the Euclidean unit disk, though circles will shrink in size the further they are from the origin. The technique of FIG. 11 exploits this property by calculating a circle in the hyperbolic plane around each node that is guaranteed not to intersect the circle of any other node. When those circles are mapped onto the unit disk they provide a circular display region for each node in which to display a graphical or textual representation of the node. This can be combined with a facility that uses different representations for nodes depending on the amount of real space they receive.

In FIG. 11, the act in box 500 receives a call for mapping with the handle of the root node of a node-link structure, similarly to the act in box 350 in FIG. 9. The act in box 500 also receives a transformation, referred to as a current translator; a function for presenting link features, referred to as link function; a function for presenting node features, referred to as node function; and a limit value that is used to determine whether a node is too near to an edge for presentation of a node feature. For example, the limit value can be 0.07 if the call is made during a sequence of animated images, and can be the size of a pixel otherwise, calculated by taking the reciprocal of the radius of a circular display region to which mapping is being performed. If necessary for satisfactory animation, the limit can be adjusted to reduce the time necessary to render a presentation.

The act in box 502 begins mapping by initializing variables, including a variable to indicate a previous node feature's position and a variable to indicate the previous position's radial gap from a unit disk's perimeter. The act in box 502 can also precompute values to be used within a sequence of animated representations, such as a value for limit as discussed below.

The act in box 504 begins a recursive operation, referred to in FIG. 11 as DoNode, by obtaining the current node's mapped position (x, y) in the unit disk, using techniques described below. The mapped position is the current node's inverse image in the layout space. The act in box 506 then uses the current transformation to present a link feature which has been implemented as a line connecting the position from box 504 to the previous node feature's position.

The act in box 510 determines whether the position from box 504 is such that a node feature can be presented. This has been implemented by calculating a radial gap for the position from box 504, then comparing it with the precomputed limit from box 502 to determine whether it is a position too close to the unit disk's perimeter. To reduce computation within DoNode, the radial gap is calculated as $(1.0 -(x^2+y^2))$, because the value $(x^2+y^2)$ must also be computed for another purpose. The act in box 502 can use the limit from box 500 to obtain the precomputed limit, $(1.0 -(1.0 -\text{limit})^2)$. If the radial gap is less than the precomputed limit, the position from box 504 is too close to the unit disk's perimeter.

If the position from box 504 is too close to the perimeter, the act in box 510 also compares the radial gap with 95 percent of the previous position's radial gap to determine whether the current position is in a direction from its parent such that its children may be further from the unit disk's perimeter than the current position is. If the act in box 510 finds that the position and direction are both not okay, DoNode ends. But if the current position is not too close or if its children may be further from the perimeter than it is, a node feature representing the current node may be presented, so the act in box 512 begins an iterative loop that handles each of its children.

In preparation for a recursive call to DoNode, the act in box 514 begins each iteration by setting the previous node feature's position to the position from box 504 and by setting the previous position's radial gap to the radial gap calculated in box 510. These values are set locally within the iteration. Then, the act in box 516 makes a call to DoNode for the next child with the child's handle and with the parent's position from box 504. The act in box 518 returns from DoNode.

When all the children have been handled, so that each has a mapped position in the unit disk, the act in box 520 presents the current node's node feature before DoNode ends. Therefore, the node feature is painted over the link features presented in box 506. The node feature can be positioned by using the radius and mapped position of the node in the layout space to obtain a mapped region in the display plane, with the mapped region defined by a center and a radius as described below. If a wafers variable is on, the node feature includes a circle with the radius and text centered at the center, but if a text variable is on, the node feature includes a rectangle and text centered at the center.

The acts in boxes 506 and 520 each include presenting a feature on display 208. These acts can be implemented as appropriate for the specific display system being used, using conventional display driver techniques. In general, these acts make a constant transform from unit disk positions to display positions.

FIG. 12 shows how the acts in boxes 504 and 506 can be implemented.

The act in box 540 receives a DoNode call with a node's handle and a parent's transformed position. If the node is the root node, the parent's transformed position is taken as its own transformed position. Otherwise, the parent's transformed position has previously been obtained by applying the current translator as described below.

The act in box 542 uses the node's handle to obtain its position in the layout space, which can be obtained from the node's data structure as described in relation to box 372 in FIG. 9. The act in box 544 then applies the current translator from box 500 to the node's position from box 542, obtaining a transformed position in the layout space. The translator can be applied as described above in relation to box 400 in FIG. 10.

The link function from box 500 can be called with the parent's position from box 540 and with the transformed position from box 544 to perform the remaining acts in FIG. 12. The link function begins in box 546 by using the parent's transformed position and the current node's transformed position to obtain mapped positions. In a current implementation, with mapping to a circular display region of radius $R_d$ and centered at $(R_d, R_d)$ from the upper left corner of a window, the mapping for each coordinate c can be obtained by calculating a floor under $(cR_d+R_d+0.5)$. This mapping includes an implicit mapping from the layout space to a unit disk, which is done by taking the coordinates of the position in the layout space as x- and y-coordinates of a position on the unit disk. The unit disk position is then mapped to a display position with the above calculation.

The link function continues in box 550 by determining whether it is appropriate to display a link feature that is an arc. An arc may not be appropriate, for example, during an animation sequence, because an arc requires additional computation. Or an arc may not be appropriate if the difference between the mapped positions from box 546 is small, so that an arc will appear approximately as a line anyway. If an arc is not appropriate, the act in box 552 draws a straight line connecting the mapped positions from box 546.

If an arc is appropriate, the act in box 554 begins by calculating the arc's radius of curvature in the display space, using the parent's position $(x_p, y_p)$ from box 540 and the transformed position $(x_t, y_t)$ from box 544. The act in box 554 can be implemented by obtaining a center of curvature of the arc that passes through the two points and intersects the boundary circle at right angles. This is the arc that would be mapped from the line between the two points in the layout space. The calculations can then obtain radius of curvature.

The act in box 554 can first obtain the value $d=2(x_py_t-x_ty_p)$, then the two values $a=((1+x_t^2+y_t^2)/d)$ and $b=((1+x_p^2+y_p^2)/d)$. The center of curvature is the point $(x_c, y_c)$ such that $x_c=by_t-ay_p$, $y_c=ax_p-bx_t$. The radius of curvature can be calculated as the distance from the center of curvature to either the parent's transformed position $(x_p, y_p)$ or the current node's transformed position $(x_t, y_t)$.

The act in box 556 determines whether the radius of curvature from box 554 is too great for accurate drawing. If so, the act in box 552 draws a straight line, as described above. But if the radius is small enough, the act in box 558 uses conventional calculations to draw the arc as calculated in box 554 on the display.

After the act in box 552 or the act in box 558, the technique of FIG. 12 returns to box 510 in FIG. 11.

FIG. 13 shows how the act in box 520 in FIG. 11 can be implemented.

The act in box 570 in FIG. 13 begins by testing whether it is appropriate to present a node feature. This act can include determining whether a parameter is set to indicate that node features should be displayed or whether, for an animation sequence, whether a parameter is set to indicate that node features should not be displayed during animation. If presentation of a node feature is not appropriate, DoNode ends.

If presentation of a node feature is appropriate, the act in box 572 uses the position and radius of the current node from the data structure described in relation to box 372 to obtain a center position and a unit disk radius in the unit disk. The x- and y-coordinates of the center position can be obtained by multiplying each by $((1.0-rl^2)/(1.0-(x^2+y^2)rl^2))$, where rl is the radius of the current node, optionally adjusted to add a gap between nodes by multiplying by a number less than one such as 0.9. The act in box 572 can multiply the radius rl by $((1.0-(x^2+y^2))/(1.0-(x^2+y^2)rl^2))$ to obtain the unit disk radius $r_u$.

The act in box 574 then uses the center position and unit disk radius $r_u$ from box 572 to obtain a display position at the upper left corner of a bounding box around the corresponding circle on the display and to obtain a diameter of the corresponding circle on the display. The x- and y-coordinates of the upper left corner can each be obtained by using the coordinate c to calculate a floor under $(R_d(c-r_u)+R_d+0.5)$. The diameter can be obtained as the difference between a floor under the value $(R_d(x+r_u)+R_d+0.5)$ and a floor under the value $(R_d(x-r_u)+R_d+0.5)$.

The act in box 576 then obtains a count of how many characters fit into the size from box 574. The count can be obtained with a floor function on the size and a character size. The act in box 580 branches on whether the count is greater than two; if not, DoNode ends because there is insufficient size to present a meaningful text.

If the count is greater than two, the act in box 582 obtains a position for the text. For example, an x-coordinate can be the sum of the mapped x-coordinate and half the difference between the mapped size and the product of the character size with the number of characters in the text for the node. The y-coordinate can be a floor under $(R_{dy}+R_d+0.5)$, where y is the center y-coordinate from box 572.

The act in box 590 then branches based on whether a wafer or a rectangle should be presented. If a wafer, the act in box 592 draws a circle at the mapped position from box 574. If a rectangle, the act in box 594 draws one that fits around the text at the position from box 582. Then, the act in box 596 draws the text at the position from box 582, before DoNode ends.

As described below, the techniques in FIGS. 11–13 can also be used in responding to a request for a change in position.

C.3.c. Responding to Signals

Figure 14:
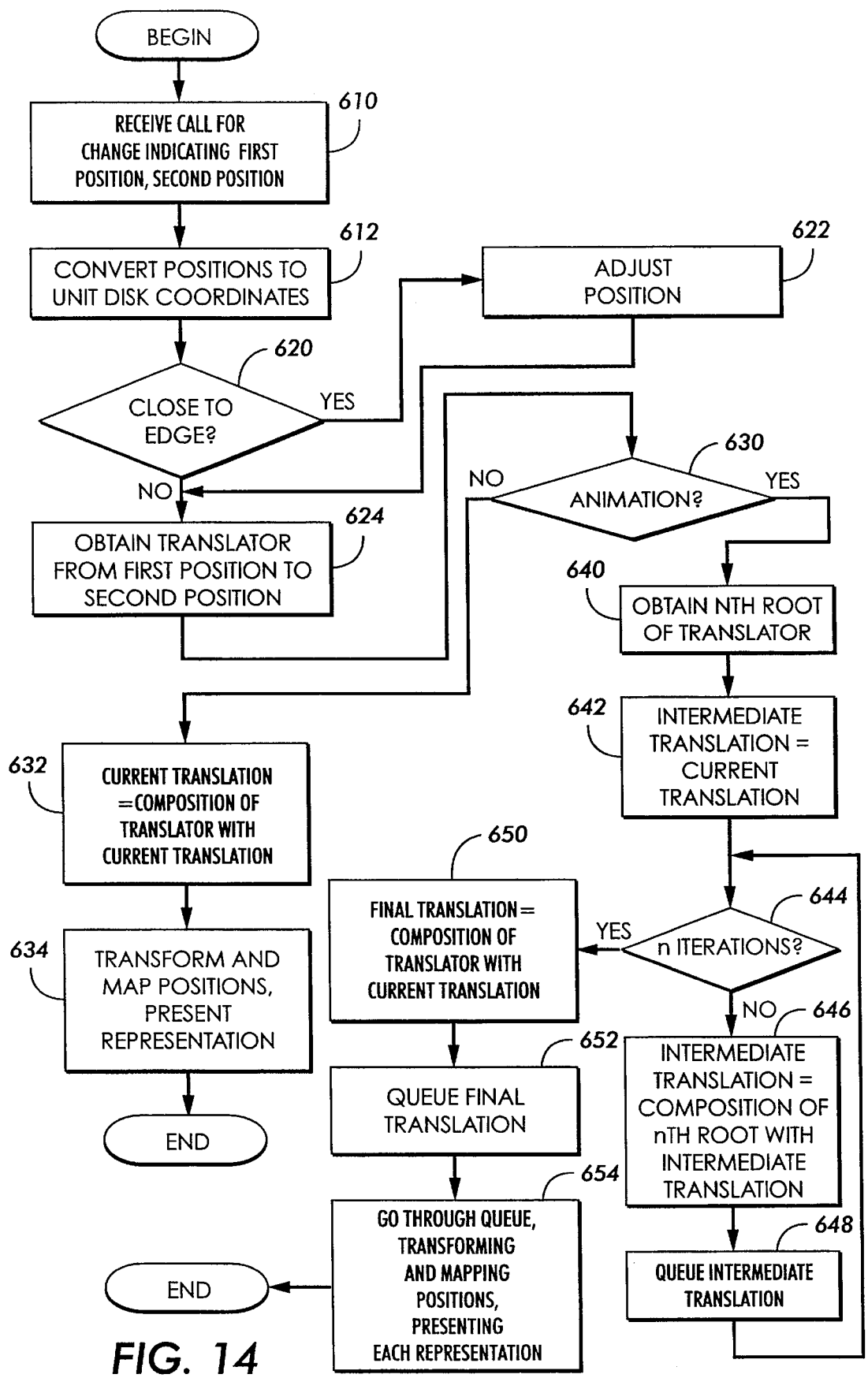
FIG. 14 is a flow chart showing acts in responding to a signal requesting change of position by the system of FIG. 5 implementing the technique of FIG. 7.
Figure 15:
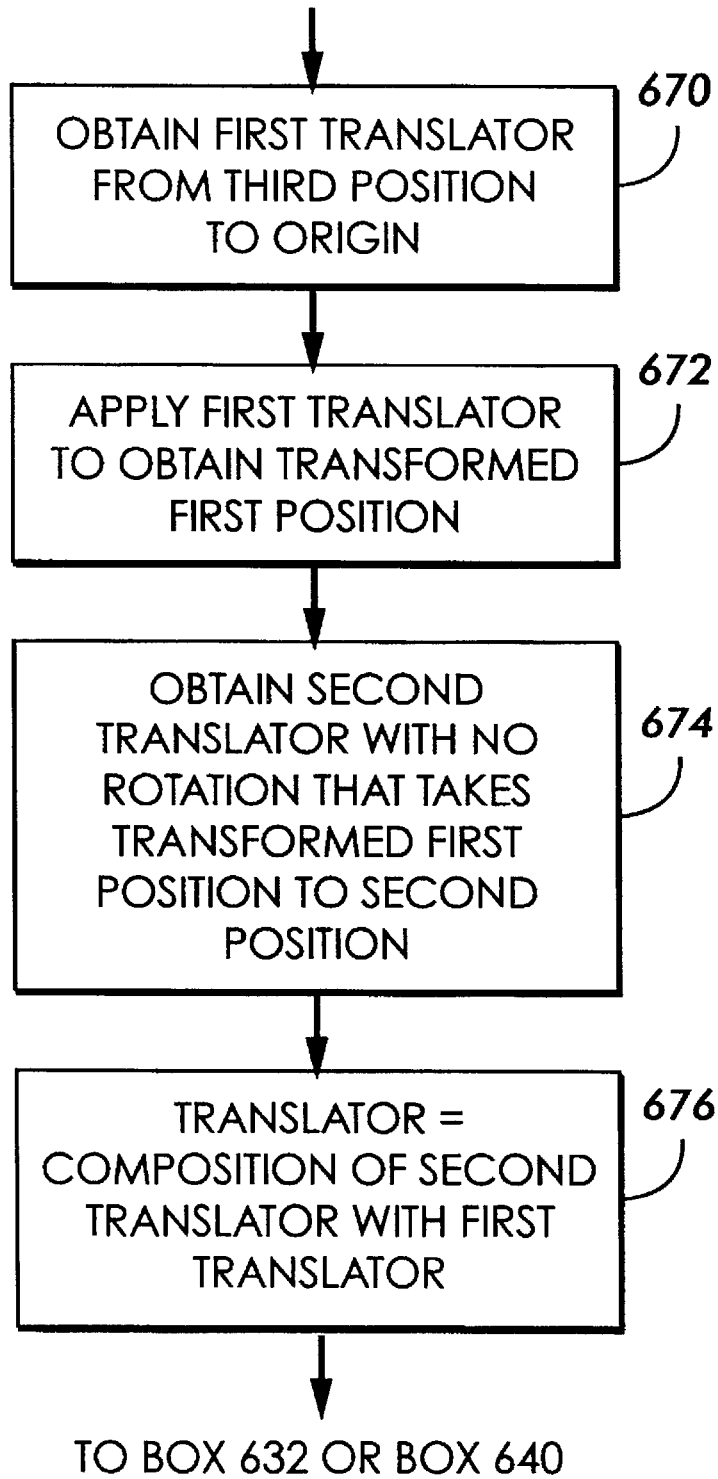
FIG. 15 is a flow chart showing acts that can obtain a translator that preserves orientation of a root node in FIG. 14.
Figure 16:
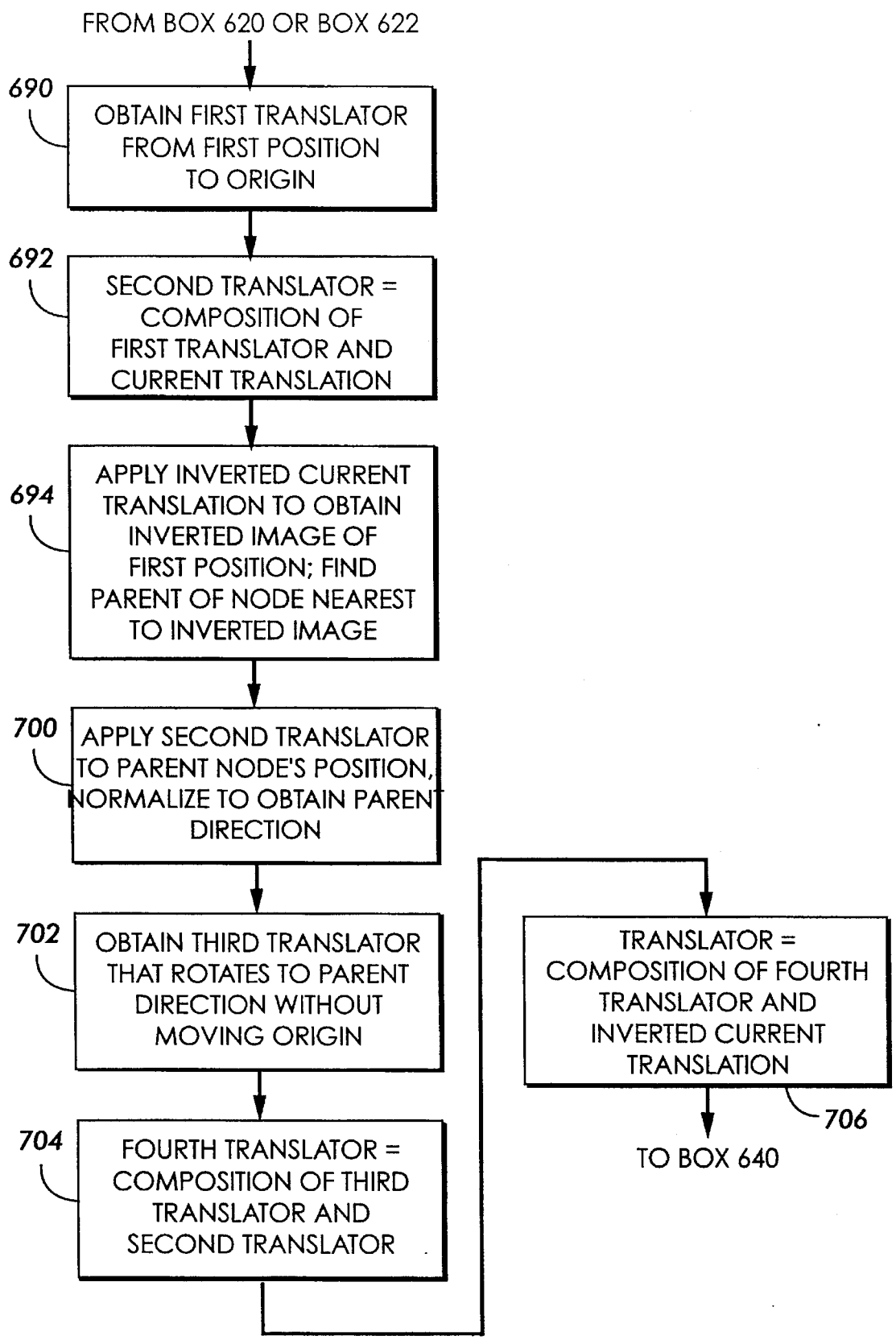
FIG. 16 is a flow chart showing acts that can obtain a translator that orients children of a node at the center of a region of greater spacings to the right in FIG. 14.

FIGS. 14–16 illustrate operations in responding to a signal from a user requesting a change in position of a representation. FIG. 14 shows how CPU 202 can respond to a signal from a user by mapping to layout space and obtaining and applying a transformation; the technique of FIG. 14 can be used to implement the acts in boxes 272, 274, and 276 in FIG. 7, and similar techniques could be used to implement the acts in boxes 292 and 294 in FIG. 8. FIG. 15 illustrates a way of obtaining a transformation from a first position to a second while preserving orientation of a root node. FIG. 16 illustrates a way of obtaining a transformation from a first position to a second while orienting children of a node at the center of a region of greater spacings to the right.

The technique of FIG. 14 translates the structure on the hyperbolic plane to provides a continuous, geometric way of moving focus. The user can easily browse the structure while maintaining the visual context of the entire structure. The user can change the focus either by clicking on any visible point to bring it into focus at the center, or by dragging any visible point interactively to any other position. In either case, the rest of the representation transforms appropriately. Regions that approach the center become magnified, while regions that were in the center shrink as they are moved toward the edge.

To compute the composition of two transformations, the point (0,0) can be transformed under the first transformation, and then the second transformation can be applied to the result. The same can then be done to the point (1,0). The images of those two points are enough to identify the composition, and the appropriate geometric operations can be computed straightforwardly from that information.

The act in box 610 in FIG. 14 receives a call for a change in position indicating a first position and a second position in the display region in which a representation is being presented. In a dragging operation, the first and second positions can be explicitly indicated. In a click operation, the first position can be the position of the click, and the second position can be the center of the display region.

The act in box 612 begins by converting the first and second positions from box 610 to unit disk coordinates to which hyperbolic geometry operations can be applied. In a current implementation, a representation is presented in a circular display region of radius r within a window, so that the act in box 612 can be implemented by dividing each coordinate by r, then subtracting 1.0.

The act in box 620 then tests whether either of the unit disk positions from box 612 is too close to the edge of the unit disk, e.g. within approximately 0.025 of the edge. If so, the act in box 622 adjusts the position that is too close to the edge, such as by multiplying each coordinate by the ratio of 0.97 to the distance from the origin to the position, thus slightly reducing each coordinate to move the position further from the edge.

The conversion in box 612 and, if necessary, the adjustment in box 622 produce an inverse image of the first position and an inverse image of the second position, both in the layout space.

The act in box 624 then obtains a translator, by finding a transformation in the layout space that will take the inverse image of the first position to the inverse image of the second position. The translator can be obtained using techniques described in more detail below.

The technique in FIG. 14 can follow two different paths, depending on whether animation is being performed or not, as illustrated by the act in box 630. In a dragging operation, animation may be unnecessary to produce a perception of continuity, but in a click operation, it may be necessary to break the change in position into an animated sequence of smaller steps that produce the perception of continuity.

If no animation is being performed, the act in box 632 obtains a new current translation by composing the translator from box 624 with the current translation, meaning the translation used to obtain the displayed representation from the layout data. The composition of a first translator with a second translator, each defined by a point $P_i$ and an angle of rotation $\theta_i$ where i indicates the translator, can be obtained by calculating the new values $P_n$ and $\theta_n$ as follows: $P_n=((P_1+P_2\theta_1)/(1.0+P_1*P_2\theta_1))$, where $P_1*$ is the complex conjugate of $P_1$, and $\theta_n=((\theta_2(\theta_1+P_1P_2*))/(1.0+P_1*P_2\theta_1))$. Composition does not commute, so the order in which translators is composed affects the resulting translation.

The act in box 634 applies the new current translation from box 632 to the layout data to obtain transformed positions, then maps the transformed positions and presents a representation as described above in relation to FIG. 11. Then the response to the call in box 610 ends.

If animation is being performed, the act in box 640 obtains the nth root of the translator from box 624 as described below. Then, the act in box 642 prepares for an iterative loop by initializing an intermediate translation to the current translation used to present the representation. The act in box 644 begins an iterative loop that is performed n times to obtain n intermediate translations. The act in box 646 composes the nth root from box 640 with the intermediate translation to obtain a new intermediate translation, using the composition technique described in relation to box 632. Then, the act in box 648 adds the new intermediate translation from box 646 to a queue of intermediate translations.

After n intermediate translations have been queued, the act in box 650 obtains a final translation by composing the translator from box 624 with the current translation used to present the representation. The act in box 652 adds the final translation to the queue, and the act in box 654 then goes through the queue, applying each translation to the layout data to obtain transformed positions, then mapping the transformed positions and presenting a representation as described above in relation to box 634, but with one representation for each queued translation. Then the response to the call in box 610 ends.

The act in box 640 can obtain the nth root as follows using the point $P_t$ and the angle of rotation $\theta_t$ of a translator: In order to determine which of three cases applies, the act in box 640 can obtain $d=(4|P_t|^2-|\theta_t-1|^2)$. The act in box 640 may also precompute certain values that are useful in more than one of the cases, such as $q_a=(|\theta_t-1|^2/|\theta_t+1|^2)$ and $q_b=(d/|\theta_t+1|^2)$.

If $d>0$, the act in box 640 can obtain $a_1=(\tanh((\mathrm{atanh}(qb^{1/2}))/n)/(qb^{1/2}))$; $t_1=a_1^2 q_a$; and $r_1=a_1((1+q_a)/(1+t_1))^{1/2}$.

If $d=0$, the act in box 640 can obtain similar values $t_2=(q_a/n^2)$ and $r_2=(((1+q_a)/(1+t_2))^{1/2}/n)$.

If $d<0$, the act in box 640 can obtain values $a_3=((\tan((\mathrm{atan}(-qb^{1/2}))/n))$; $t_3=(a_3^2|\theta_t-1|^2/(-d))$; and $r_3=(4t_3/((1+t_3)(|\theta_t-1|^2)))^{1/2}$.

Then, the act in box 640 can obtain the the angle of rotation $\theta_n$ of the nth root translator by first obtaining a complex raw angle $\theta_r$, which has a real part $((1-t_i)/(1+t_i))$ and an imaginary part $(2t_i^{1/2}/(1+t_i))$, where $t_i$ is the value for the applicable case as described above, and the branch cut for the complex square root is chosen to give the angle with the smaller absolute rotation. $\theta_r$ can then be normalized to have a magnitude of 1 to obtain $\theta_n$.

Finally, the act in box 640 can obtain the point $P_n$ of the nth root translator as $P_n=P_t r_i(\theta_n/\theta_t)^{1/2}$, where $r_i$ is the value for the applicable case as described above.

FIG. 15 shows how the act in box 624 could be implemented to obtain a translator from a first position $(x_1, y_1)$ to a second position $(x_2, y_2)$ while preserving orientation of a third position $(x_3, y_3)$. As shown, the acts in FIG. 15 follow either box 620 or box 622 in FIG. 14, and, in the current implementation, precede box 632 if performed in response to a dragging call and precede box 640 if performed in response to a click call. If called in response to a dragging call, the first position is the beginning position of the dragging motion and the second position is the ending position. If called in response to a click call, the first position is the position of the click and the second position is the origin of the unit disk. In either case, the third position is the current position of the root node, obtained by performing the current translation on the position (0, 0) in the layout space.

The act in box 670 obtains a first translator from the third position to the origin, and can be implemented as described above in relation to box 400 in FIG. 10. The act in box 672 then applies the first translator to the first position to obtain a transformed first position.

The act in box 674 obtains a second translator that has no rotation component and that takes the transformed first position $(x_a, y_a)$ to the second position $(x_b, y_b)$. The act in box 674 can be implemented by obtaining a translator with point $P_2$ and an angle of rotation (1.0, 0.0). The act in box 674 can obtain the real part of $P_2$ by obtaining the real part of the complex value $((B-A)(1+(AB)*)/(1-(|AB|*)^2)$. The act in box 674 can similarly obtain the imaginary part of $P_2$ by obtaining the imaginary part of the complex value $((B-A)(1-(AB)*)/(1-(|AB|*)^2)$. In these equations, $A=x_a+iy_a$ and $B=x_b+iy_b$.

The act in box 676 then obtains a translator that is the composition of the second translator from box 674 and the first translator from box 670. The translator from box 676 can then be used in the act in box 632 or in the acts in boxes 640 and 650 in FIG. 14.

FIG. 16 shows how the act in box 624 could be implemented to obtain a translator from a first position to a second position that is the origin, with the children of the node feature nearest the center of the region of greater spacings oriented to right. As shown, the acts in FIG. 16 follow either box 620 or box 622 in FIG. 14, and, in the current implementation, precede box 640 because they are only performed in response to a click call. The first position is the position of the click.

The act in box 690 obtains a first translator from the first position to the origin, and can be implemented as described above in relation to box 400 in FIG. 10. The act in box 692 obtains a second translator that is the composition of the first translator from box 690 and the current translation used to obtain the displayed representation.

The act in box 694 applies the inverted current transformation to obtain an inverted image of the first position. A transformation defined by a point P and an angle of rotation θ can be inverted by obtaining the transformation with the point (−Pθ*) and the angle of rotation θ*. The act in box 694 also uses the inverted image of the first position to find the parent of the nearest node.

The act in box 700 applies the second translator from box 692 to the position of the parent node from box 694 and normalizes the result to have a magnitude of one to obtain a parent direction ($\theta_x$, $\theta_y$). The act in box 702 then obtains a third translator that rotates the layout space to the parent direction without moving the origin. The third translator can have the point (0, 0) and the direction (−$\theta_x$, $\theta_y$).

The act in box 704 then obtains a fourth translator by taking the composition of the third translator from box 702 with the second translator from box 692. Then the act in box 706 obtains the translator by taking the composition of the fourth translator from box 704 and the inverted current translation. The translator from box 706 can then be used in the acts in boxes 640 and 650 in FIG. 14.

C.3. Variations

The implementations described above could be varied in many ways within the scope of the invention.

The implementations described above have been successfully executed on Sun SPARCStation workstation and an Apple Macintosh personal computer, but implementations could be executed on other machines.

The implementations described above have been successfully executed using the Common Lisp programming environment on both the Macintosh and Unix programming platforms, but other programming environments could be used, including non-object-oriented environments, and other platforms could be used, such as Windows.

The implementations described above operate on node-link data defining an organization chart, but could operate on node-link data defining any appropriate node-link structure. For example, the node-link data could define all web pages of a network within some limits, and could be obtained by converting the web pages to a tree using an appropriate pruning constraint.

The implementations described above present a representation in a circular display region, but a representation could be presented in any other appropriately shaped display region, such as an ellipse, through an appropriate mapping from the hyperbolic plane.

The implementations described above present representations of an entire node-link structure, but mappings could be performed that permit fly-through navigation by presenting partial representations of a structure.

The implementations described above show representations with a single region of greater spacings, but representations could be presented with two or more regions of greater spacings, to focus on more node features. Of particular interest is a dual focus representation in which the points (a, 0) and (−a, 0) in the Poincaré map become the centers of binocular-like regions of greater spacings. For this representation, a point z in the hyperbolic plane represented by a Poincaré maps to ((z (1−$a^2$)/(1−$a^2z^2$)) in the display space.

The implementations described above show node features that are rectangular or circular and link features that are lines such as arcs or straight lines, but representations could be presented with other types of node and link features. For example, greater use of display space may be obtained with oval or oblong node features that extend into otherwise unused display areas. Furthermore, the region assigned to a node in a hyperbolic plane or other layout space could have a non-circular shape.

The implementations described above receive user signals that are provided by activating keyboard and mouse buttons. The invention could be implemented to receive user signals that are provided in other ways, such as by using user input circuitry other than a keyboard and a mouse.

The implementations described above receive user signals indicating a dragging and clicking to bring a position to the origin. The invention could be implemented to receive user signals of other types, including signals requesting other changes in position of a node-link structure in a layout space.

The implementations described above employ a hyperbolic plane, but another space with negative curvature, such as a hyperbolic n-space, could be used as the layout space.

The implementations described above use complex numbers to represent positions in the hyperbolic plane, in part because continuous functions in complex numbers are conformal mappings. Positions in the hyperbolic plane could, however, be represented with other types of data or coordinates.

The implementations described above map from the hyperbolic plane to a unit disk and from the unit disk to a circular display region, but other types of mapping from a layout space to a display region could be used. For example, a mapping from the Poincaré model to the Klein model could be used, although such a mapping has not yet been satisfactorily performed in experiments.

In performing animation, the implementations described above use n steps, where n is a constant. The number of animation steps could instead be a variable that depends on the distance between the starting position and the ending position across which animated motion is occurring.

The implementation described above in relation to FIGS. 9–16 implements the technique in FIG. 7. The invention could be implemented according to the technique in FIG. 8, however, or in other ways to provided a browser interface.

In the implementations described above, acts are performed in an order that could be modified in many cases.

The implementations described above use currently available computing techniques, but could readily be modified to use newly discovered computing techniques as they become available.

D. Application

The invention has been applied in providing an interactive browser as described in copending, coassigned U.S. Patent Application No. 08/306,074, now still pending, entitled "Displaying Node-Link Structure with Region of Greater Spacings and Peripheral Branches," incorporated herein by reference. The invention could be applied in many other ways, including various other interactive browser applications.

In addition uniform layout of a node-link structure in a space with negative curvature may be applicable to interactive voice systems, and mappings may be performed from the layout space to sound renderings.

E. Source Code Appendices

Appendices A–C are Common Lisp source code implementing some of the features described above. The code in Appendices A–C, when executed on a Sun SPARCStation, generally follows the implementation described in relation to FIGS. 9–16 above. Nonetheless, the code may differ from the above description in various ways. For example, the code may be divided into procedures or routines differently than described above.

Appendix A, entitled animation-frame.lisp, and Appendix B, entitled hb-frame.lisp, implement browser interface program 234 in FIG. 6. Code in animation-flame.lisp extends the standard CLIM implementation to provide double-buffered animation and an animation queue.

Appendix C, entitled hb-math.cl, implements hyperbolic geometry program 236 in FIG. 6.

The function make-display-tree in hb-math.cl implements the acts in FIGS. 9 and 10.

The function do-tree-graphics in hb-math.cl implements the acts in FIG. 11, and is called by the method draw-io in hb-frame.cl, which also calls the methods make-text-fn and make-line-fn in hb-frame.cl to obtain functions that perform some of the acts in FIGS. 12 and 13.

The methods pointer-motion in hb-frame.cl and button-click in hb-frame.cl are examples of how the acts in FIG. 14 can be implemented. The method pointer-motion calls the method move-view in hb-frame.cl, which in turn calls the method make-orientation-preserving-transform in hb-math.cl to perform the acts in FIG. 15. The method button-click calls the method generate-animation-win in hb-frame.cl, which in turn calls the method generate-animation-disk in hb-frame.cl. The method generate-animation-disk calls either the function make-orientation-preserving-transform in hb-math.cl to perform the acts in FIG. 15 or the function make-translator-to-right-subtree in hb-math.cl to perform the acts in FIG. 16.

Other functions and methods are called by these functions and methods as indicated in the code.

F. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

APPENDIX A

```
a;;; -*- Mode: Lisp; Package: WS; Base: 10.; Syntax: Common-Lisp -*-
;;;
;;; Copyright (c) 1992-94 by Xerox Corporation.  All rights reserved.
;;;

(in-package :ws)

(defparameter *interpanel-space*    0)
(defparameter *panel-edge-space*    4)   ;; Inside the Edges of Panels.
(defparameter *backing-color*       *light-gray*)

(defmacro panelling (&rest args)
  `(raising (:thickness 3 :lighter-color *extra-light-gray*)
     (spacing (:background *backing-color*
               :space *panel-edge-space* )
        (vertically (:background *backing-color*)
          ,@args))))

;;;
;;; Animation-frame
;;;

(defun animate (frame)
  (start-frame frame)
  (allocate-bltbuf frame))

(defun animation-frame (io &rest settings)
  (make-frame 'animation-frame :frame-manager (find-frame-manager)
              :top-io io
              :user-settings settings))

(define-application-frame animation-frame ()
  ((bltbuf :initform nil :accessor frame-bltbuf)
   (pm-medium :initform nil :accessor frame-pm-medium)
   (top-io :initarg :top-io :initform nil :reader frame-top-io)
   (animation-pane :reader animation-pane)
   (timer-pane :reader timer-pane)
   (paint-event :reader paint-event)
   (time :initform 0 :accessor frame-time))
  (:pane (with-frame (frame)
           (build-panes frame)))

(:command-definer t)
  (:top-level t)

;; ?? Need to abstract animation frame to support application specific
  ;; commands
  ;; (:menu-group ())

(:settings :no-message t
             :no-commands t))

(defmethod initialize-instance :after
           ((frame animation-frame) &key &allow-other-keys)
  (setf (slot-value frame 'paint-event)
        `(execute-frame-command ,frame (com-paint-frame))))

(defmethod build-panes ((frame animation-frame))
  (with-slots (animation-pane timer-pane top-io)
      frame (managing-keyboard ()
      (accepting-keyboard ()
```

```
        (panelling
          (vertically ()
            (multiple-value-bind (width height) (compose-space top-io)
              (setf animation-pane
                (make-pane 'animation-pane :hs width :vs height
                           :hs +fill+ :vs +fill+))))
            (horizontally ()
             :fill
             (setf timer-pane
               (make-pane 'label-pane :text "0000 -- 0000"))))))))

(defmethod allocate-bltbuf ((frame animation-frame))
  (let ((pane (animation-pane frame))
        (bltbuf (frame-bltbuf frame))
        (pm-medium (frame-pm-medium frame)))

(when bltbuf
      (w::release-pixmap bltbuf))

(setf bltbuf
      (setf (frame-bltbuf frame)
        (make-pixmap :width (bounding-rectangle-width pane)
                     :height (bounding-rectangle-height pane)
                     :format :bitmap ;; ??? Need to make color
                     )))
    (unless pm-medium
      (setq pm-medium
        (setf (frame-pm-medium frame)
          (make-pixmap-medium :display-medium (sheet-medium pane)
                              :port (port frame)))))

(setf (medium-pixmap pm-medium) bltbuf)
    t))

(define-application-pane animation-pane ()
  ((recalculatep :initform t))
  (:pane-class ws::new-basic-clim-pane))

(defmethod sheet-region-changed ((sheet animation-pane) &key &allow-other-keys)
  (let ((frame (pane-frame sheet)))
    (allocate-bltbuf frame)
    (multiple-value-bind (width height) (bounding-rectangle-dimensions sheet)
      (region-changed (frame-top-io frame) width height))
    (setf (slot-value sheet 'recalculatep) t)))

(defmethod queue-input ((pane animation-pane) &rest args)
  (let* ((frame (pane-frame pane))
         (top-io (frame-top-io frame)))
    (when top-io
      (apply #'queue-input top-io :pane pane :frame frame args))))

(defvar *run-loop* nil)

(defmethod handle-repaint ((pane animation-pane) region &key &allow-other-keys)
  (declare (ignore region))
  (with-slots (recalculatep) pane
    (unless *run-loop*
      (execute-frame-command (pane-frame pane)
                             (if recalculatep
                                 '(com-paint-frame)
                                 '(com-repaint-frame))))))

(define-animation-frame-command com-snap-frame ()
```

```
(with-frame (frame)
    (let* ((pane (animation-pane frame))
           (top-io (frame-top-io frame))
           (xarray (slot-value top-io 'xarray))
           (yarray (slot-value top-io 'yarray))
           (x0 (aref xarray 0))
           (y0 (aref yarray 0))
           (x1 (1+ (aref xarray (1- (length xarray)))))
           (y1 (1+ (aref yarray (1- (length yarray)))))
           (bltbuf (frame-bltbuf frame))
           (new-bm (make-pixmap :width (- x1 x0)
                                :height (- y1 y0)
                                :format :bitmap ;; ??? Need to make color
                                ))
           (pm-medium (make-pixmap-medium :display-medium (sheet-medium pane)
                                          :port (port frame))))

(setf (medium-pixmap pm-medium) new-bm)
      (copy-area pm-medium 0 0 bltbuf x0 y0 (- x1 x0) (- y1 y0))
      (snap-frame new-bm))))

(define-animation-frame-command com-paint-frame (&optional moving)
  (with-frame (frame)
    (let* ((pane (animation-pane frame))
           (timer-pane (timer-pane frame))
           (top-io (frame-top-io frame))
           (bltbuf (frame-bltbuf frame))
           (w (pixmap-width bltbuf))
           (h (pixmap-height bltbuf))
           (pm-medium (frame-pm-medium frame))
           (medium (sheet-medium pane))
           (time (frame-time frame))
           (next-time (get-internal-real-time)))

(setf (frame-time frame) next-time)

(draw-rectangle* pm-medium 0 0 w h :filled t :ink *white*)

(when top-io
        (draw-io top-io pane pm-medium moving))

(copy-area medium 0 0 bltbuf 0 0 w h)
      (w::repaint-children pane (sheet-region pane))

(setf (slot-value pane 'recalculatep) nil)
      (port-force-output (port timer-pane))

(setf (pane-text timer-pane)
        (format nil "~4@a -- ~4@a" (- (get-internal-real-time) next-time)
                (if time
                    (- next-time time)
                  "???")))

(repaint-pane timer-pane)
      (port-force-output (port timer-pane))

(when *run-loop*
        (execute-frame-command frame '(com-paint-frame))
        (w::process-yield)))))

(define-animation-frame-command com-repaint-frame ()
  (with-frame (frame)
    (let* ((pane (animation-pane frame))
           (timer-pane (timer-pane frame))
           (bltbuf (frame-bltbuf frame))
           (w (pixmap-width bltbuf))
```

```
              (h (pixmap-height bitbuf))
              (medium (sheet-medium pane)))
         (copy-area medium 0 0 bitbuf 0 0 w h)
         (w::repaint-children pane (sheet-region pane))
         (repaint-pane timer-pane)
         (port-force-output (port pane))))))

(define-animation-frame-command com-step-frame (operation &rest further-steps)
  (with-frame (frame)
    (let* ((top-io (frame-top-io frame)))
      (animate-io top-io (animation-pane frame)
                  (first operation) (rest operation))

(unless *run-loop*
        (com-paint-frame frame (not (null further-steps))))

(if further-steps
          (progn
            (mp:process-allow-schedule)
            (queue-next-step frame further-steps))
          (setf (frame-time frame) nil)))))

(defmethod queue-next-step ((frame animation-frame) steps)
  (queue-event frame
               `(execute-frame-command ,frame (com-step-frame ,@steps))))

(defmethod loop-on ((frame animation-frame) val)
  (with-slots (paint-event) frame
    (setq *run-loop* val)
    (when *run-loop*
      (queue-event frame paint-event))))

;;;
;;; Interactive Objects
;;;

(defclass interactive-object (gesture-mixin
                              input-handler)
  ())

(defmethod draw-io ((io interactive-object) pane medium movingp)
  (declare (ignore pane medium movingp))
  (format t "No draw method for ~aJ~%" io))

(defmethod region-changed ((io interactive-object) width height)
  (format t "sheet changed: ~a -d -d-%" io width height))
```

APPENDIX B

```lisp
;;; -*- Mode: Lisp; Package: WINDSHIELD; Base: 10.; Syntax: Common-Lisp -*-
;;;
;;; Copyright (c) 1993 by Xerox Corporation.  All rights reserved.
;;;

(in-package :windshield)

;;;
;;; Top Level Access
;;;

(defun launch-hb (tree-data &rest args)
  (launch-frame
    (apply #'make-instance 'hyperbolic-frame
           :tree-data (or tree-data (user::uniform-tree 4))
           args)))

(defun find-hb ()
  (let ((frames (mapcar #'pane-frame (sheet-children (find-graft)))))
    (if (= (length frames) 1)
        (car frames)
        frames)))

(defparameter *default-radius* 300.0)
(defparameter *default-orientation* nil)

(defparameter *n-steps* 4)

(defvar *profile* nil)
(defvar *profile-type* :space)

;;;
;;; Math Utilities
;;;

(defun-inline disk-to-wind (float radius)
  (declare (optimize (speed 3) (safety 0) (compilation-speed 0))
           (type single-float radius)
           #+ignore (:explain :calls :types))
  (let ((float (coerce float 'single-float)))
    (declare (single-float float))
    (values (m:my-truncate (+ (* radius float) radius 0.5s0)))))

(defun-inline bdisk-to-wind (box radius)
  (declare (optimize (speed 3) (safety 0) (compilation-speed 0))
           (type (simple-array single-float (*)) box)
           (type single-float radius))
  (m:my-truncate (+ (* radius (aref box 0)) radius 0.5s0)))

(defmacro in-disk-to-wind (float radius)
  `(m:my-truncate (+ (* ,radius ,float) ,radius 0.5s0)))

(defun-inline wind-to-disk (int radius)
  (- (/ (float int) radius) 1.0))

;;;
;;; Frame
;;;

(define-application-frame hyperbolic-frame (animation-frame)
  ((radius :initarg :radius :initform *default-radius*)
   (orientation :initarg :orientation :initform *default-orientation*)
```

```
  (tree-data :initarg :tree-data)
  (delayed-steps :initform nil :accessor delayed-steps))
 (:pane (with-frame (frame)
          (with-slots (top-io tree-data radius orientation) frame
            (setf top-io (make-instance (frame-io-class frame)
                              :radius radius
                              :orientation orientation
                              :tree-data tree-data))
            (build-panes frame))))
 (:settings :no-commands t :title "Hyperbolic Browser")
 (:default-initargs :io-class 'hyperbolic-io))

(defmethod key-press ((frame hyperbolic-frame)
                      keysym char &key state code &allow-other-keys)
  (declare (ignore char))

(with-slots (delayed-steps) frame
    (let* ((port (port frame))
           (io (frame-top-io frame))
           (steps
            (gesture-case (keysym state port)
              (((:s :control) (com-snap-frame frame)
                              nil)

((:return)     (if delayed-steps
                                  (prog1
                                      (list (pop delayed-steps))
                                    (setq *movingp* (not (null delayed-steps))))
                                  (setf (feedback-text frame)
                                        "Last Frame")))
               ((:a :control) '(((:toggle-arcs)))
               ((:l :control) '(((:toggle-lines)))
               ((:w :control) '(((:toggle-wafers)))
               ((:t :control) '(((:toggle-text)))
               ((:g :control) '(((:toggle-text-on-move)))
               ((:o :control) '(((:orientation)))

((:p :control) (setf (photo-mode io) (not (photo-mode io)))
                              nil)

(otherwise
                (case code
                  (59 (generate-home-animation (frame-top-io frame) frame))
                  (otherwise
                   (format t "Key: ~a ~a~%" keysym code)
                   nil)))))))
      (when steps
        (queue-next-step frame steps)))))

;;;
;;; Hyperbolic IO
;;;

(defclass hyperbolic-io (interactive-object)
  (
                                        ; Note the types
   (radius :initarg :radius :type single-float)
   (height :initform nil :type fixnum)

(orientation :initarg :orientation)
   (display-tree)
   (tree-data :initarg :tree-data)

(nearest-node :initform nil)
```

```
(current-translation :initform (make-translator-to-origin 0.0 0.0))
(inverse-translation :initform nil)
(fast-tree :initform nil)
(dragging :initform nil)

(text-p     :initform t)
(text-on-move-p  :initform t)
(arcs-p    :initform t)
(lines-p   :initform nil)
(wafers-p  :initform nil)

(photo-mode :initform nil :accessor photo-mode)

(lastx)
(lasty)))

(defmethod initialize-instance :after ((obj hyperbolic-io)
                                        &key radius &allow-other-keys)

(setf (slot-value obj 'height) (round (* 2 radius)))
  (layout-io obj))

(defmethod compose-space ((io hyperbolic-io))
  (with-slots (radius) io
    (let ((diameter (integerize-coordinate (* 2 radius))))
      (values diameter diameter))))

(defmethod layout-io ((io hyperbolic-io))
  (with-slots (orientation display-tree tree-data) io
    (setf display-tree
      (ecase orientation
        ((nil)
         (make-display-tree 0.0 0.0 1.0 0.0
                            pi tree-data))
        (:right
         (make-display-tree 0.0 0.0 1.0 0.0
                            (/ pi 3) tree-data))
        (:bottom
         (make-display-tree 0.0 0.0 0.0 1.0
                            (/ pi 3) tree-data))))))

;;;
;;; Drawing Routines
;;;

(defvar *movingp* nil)

(defmethod draw-io ((io hyperbolic-io) pane medium movingp)
  (declare (optimize (speed 3))
           (ignore pane))

#+ignore
  (when *movingp*
    (setq movingp t))

(with-drawing-surface (medium)
    (draw-text* medium "" 0 0)
    (with-slots (display-tree height radius current-translation
                 arcs-p lines-p text-p text-on-move-p wafers-p) io
      (declare (single-float radius))
      (let ((radius radius)
            (text-p text-p)
            (text-on-move-p text-on-move-p))

(when display-tree
```

B=35

```
              (draw-rectangle* medium 0 0 height height :ink +white+)
              (set-ink +black+)
              (draw-arc 0 0 height height (* 2.0 pi) (* 2.0 pi))

(do-tree-graphics
                  display-tree (convert-translator-to-non-cons
                                 current-translation)
                  (make-line-fn io movingp)
                  (when (and text-p
                             (or text-on-move-p
                                 (null movingp)))
                    (make-text-fn io medium))
                  ;; do all the resolution that can be seen
                  (if movingp .07 (/ 1.0 radius))))))))

(defmethod make-text-fn ((io hyperbolic-io) medium)
  (with-slots (display-tree height radius current-translation
               arcs-p text-p text-on-move-p wafers-p) io
    (declare (single-float radius))
    (with-drawing-routines ()
      (let* ((text-style (medium-text-style medium))
             (charsz (string-width "M" text-style medium))
             (charht (text-style-height text-style medium))
             (ascent (text-style-ascent text-style medium))
             (radius radius)
             (wafers-p wafers-p)
             (rectangle-p t))

(flet ((text-fn (pt box-r info)
                 (declare (type (simple-array single-float (*)) pt box-r))
                 (let* ((x (aref pt 0))
                        (y (aref pt 1))
                        (r (aref box-r 0))
                        (xp (in-disk-to-wind (- x r) radius))
                        (yp (when (or wafers-p rectangle-p)
                              (in-disk-to-wind (- y r) radius)))
                        (size (- (in-disk-to-wind (+ x r) radius)
                                 xp))
                        (numchars (floor size charsz))
                        (str (if (listp info) (first info) info)))

(declare (single-float x y r))

(when (> numchars 2)
                     (let* ((text (if (<= (length str) numchars)
                                      str
                                      (subseq str 0 numchars)))

(tsize (* charsz (length text)))
                            (dx (truncate (- size tsize) 2))

(tx (+ xp dx))
                            (ty (in-disk-to-wind y radius)))

(if wafers-p
                           (progn
                             (set-ink +white+)
                             (draw-filled-arc xp yp size size 0.0
                                              (* 1.999 pi))
                             (set-ink +black+)
                             (draw-arc xp yp size size 0.0 (* 1.999 pi)))

(when rectangle-p
                           (set-ink +white+)
                           (draw-rectangle (- tx 3) (- ty ascent 3)
                                           (+ tsize 6) (+ charht 6) t)
```

```
                              (set-ink +black+)
                              (draw-rectangle (- tx 3) (- ty ascent 3)
                                              (+ tsize 6) (+ charht 6))))
                        (draw-glyphs tx ty text))))))

#'text-fn)))))

(defmethod make-line-fn ((io hyperbolic-io) movingp)
  (with-slots (display-tree height radius current-translation
               arcs-p lines-p text-p text-on-move-p wafers-p) io
    (declare (single-float radius))
    (with-drawing-routines ()
      (flet ((line-fn (pt1 pt2)
               (declare (type (simple-array single-float (*)) pt1 pt2))
               (let* ((x1 (aref pt1 0))
                      (y1 (aref pt1 1))
                      (x2 (aref pt2 0))
                      (y2 (aref pt2 1))
                      (x1p (in-disk-to-wind x1 radius))
                      (y1p (in-disk-to-wind y1 radius))
                      (x2p (in-disk-to-wind x2 radius))
                      (y2p (in-disk-to-wind y2 radius)))

(declare (single-float x1 y1 x2 y2))

(if (or lines-p
                         (unless arcs-p
                           movingp)
                         (>= (if movingp 100 10)
                             (+ (abs (- x1p x2p))
                                (abs (- y1p y2p)))))
                     ;; the arc is too small to calculate accurately, so
                     ;; draw a line
                     (draw-line x1p y1p x2p y2p)

(let ((clockwise (find-center pt1 pt2)))
                     (let ((xc (aref pt1 0))
                           (yc (aref pt1 1)))
                       (declare (single-float xc yc))
                       (let ((r (m:my-sqrt (+ (* (- x1 xc) (- x1 xc))
                                              (* (- y1 yc) (- y1 yc))))))
                         (if (or (> r 4.0))
                             ;; The arc is too big to get the endpoints
                             ;; accurate, so
                             ;; Draw a line
                             (draw-line x1p y1p x2p y2p)

;; draw the arc that corresponds to a straight
                           ;; line in the hyperbolic geometry
                           (let* ((xp (in-disk-to-wind (- xc r) radius))
                                  (yp (in-disk-to-wind (- yc r) radius))
                                  (size (- (in-disk-to-wind (+ xc r) radius)
                                           xp))
                                  (theta1 (m:my-atan (- yc y1) (- x1 xc)))
                                  (theta2 (m:my-atan (- yc y2) (- x2 xc))))
                             (when (not clockwise)
                               (psetq theta1 theta2
                                      theta2 theta1))
                             (when (< theta1 0.0)
                               (setq theta1 (+ theta1 (* 2 pi))))
                             (when (< theta2 0.0)
                               (setq theta2 (+ theta2 (* 2 pi))))
                             (let ((diff (- theta2 theta1)))
                               (when (< diff 0)
                                 (setq diff (+ diff (* 2 pi))))
                               (draw-arc xp yp size size theta1 diff))))))))))))
```

```
        #'line-fn))))

;;;
;;; Input Handling
;;;

(defmethod button-press ((pane hyperbolic-io) button-name
                         &key x y &allow-other-keys)
  (with-slots (height display-tree lastx lasty dragging arcs) pane
    (setq y (- height y))
    (setf lastx x
          lasty y)
    (setf ;; arcs nil
          dragging t)))

(defmethod button-click ((io hyperbolic-io) button-name
                         &key frame x y &allow-other-keys)
  (with-slots (height photo-mode steps) io (if photo-mode
        (setf (delayed-steps frame)
              (generate-animation-win io x (- height y)))
      (queue-next-step frame
                       (generate-animation-win io x (- height y))))))

(defmethod pointer-motion ((io hyperbolic-io) &key frame x y &allow-other-keys)
  (with-slots (radius height display-tree lastx lasty dragging
               inverse-translation current-translation
               nearest-node) io
    (cond (dragging
           (setq y (- height y))
           (move-view frame io x y lastx lasty)
           (setf lastx x lasty y))
          (t (setq y (- height y))
           (unless inverse-translation
             (setf inverse-translation
                   (invert-translator current-translation)))

(let ((new
                  (multiple-value-call #'find-nearest-node display-tree
                                       (transform inverse-translation
                                                  (wind-to-disk x radius)
                                                  (wind-to-disk y radius))))))

(unless (eq nearest-node new)
               (setf nearest-node new)
               (setf (feedback-text frame)
                 (let ((info (node-info nearest-node)))
                   (if (listp info)
                       (second info)
                     info))))))))

(defmethod button-release ((io hyperbolic-io) button-name
                           &key x y &allow-other-keys)
  (declare (ignore button-name x y))
  (with-slots (dragging) io
    (setf dragging nil)))

(defmethod move-view (frame (io hyperbolic-io) x y &optional lastx lasty)
  (with-slots (radius display-tree current-translation inverse-translation) io
    (let* ((x (wind-to-disk x radius))
           (y (wind-to-disk y radius))
           (lastx (when lastx (- (/ (float lastx) radius) 1)))
```

```
            (lasty (when lasty (- (/ (float lasty) radius) 1))))

(let ((r2 (+ (* x x) (* y y))))
      (when (> r2 .95)
        ;; too close to the edge, bring it in
        (let ((adjustment (/ .97 (sqrt r2))))
          (setq x (* x adjustment))
          (setq y (* y adjustment)))))

(when lastx
      (let ((lastr2 (+ (* lastx lastx) (* lasty lasty))))
        (when (> lastr2 .95)
          ;; too close to the edge, bring it in
          (let ((adjustment (/ .97 (sqrt lastr2))))
            (setq lastx (* lastx adjustment))
            (setq lasty (* lasty adjustment))))))

(setf current-translation
      (compose-translators
        (if lastx
            (multiple-value-call
                #'make-orientation-preserving-translator
              lastx lasty x y
              (transform current-translation 0.0 0.0))
            (multiple-value-call
                #'make-orientation-preserving-translator
              x y 0.0 0.0
              (transform current-translation 0.0 0.0)))
        current-translation))
    (setf inverse-translation nil)
    (com-paint-frame frame)
    t)))

(defmethod generate-home-animation ((io hyperbolic-io) frame)
  (with-slots (current-translation) io
    (multiple-value-bind (x y) (transform current-translation 0.0 0.0)
      (generate-animation-disk io x y))))

(defmethod generate-animation-win ((io hyperbolic-io) wx wy)
  (with-slots (radius current-translation) io
    (let* ((x (wind-to-disk wx radius))
           (y (wind-to-disk wy radius))
           (r2 (+ (* x x) (* y y))))
      (when (> r2 .95)
        ;; too close to the edge, bring it in
        (let ((adjustment (/ .97 (sqrt r2))))
          (setq x (* x adjustment))
          (setq y (* y adjustment))))
      (generate-animation-disk io x y))))

(defmethod generate-animation-disk ((io hyperbolic-io) x y)
  (with-slots (current-translation display-tree orientation) io
    (with-collection
      (let* ((delta-tr (calculate-delta-tr io x y))
             (nth-root (nth-root-of-translator delta-tr *n-steps*))
             (cum-tr current-translation))
        (when *profile*
          (collect `(:start-profiler)))

(dotimes (i *n-steps*)
          (setq cum-tr (compose-translators nth-root cum-tr))
          (collect `(:slide ,cum-tr)))
        (collect `(:slide ,(compose-translators delta-tr current-translation)
                          t))))))
```

```
(defmethod calculate-delta-tr ((io hyperbolic-io) x y)
  (with-slots (orientation display-tree current-translation) io
    (ecase orientation
      (:bottom (error "need a translor for bottom trees"))
      (:right (make-translator-to-right-subtree
                x y
                display-tree current-translation))
      ((nil)
        (multiple-value-call
           #'make-orientation-preserving-translator
          x y 0.0 0.0
          (transform current-translation 0.0 0.0))))))

(defmethod animate-io ((io hyperbolic-io) pane operation values)
  (flet ((feedback (str)
           (setf (feedback-text (pane-frame pane))
             str)))
    (with-slots (current-translation inverse-translation arcs
                 orientation wafers-p text-p text-on-move-p arcs-p
                 lines-p) io
      (ecase operation
        (:slide (setf current-translation (first values)
                      inverse-translation nil)

(when (second values)
                  (when *profile*
                    (prof:stop-profiler))))

(:start-profiler (prof:start-profiler :type *profile-type*))

(:orientation (setf orientation
                        (ecase orientation
                          (:bottom :right)
                          (:right nil)
                          ((nil) :right)))
                      (layout-io io))
        (:toggle-wafers (setf wafers-p (not wafers-p))
                        (feedback (format nil "Wafers are ~a"
                                    (if wafers-p "on" "off"))))
        (:toggle-arcs   (setf arcs-p (not arcs-p))
                        (feedback (format nil "Arcs during motion are ~a"
                                    (if arcs-p "on" "off"))))

(:toggle-lines  (setf lines-p (not lines-p))
                        (feedback (format nil "Lines ~a"
                                    (if lines-p "on" "off"))))
        (:toggle-text-on-move
          (setf text-on-move-p (not text-on-move-p))
          (feedback (format nil "Text during motion is ~a"
                      (if text-p "on" "off"))))

(:toggle-text   (setf text-p (not text-p))
                        (feedback (format nil "Text is ~a"
                                    (if text-p "on" "off"))))))))
```

APPENDIX C

```
(in-package :windshield)

;;; --------------- Geometry utilities ----------------

;;; Normalize a direction to unit distance
(defun normalize (x y)
   (let ((r (sqrt (+ (* x x) (* y y)))))
     (values (/ x r) (/ y r))))

;;; Return the coordinates of the center of the circle that goes through
;;; the two points and intersects the unit circle at right angles.
;;; Also return a boolean indicating whether going from point 1 to point 2
;;; moves in a clockwise direction.
;;;
;;; If the two initial points are represented by complex numbers, a and b,
;;; then the answer, c, must satisfy |c|^2 - 1 = |a-c|^2 = |b-c|^2, which
;;; holds when c = i(a(1+|b|^2) - b(1+|a|^2))/(ab^ - ba^)
;;; where a^ is the complex conjugate of a.
;;;
;;; To avoid consing, the center is returned in the first argument array
;;; and all computations are done in terms of the components of the complex
;;; arguments.
;;;
(defun find-center (pt1 pt2)
  (declare (optimize (speed 3))
           (type (simple-array single-float (*)) pt1 pt2))
  (let ((ar (aref pt1 0))
        (ai (aref pt1 1))
        (br (aref pt2 0))
        (bi (aref pt2 1)))
    (declare (single-float ar ai br bi))
    (let ((denom (* 2.0 (- (* ar bi) (* br ai)))))
      (declare (single-float denom))
      (let ((a-factor (/ (+ 1.0 (+ (* br br) (* bi bi))) denom))
            (b-factor (/ (+ 1.0 (+ (* ar ar) (* ai ai))) denom)))
        (declare (single-float a-factor b-factor))
        (setf (aref pt1 0) (- (* b-factor bi) (* a-factor ai))
              (aref pt1 1) (- (* a-factor ar) (* b-factor br)))
        (> denom 0.0)))))

;;; ----------- Hyperbolic geometry stuff ----------------

;;; add two distances, represented as hyperbolic tangents, returning a new
;;; hyperbolic tangent.
(defun add-distances (d1 d2)
  (/ (+ d1 d2) (+ 1.0 (* d1 d2))))

;;; divide a distance, represented a hyperbolic tangent, by two, returning a new
;;; hyperbolic tangent.
(defun half-distance (d)
  (/ d (+ 1.0 (sqrt (- 1.0 (* d d))))))

;;; --- private internal definition, used only by the transformation code ---
;;; Represents the transformation of the complex plane that is a rotation
;;; by theta followed by moving the origin to point and -point to the
;;; origin while preserving the unit circle.
;;; That is: (Tz+P)/(P^Tz+1), where P^ is the complex conjugate of P
;;; |T|=1 and |P|<1.
(defstruct (trans (:conc-name trans-)
                  (:constructor make-trans))
  point
  theta)

;;; return the transform that does a rotation that takes 1,0 to theta-x,
```

```
;;; theta-y, and then maps the origin to x,y
(defun make-transform-from-reals (x y theta-x theta-y)
  (make-transform-from-complex (complex x y)
                               (complex theta-x theta-y)))

(defun make-transform-from-complex (point theta)
  (make-trans :point point
              :theta (/ theta (abs theta))))  ; makes sure theta is normalized.

(defun transform (transform x y)
  (let ((Tz (* (trans-theta transform) (complex x y)))
        (P (trans-point transform)))
    (let ((ans (/ (+ Tz P) (+ 1.0 (* (conjugate P) Tz)))))
      (values (realpart ans) (imagpart ans)))))

(defun transform-complex (transform z)
  (let ((Tz (* (trans-theta transform) z))
        (P (trans-point transform)))
    (/ (+ Tz P) (+ 1.0 (* (conjugate P) Tz)))))

;;; Convert a transform to a function that takes an array as an argument, and
;;; returns the transformed point in the array.
;;;
;;; Implementation note: since at every step of the following computation,
;;; all numbers are between -4 and 4, this computation can be done in fixed
;;; point using integer arithmetic if that turns out to be faster.
;;;
(defun convert-translator-to-non-cons (transform)
  (let ((P (trans-point transform))
        (theta (trans-theta transform)))
    ;; get the coefficients for expressing the transform as
    ;; (z+P/T)/(P^z+1/T), which reduces the number of multiplies
    (let ((P/T (/ P theta))
          (1/T (/ 1.0 theta)))
      (let ((Pr (coerce (realpart P) 'single-float))
            (P.i (coerce (imagpart P) 'single-float))
            (P/Tr (coerce (realpart P/T) 'single-float))
            (P/Ti (coerce (imagpart P/T) 'single-float))
            (1/Tr (coerce (realpart 1/T) 'single-float))
            (1/Ti (coerce (imagpart 1/T) 'single-float)))
        (declare (single-float Pr P.i P/Tr P/Ti 1/Tr 1/Ti))
        (function
          (lambda (array)
            (declare (type (simple-array single-float (*)) array))
            (let ((zr (aref array 0))
                  (zi (aref array 1)))
              (declare (single-float zr zi))
              ;; get the numerator and denominator of the fraction
              (let ((Nr (+ zr P/Tr))
                    (Ni (+ zi P/Ti))
                    (Dr (+ (+ (* zr Pr) (* zi P.i)) 1/Tr))
                    (Di (+ (- (* zi Pr) (* zr P.i)) 1/Ti)))
                (declare (single-float Nr Ni Dr Di))
                (let ((normD2 (+ (* Dr Dr) (* Di Di))))
                  (declare (single-float normD))
                  (setf (aref array 0)
                        (/ (+ (* Nr Dr) (* Ni Di)) normD2))
                  (setf (aref array 1)
                        (/ (- (* Ni Dr) (* Nr Di)) normD2))
                  t)))))))))

;;; Make a translator that preserves circles and the unit circle and
;;; that takes the given point to 0,0 and preserves directions from the
;;; given point.
```

```
(defun make-translator-to-origin (x y)
   (make-transform-from-reals (- x) (- y) 1.0 0.0))

;;; Make a translator that preserves circles and the unit circle and
;;; that takes 0,0 to the given point and preserves directions from the
;;; given point.
(defun make-translator-from-origin (x y)
   (make-transform-from-reals x y 1.0 0.0))

;;; Return the translator that is the equivalent of doing t1 on the result of t2.
;;; if the original translator is given by P1, T1 and P2, T2, then let
;;; D = T1P1^P2+1, and the answer is (T1T2+T2P1P2^)/D, (T1P2+P1)/D.
(defun compose-translators (transform1 transform2)
   (let ((P1 (trans-point transform1))
         (T1 (trans-theta transform1))
         (P2 (trans-point transform2))
         (T2 (trans-theta transform2)))
     (let ((denom (+ 1.0 (* T1 (conjugate P1) P2))))
       (make-transform-from-complex
         (/ (+ P1 (* T1 P2)) denom)
         (/ (* T2 (+ T1 (* P1 (conjugate P2)))) denom)))))

;;; Return the translator that is the inverse of the argument translator.
;;; if the original translator is given by P, T, then the answer is
;;; -T^P, T^
(defun invert-translator (transform)
   (let ((P (trans-point transform))
         (theta-conj (conjugate (trans-theta transform))))
     (make-transform-from-complex (- (* theta-conj P)) theta-conj)))

;;; Return a translator which when composed n times is equivalent to tr.
;;; Implementation notes:
;;;   the sqrt to compute new-P is a complex square root.
;;;   tanh(x) = (e^x - e^-x)/(e^x + e^-x)
;;;   atanh(x) = log(sqrt((1+x)/(1-x)))
(defun nth-root-of-translator (transformation n)
   (let ((P (trans-point transformation))
         (theta (trans-theta transformation)))
     (let ((N2P (let ((n (abs P))) (* n n)))
           (N2T-1 (let ((n (abs (- theta 1.0)))) (* n n)))
           (N2T+1 (let ((n (abs (+ theta 1.0)))) (* n n))))
       ;; N2P = |P|^2
       ;; N2T-1 = |theta-1|^2 = 4sin^2(angle/2).
       ;; N2T+1 = |theta+1|^2 = 4cos^2(angle/2)
       (let ((tan2newT/2 0.0)
             (P-ratio 0.0))
         (let ((diff (- (* 4.0 N2P) N2T-1)))
           ;; The following code varies for the different cases in part
           ;; because there are different formulas, and in part because
           ;; numerical stability requires different approaches in the
           ;; different cases.
           (if (> diff -.000001)
               ;; parabolic or hyperbolic transform
               (let ((tan2T/2 (/ N2T-1 N2T+1))
                     (ratio
                       (if (< diff .000001)
                           (/ 1.0 n) ;parabolic transform
                           ;;hyperbolic transform
                           (let ((arg (sqrt (/ diff N2T+1))))
                             (/ (tanh (/ (atanh arg) n)) arg)))))
                 (setq tan2newT/2 (* tan2T/2 ratio ratio))
                 (setq P-ratio (* ratio (sqrt (/ (+ 1.0 tan2T/2)
                                                  (+ 1.0 tan2newT/2))))))
               ;; elliptic transform
               (progn
                 (setq tan2newT/2
```

```
              (let ((temp
                      (tan (/ (atan (sqrt (- diff)) (sqrt N2T-1)) n))))
                 (/ (* temp temp N2T-1) (- diff))))
              (setq P-ratio (sqrt (/ (* 4.0 tan2newT/2)
                                     (* (+ 1.0 tan2newT/2) N2T-1))))))
           (let ((new-theta (complex (/ (- 1.0 tan2newT/2) (+ 1.0 tan2newT/2))
                                     (* (/ (* 2.0 (sqrt tan2newT/2))
                                           (+ 1.0 tan2newT/2))
                                        (let ((temp (signum (imagpart theta))))
                                          (if (zerop temp) 1.0 temp))))))
             (let ((new-P (* P P-ratio (sqrt (/ new-theta theta)))))
               (make-transform-from-complex new-P new-theta))))))

;;; make a translator that moves x1,y1 to x2,y2, while preserving the
;;; orientation of the point xr,yr
(defun make-orientation-preserving-translator (x1 y1 x2 y2 xr yr)
  (let ((to-origin (make-translator-to-origin xr yr)))
    ;; the answer is the composition of a translator that takes xr,yr to
    ;; the origin and a transform with no rotation component that takes the
    ;; transformed x1,y1 to original x2,y2
    (compose-translators
      (let ((A (transform-complex to-origin (complex x1 y1)))
            (B (complex x2 y2)))
        ;; We need to solve (A+P)/(P*A+1) = B for P.
        ;; That means P-P*AB = B-A
        ;; The solution is Re(P) = Re((B-A)(1-(AB)^))/(1-|AB|^2)
        ;;                 Im(P) = Im((B-A)(1-(AB)^))/(1-|AB|^2)
        (let ((AB (* A B))
              (B-A (- B A)))
          (let ((denom (- 1.0 (+ (* (realpart AB) (realpart AB))
                                 (* (imagpart AB) (imagpart AB))))))
            (make-transform-from-complex
              (complex (/ (realpart (* B-A (+ 1.0 (conjugate AB)))) denom)
                       (/ (imagpart (* B-A (- 1.0 (conjugate AB)))) denom))
              (complex 1.0 0.0)))))
      to-origin)))

;; Give an estimate of the total amount of motion required in doing the
;; transformation.  This is the distance the origin moves in hyperbolic
;; space in following the transformation plus half the angle rotated
;; through.  This gives a good estimate of the maximum screen motion.
(defun transform-motion (transformation)
  (let ((P (trans-point transformation))
        (theta (trans-theta transformation)))
    (let ((NP (abs P))
          (NT-1 (abs (- theta 1.0)))
          (NT+1 (abs (+ theta 1.0))))
      ;; NP = |P|
      ;; NT-1 = |theta-1| = 2sin(angle/2).
      ;; NT+1 = |theta+1| = 2cos(angle/2)
      (+ (let ((diff (- (* 4.0 NP NP) (* NT-1 NT-1))))
           (let ((arg (sqrt (abs diff))))
             (if (< arg .000001) (/ (* 2.0 NP) NT+1) ;parabolic transform
                 (* 2.0 (/ NP arg)
                    (if (> diff 0.0)
                        (atanh (/ arg NT+1)) ; hyperbolic transform
                        (atan arg NT+1))))) ; parabolic transform
         (atan NT-1 NT+1)))))

;;; Given that we are assigned a wedge of space that spans an angle of
;;; 2*angle, find  how far to move into the wedge so that we end up
;;; dist from either edge.
(defun find-space (dist angle)
  (let ((s (/ (- 1.0 (* dist dist))
              (* 2.0 dist))))
    (let ((ssin (* s (sin angle))))
```

```
                (- (sqrt (+ (* ssin ssin) 1.0)) ssin))))

;;; The inverse of the above function:
;;; Given that we have moved a distance dist into an angle that spans
;;; 2*angle, find how far we are from the edge of the angle (in terms of
;;; the atan)
(defun room-available (moved angle)
  (let ((ssin (/ (- 1.0 (* moved moved))
                 (* 2.0 moved))))
    (let ((s (/ ssin (sin angle))))
      (- (sqrt (+ (* s s) 1.0)) s))))

;;; Given that we were assigned a wedge of space that spans an angle of
;;; 2*angle, and have now moved dist into the wedge, return how much of an
;;; angle we can veer off the bisector without intersecting the original wedge.
(defun inside-angle (dist angle)
  (- (/ pi 2)
     ;; we are calling atan with the arguments reversed, so we
     ;; have to reflect the answer.
     (multiple-value-call
      #'atan (transform (make-translator-to-origin dist 0.0)
                        (cos angle) (sin angle)))))

;;; Starting at location x,y, move in the direction x-theta,y-theta
;;; for a distance dist (measured by its hyperbolic tangent -- ie, at the origin).
;;; Return the new point and the new direction (as seen from the origin).
(defun move-in-direction (x y theta-x theta-y dist)
  (let ((from-origin (make-translator-from-origin x y)))
    (multiple-value-bind
     (new-x new-y)
     (transform from-origin (* dist theta-x) (* dist theta-y))
     (multiple-value-bind
      (new-theta-x new-theta-y)
      (multiple-value-call #'transform (make-translator-to-origin new-x new-y)
                           (transform from-origin theta-x theta-y))
      (values new-x new-y new-theta-x new-theta-y)))))

;;; rotate the direction by the given angle
(defun rotate-direction (theta-x theta-y angle)
  (let ((sin (sin angle))
        (cos (cos angle)))
    (values (- (* theta-x cos) (* theta-y sin))
            (+ (* theta-y cos) (* theta-x sin)))))

;;; ================================================================
;;;
;;; Display Trees
;;;

(defvar *spacing* .12)

;;; Return the relative amount of space to give tree, compared to its siblings
;;; in a layout.
(defun node-weight (tree)
  (labels ((log-look-ahead
            (tree n)
            (case n
              (1 1.0)
              (2 (max 1.0 (log (+ 1.0 (length (cdr tree))))))
              (t (max 1.0
                      (log (+ 1.0 (reduce
                                   #'(lambda (accum tree)
                                       (+ accum (log-look-ahead
                                                 tree (- n 1))))
```

```
                                        (cdr tree)
                                        :initial-value 0.0))))))))
        (log-look-ahead tree 3)))

;;;
;;; Display Tree Nodes
;;;

(defstruct (display-node (:conc-name node-)
            (:constructor make-node))
  info
  x
  y
  room
  children)

;;; make a display tree at the position given by x and y,
;;; with its leaves in the direction dir-x,dir-y
;;; spanning an angle of twice width.
;;; room, if included, is how far this node is from any other node.
;;; All nodes of the tree will have a circle of radius at least *spacing* that
;;; doesn't intersect the circle of any other node.
;;; the tree argument is of the form (name . subtrees)
;;; the display tree is of the form (name x y radius . subtrees)
(defun make-display-tree (x y dir-x dir-y width tree &optional (room 0.9))
  (let ((name (car tree))
        (kids (cdr tree))
        children)
    (when kids
      (let ((weights (mapcar #'node-weight kids)))
        (let ((angle-fraction (/ width (reduce #'+ weights))))
          (let ((dist (max     ; dist is how far to move away from the parent
                       ;; keep away from siblings
                       (find-space *spacing* (* (reduce #'min weights)
                                                angle-fraction))
                       ;; keep away from the parent
                       (add-distances *spacing* *spacing*)))
                (last-width 0.0))
            (let ((down-room (half-distance dist)))
              (multiple-value-setq
                  (dir-x dir-y)
                (rotate-direction dir-x dir-y (- width)))

(setq children
                    (mapcar
                     #'(lambda (tree weight)
                         (let ((width (* weight angle-fraction)))
                           (multiple-value-setq
                               (dir-x dir-y)
                             (rotate-direction dir-x dir-y (+ last-width width)))
                           (setq last-width width)
                           (multiple-value-call
                               #'make-display-tree
                             (move-in-direction x y dir-x dir-y dist)
                             (inside-angle dist width) tree
                             (min down-room (room-available dist width)))))
                     kids weights))
              (setq room (min room down-room)))))))

(make-node :info name
               :x (coerce x 'single-float)
               :y (coerce y 'single-float)
               :room (coerce room 'single-float)
               :children children)))
```

```
;;; Given the root of a layed out tree, and a point, return the node of the
;;; tree that is layed out closest to the given point. Also return the
;;; coordinates of the node's parent.  (If the root is the closest node,
;;; return a psuedo-parent located in the direction from which layout
;;; proceeded.
(defun find-nearest-node (tree x y)
  (let ((xy-to-origin (make-translator-to-origin x y)))
    (labels
        ;; give the distance between the node and the point.
        ((dist (node)
           (multiple-value-bind (x y)
               (transform xy-to-origin (node-x node) (node-y node))
             (+ (* x x) (* y y))))
         ;; we know that the node is at or below either n1 or n2, whose
         ;; parents are p1 and p2 respectively. If st1 is true, then n1
         ;; is known to be closer than any descendants, same for st2.
         (recurse (n1 p1 st1 n2 p2 st2)
           (let* ((kids (node-children n1))
                  (n-kids (length kids)))
             (when (null kids) (setq st1 t))
             (if st1
                 (if st2
                     ;; one of these two nodes must be best
                     (if (< (dist n1) (dist n2))
                         (values n1 p1) (values n2 p2))
                     ;; see if we can progess on the other front
                     (recurse n2 p2 st2 n1 p1 t))
                 ;; get the direction to the parent
                 (let ((tr (make-translator-to-origin (node-x n1) (node-y n1))))
                   (multiple-value-bind (dx dy)
                       (transform tr (node-x p1) (node-y p1))
                     ;; fn to compute the angle from the node to a point
                     ;; relative to the direction from the parent.
                     (flet ((get-angle (x y)
                              (multiple-value-bind (x y) (transform tr x y)
                                ;; atan is more than actually needed; any
                                ;; monotonic function would do.
                                (atan (- (* x dy) (* y dx))
                                      (- (+ (* x dx) (* y dy)))))))
                       ;; find the first child past the given point
                       (let ((past
                               (let ((angle (get-angle x y)))
                                 (dotimes (i n-kids n-kids)
                                   (let ((kid (nth i kids)))
                                     (when (> (get-angle (node-x kid) (node-y kid))
                                              angle)
                                       (return i)))))))
                         (if (or (= past 0) (= past n-kids))
                             ;; it's one of the extremes.
                             (let ((kid (nth (min past (- n-kids 1)) kids)))
                               (if (> (dist kid) (dist n1))
                                   (recurse n2 p2 st2 n1 p1 t)
                                   (recurse n2 p2 st2 kid n1 nil)))
                             ;; pursue just the wedge
                             (let ((kid1 (nth (- past 1) kids))
                                   (kid2 (nth past kids)))
                               (if (and (> (dist kid1) (dist n1))
                                        (> (dist kid2) (dist n1)))
                                   (values n1 p1)
                                   (recurse kid1 n1 nil kid2 n1 nil)))))))))))))
      (let ((root-parent (make-node :info "dummy"
                                    ;; kludge alert: assumes all trees are
                                    ;; layed out to the right!
                                    :x -1.0s0
                                    :y 0.0s0
                                    :room .9s0
```

```
                              :children nil))))
         (recurse tree root-parent nil tree root-parent t)))))

;;; given a point, and the display tree and its current translator,
;;; return a translator that will translate the given point to the origin
;;; and will have the leaves of the central subtree go to the right.
;;;
(defun make-translator-to-right-subtree (x y tree current)
  (let ((inv (invert-translator current))
        (tentative (compose-translators
                     (make-translator-to-origin x y) current)))
    (multiple-value-bind
        (node parent)
        (multiple-value-call #'find-nearest-node tree (transform inv x y))
      (declare (ignore node))
      (multiple-value-bind
          (dir-x dir-y)
          (multiple-value-call
            #'normalize
            (transform tentative (node-x parent) (node-y parent)))
        (compose-translators
         (compose-translators
          (make-transform-from-reals 0.0 0.0 (- dir-x) dir-y)
          tentative)
         inv)))))

;;; Issue graphic calls to display the display tree under the specified translation.
;;; The calls are to line-fun with the coordinates of two points on the unit disk,
;;; and to text-fun with the coordinates of a point, a radius, and a text string.
;;; The text-fun will be called after all the lines are drawn, and it has
;;; exclusive control over the circle centered about the point of the given
;;; radius.
;;; The functions are not called if the points are closer to the edge than limit (defvar *zoom-factor* 1.0)

(defun do-tree-graphics (tree box-translation line-fun text-fun limit)
  (declare (optimize (speed 3) (safety 0) (space 0)))
  (let ((limit (let ((limit (coerce limit 'single-float)))
                 (declare (single-float limit))
                 (- 1.0 (* (- 1.0 limit) (- 1.0 limit)))))
        (zoom-factor (coerce *zoom-factor* 'single-float))
        (pt-array (make-array 2 :element-type 'single-float))
        (old-pt-array (make-array 2 :element-type 'single-float))
        (gap-array (make-array 1 :element-type 'single-float)))
    (declare (single-float limit zoom-factor)
             (type (simple-array single-float (2)) pt-array old-pt-array)
             (type (simple-array single-float (1)) gap-array))
    (labels
        (;; put the location of node in pt
         ((node-to-pt (node pt)
            (declare (type (simple-array single-float (2)) pt))
            (let ((x (node-x node))
                  (y (node-y node)))
              ;; set pt to the zoomed version of the tree location
              (declare (single-float x y))
              (let ((r2 (+ (* x x) (* y y))))
                (declare (single-float r2))
                (let ((factor (let ((dilation (- 1.0 r2)))
                                (declare (single-float dilation))
                                (/ (* 2.0 zoom-factor)
                                   (+ (the single-float
```

```
                                  (sqrt (- (* dilation dilation)
                                          (* 4.0 r2
                                             zoom-factor zoom-factor))))
                                dilation)))))
            (declare (single-float factor))
            (setf (aref pt 0) (* factor x)
                  (aref pt 1) (* factor y)))))
      (funcall box-translation pt))

;; this routine also takes a point, old-pt in *old-pt-array*,
  ;; and a distance, old-gap, in *gap-array*.
  ;; these are passed in arrays to avoid consing numbers.  How stupid.
  (recurse (tree)
    (let ((old-gap (aref gap-array 0)))
      (declare (single-float old-gap))
      (node-to-pt tree pt-array)
      (let* ((x (aref pt-array 0))
             (y (aref pt-array 1)))
        (declare (single-float x y))
        (let ((dist2 (+ (* x x) (* y y))))
          (declare (single-float dist2))
          (funcall line-fun old-pt-array pt-array)
          (let ((gap (- 1.0 dist2)))
            (declare (single-float gap))
            (unless (and (< gap limit)
                         (< gap (* old-gap .95)))
              (mapc #'(lambda (sub-tree)
                        (setf (aref old-pt-array 0) x
                              (aref old-pt-array 1) y
                              (aref gap-array 0) gap)
                        (recurse sub-tree))
                    (node-children tree))
              (when text-fun
                (let ((r (* 0.9 (the single-float (node-room tree))
                             zoom-factor)))
                  (declare (single-float r))
                  (let ((r2 (* r r)))
                    (declare (single-float r2))
                    (let ((quotient (- 1.0 (* dist2 r2))))
                      (declare (single-float quotient))
                      (let ((ratio (/ (- 1.0 r2) quotient)))
                        (declare (single-float ratio))
                        (setf (aref pt-array 0) (* x ratio)
                              (aref pt-array 1) (* y ratio)
                              (aref gap-array 0) (/ (* r (- 1.0 dist2))
                                                   quotient))
                        (funcall text-fun
                                 pt-array gap-array
                                 (node-info tree)))))))))))))))

(node-to-pt tree old-pt-array)
  (setf (aref gap-array 0) 0.0)
  (recurse tree))))
```

What is claimed:

1. A method comprising:

obtaining layout data; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch;

using the layout data to present a first representation of the node-link structure on a display;

receiving a signal from a user; the signal indicating a change from a first display position to a second display position; the first representation including a first feature near the first display position, the first feature representing a first part of the node-link structure; and in response to the signal, presenting a second representation of the node-link structure on the display; the second representation including a second feature representing the first part of the node-link structure, the second feature being presented near the second display position; the second representation being perceptible as a changed continuation of the first representation.

2. The method of claim 1 in which the space with negative curvature is a discrete approximation of a hyperbolic plane.

3. The method of claim 2 in which the layout data indicate, for each of the set of nodes, first and second coordinates; the first and second coordinates together indicating a position in the hyperbolic plane.

4. The method of claim 3 in which each of the first and second coordinates is between zero and one; the act of operating the processor to use the layout data to present a first representation of the node-link structure comprising:

using the layout data to obtain mapped data that indicate, for each of a subset of the set of nodes, the first and second coordinates indicated for the node by the layout data; the first coordinate indicating position along a first axis within a planar unit disk and the second coordinate indicating position along a second axis within the planar unit disk, the second axis being perpendicular to the first axis.

5. The method of claim 1 in which the node-link structure is an acyclic graph.

6. The method of claim 5 in which the node-link structure is a tree.

7. The method of claim 1 in which the branch is an exponentially growing branch.

8. The method of claim 1 in which the act of using the layout data to present a first representation of the node-link structure comprises:

using the layout data to obtain mapped data indicating positions in a region of the display for a subset of the nodes; and using the mapped data to provide first representation data to the display, the first representation data causing presentation of the first representation in the region of the display; the first representation including, for each node in the subset, a node feature representing the node.

9. The method of claim 8 in which the act of using the layout data to obtain mapped data comprises performing projective mapping to a planar unit disk.

10. The method of claim 8 in which the act of using the layout data to obtain mapped data comprises performing conformal mapping to a planar unit disk.

11. The method of claim 10 in which the layout data indicate, for each of the mapping's subset of nodes, first and second coordinates; the first and second coordinates together indicating a position in the space with negative curvature; each of the first and second coordinates being between zero and one; the act of using the layout data to obtain mapped data comprising:

obtaining mapped data that indicate, for each of the subset of nodes, the first and second coordinates indicated for the node by the layout data; the first coordinate indicating position along a first axis within the planar unit disk and the second coordinate indicating position along a second axis within the planar unit disk, the second axis being perpendicular to the first axis.

12. The method of claim 8 in which the region of the display has a perimeter; the act of using the layout data to obtain mapped data comprising, for one of the nodes that is a child node of one of the parent nodes and that has descendant nodes:

using the layout data to map the parent node's position in the layout space to a first display position in the region of the display;

using the layout data to map the child node's position in the layout space to a second display position in the region of the display; and if the second display position is within a minimum spacing from the perimeter of the region and, from the relation between the first and second display positions, it is unlikely that any of the descendant nodes are further than the minimum spacing from the perimeter, excluding the child node and its descendant nodes from the subset of nodes.

13. The method of claim 12 in which the region of the display is circular.

14. The method of claim 1 in which the act of presenting the first representation comprises:

obtaining first transformation data indicating a first rigid transformation of the layout space that moves the positions indicated by the layout data to first transformed positions; and using the first transformation data to obtain first transformed position data; the first transformed position data indicating transformed positions in the layout space for parts of the node-link structure, the transformed positions having a relation to the positions indicated by the layout data equivalent to the first rigid transformation;

the first transformed position data indicating a position for the first part of the node-link structure such that a feature representing the first part would be presented near the first display position;

the act of presenting a second representation comprising:

obtaining second transformation data indicating a second rigid transformation of the layout space that would move a first transformed position that maps to the first display position to a second transformed position that maps to the second display position; and using the second transformation data to obtain second transformed position data; the second transformed position data indicating transformed positions in the layout space for parts of the node-link structure, the transformed positions having a relation to the positions indicated by the first transformed position data equivalent to the second rigid transformation; the second transformed position data indicating a position for the first part of the node-link structure such that a feature representing the first part would be presented near the second display position.

15. The method of claim 14 in which the second transformation data indicate a second rigid transformation that preserves in the second representation an orientation of features in the first representation that represent parts of the node-link structure.

16. The method of claim 15 in which the first part is a parent node with at least one child node that is related to the parent node through one link; the first transformed position data indicating positions for the parent node and for its child nodes so that the child nodes together have a first orientation with respect to the parent node; the second transformation data indicating a second rigid transformation; the second transformed position data indicating positions for the parent node and for its child nodes so that the child nodes' positions together have a second orientation with respect to the second parent node's position; the first and second orientations being approximately equal.

17. The method of claim 16 in which the node-link structure is a tree with a root node; the first part being the root node.

18. The method of claim 14 in which the first and second representations each include a region of greater spacings in which node features have nearest node spacings that are in general perceptibly greater than in other regions; the first representation including in its region of greater spacings a first parent node with at least one child node that is related to the first parent node through one link; the first transformed data indicating transformed positions for the first parent node and for its child nodes so that the child nodes together have a first orientation with respect to the first parent node in the first representation; the second representation including in its region of greater spacings a second parent node with at least one child node that is related to the second parent node through one link; the second transformation data indicating a second rigid transformation such that the second transformed position data indicate positions for the second parent node and for its child nodes so that the child nodes together have a second orientation with respect to the second parent node in the second representation; the first and second orientations being approximately equal.

19. The method of claim 1, further comprising a series of iterations in response to the signal; each iteration comprising:

presenting an intermediate representation of the node-link structure; the intermediate representation including features representing parts of the node-link structure, the features including an intermediate first part feature representing the first part; the intermediate first part feature having a position between the first display position and the second display position;

the iterations being performed such that the intermediate first part features in the intermediate representations and the second feature in the second representation are all perceptible as moved continuations of the first feature in the first representation.

20. The method of claim 1 in which the first part is a node.

21. A method of operating a machine; the machine including:

memory;

user input circuitry for providing data indicating signals from a user;

a display;

a processor connected for accessing data stored in the memory, for receiving data from the user input circuitry, and for providing data to cause presentation of images by the display; and layout data stored in the memory; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch;

the method comprising:

operating the processor to use the layout data to provide first representation data to the display, the first representation data causing the display to present a first representation of the node-link structure;

receiving a signal from a user; the signal indicating a change from a first display position to a second display position; the first representation including a first feature near the first display position, the first feature representing a first part of the node-link structure; and in response to the signal, operating the processor to automatically provide second representation data to the display, the second representation data causing the display to present a second representation of the node-link structure on the display; the second representation including a second feature representing the first part of the node-link structure, the second feature being presented near the second display position; the second representation being perceptible as a changed continuation of the first representation.

22. The method of claim 21 in which the user input circuitry comprises a pointer control device that controls a pointer presented on the display; the signal from the user including a button click when the pointer is at the second display position.

23. The method of claim 22 in which the signal from the user further includes an action moving the pointer to the second display position.

24. A machine comprising:

memory;

user input circuitry for providing data indicating signals from a user;

a display;

a processor connected for accessing data stored in the memory, for receiving data from the user input circuitry, and for providing data to cause presentation of images by the display;

layout data stored in the memory; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch; and program data stored in the memory; the program data indicating instructions the processor executes; the processor, in executing the instructions:

using the layout data to provide first representation data to the display, the first representation data causing the display to present a first representation of the node-link structure;

receiving a signal from a user; the signal indicating a change from a first display position to a second display position; the first representation including a first feature near the first display position, the first feature representing a first part of the node-link structure; and in response to the signal, automatically providing second representation data to the display, the second representation data causing the display to present a second representation of the node-link structure on the display; the second representation including a second feature representing the first part of the node-link structure, the second feature being presented near the second display position; the second representation being perceptible as a changed continuation of the first representation.

25. An article of manufacture for use in a system that includes:

memory;

a storage medium access device;

user input circuitry for providing data indicating signals from a user;

a display;

a processor connected for accessing data stored in the memory, for receiving data accessed on a storage medium by the storage medium access device, and for providing data to cause presentation of images by the display; and layout data stored in the memory; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch;

the article of manufacture comprising:

a storage medium; and instruction data stored by the storage medium; the instruction data including data units positioned on the storage medium so that the storage medium access device can access the data units and provide the data units to the processor in a sequence; the data units, when in the sequence, indicating instructions the processor can execute; the processor, in executing the instructions:

using the layout data to provide first representation data to the display, the first representation data causing the display to present a first representation of the node-link structure;

receiving a signal from a user; the signal indicating a change from a first display position to a second display position; the first representation including a first feature near the first display position, the first feature representing a first part of the node-link structure; and in response to the signal, automatically providing second representation data to the display, the second representation data causing the display to present a second representation of the node-link structure on the display; the second representation including a second feature representing the first part of the node-link structure, the second feature being presented near the second display position; the second representation being perceptible as a changed continuation of the first representation.

26. A method of operating a first machine that includes:

first memory;

a first connection to a network;

a first processor connected for accessing data stored in the first memory and for establishing connections with other machines over the network through the first connection; and instruction data stored in the first memory; the instruction data indicating instructions that can be executed by a second machine, the second machine including:

second memory;

a second connection to the network;

a second processor connected for accessing data stored in the second memory and for establishing connections with other machines over the network through the second connection; and layout data stored in the memory; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch;

the method comprising:

operating the first processor to establish a connection to the second processor over the network through the first and second connections; and operating the first processor to transfer the instruction data over the network to the second processor so that the second processor can store the instruction data in the second memory and can execute the instructions indicated by the instruction data; the second processor, in executing the instructions indicated by the instruction data:

using the layout data to provide first representation data to the display, the first representation data causing the display to present a first representation of the node-link structure;

receiving a signal from a user; the signal indicating a change from a first display position to a second display position; the first representation including a first feature near the first display position, the first feature representing a first part of the node-link structure; and in response to the signal, automatically providing second representation data to the display, the second representation data causing the display to present a second representation of the node-link structure on the display; the second representation including a second feature representing the first part of the node-link structure, the second feature being presented near the second display position; the second representation being perceptible as a changed continuation of the first representation.

27. A method of operating a machine; the machine including:

memory;

a processor connected for accessing data stored in the memory; and node-link data stored in the memory; the node-link data defining a node-link structure; the node-link structure including nodes and links, each link relating at least two of the nodes;

the method comprising:

operating the processor to use the node-link data to obtain layout data; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch; and operating the processor to use the layout data to perform two or more different mappings; each mapping obtaining mapped data; the mapped data obtained by each mapping indicating positions for a subset of the set of nodes.

28. The method of claim 27 in which the layout space is a discrete approximation of a hyperbolic plane.

29. The method of claim 28 in which the layout data indicate, for each of the set of nodes, first and second coordinates; the first and second coordinates together indicating a position in the hyperbolic plane.

30. The method of claim 27 in which the node-link structure is an acyclic graph.

31. The method of claim 30 in which the node-link structure is a tree.

32. The method of claim 27 in which the branch is an exponentially growing branch.

33. The method of claim 27 in which the branch includes a parent node that is the top level node, the parent node having two or more child nodes at a first lower level; the act of operating the processor to use the node-link data to obtain layout data comprising:

obtaining parent node data indicating, for the parent node, a parent position and a parent wedge in the layout space; the parent wedge having a vertex at the parent position; the parent wedge being a part of the layout space between two rays extending from the vertex; and using the parent node data to obtain child node data for each of the child nodes; each child node's child node data indicating, for the child node, a child position in the layout space; each of the child positions being approximately along an arc that is within the parent wedge, the arc being part of a circle that is centered at the vertex.

34. The method of claim 33 in which the parent wedge has a wedge angle formed by the two rays at the vertex; the wedge angle being less than 360°; each child node's child node data indicating, for the child node, a child wedge; each child node's child wedge having a vertex at the node's child position, the child wedge being a part of the parent wedge between two rays extending from the vertex, the two rays forming an angle approximately equal to the wedge angle at the vertex; the child wedges not overlapping.

35. The method of claim 33 in which the branch includes descendant nodes at lower levels below the first lower level, each descendant node being related to first or second ones of the children nodes through one or more links; more of the descendant nodes at one of the lower levels below the first lower level being related to the first child node than to the second child node so that if the descendant nodes were uniformly spaced, the descendant nodes related to the first child node would occupy a larger angle than the descendant nodes related to the second children node; each child node's child node data indicating, for the child node, a child wedge; each child node's child wedge having a vertex at the node's child position, the child wedge being a part of the parent wedge between two rays extending from the child wedge's vertex, the two rays forming a wedge angle at the child wedge's vertex; the wedge angle of each child node's child wedge depending on the angle that would be occupied by descendant nodes related to the child node, the first child node having a larger wedge angle than the second child node; the child wedges of the child nodes not overlapping.

36. The method of claim 33 in which the parent node of the branch is the root node of a tree; the two rays being identical so that the parent wedge includes all of the space with negative curvature.

37. The method of claim 33 in which adjacent child positions are equally separated along the arc by the base spacing.

38. A machine comprising:

memory;

a display;

a processor connected for accessing data stored in the memory and for providing data to cause presentation of images by the display;

node-link data stored in the memory; the node-link data defining a node-link structure that includes nodes and links, each link relating at least two of the nodes; and program data stored in the memory; the data program indicating instructions the processor executes; the processor, in executing the instructions:

using the node-link data to obtain layout data; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch; and using the layout data to perform two or more different mappings; each mapping obtaining mapped data; the mapped data obtained by each mapping indicating positions for a subset of the set of nodes.

39. An article of manufacture for use in a machine that includes:

memory;

a storage medium access device;

a display;

a processor connected for accessing data stored in the memory, for receiving data accessed on a storage medium by the storage medium access device, and for providing data to cause presentation of images by the display; and node-link data stored in the memory; the node-link data defining a node-link structure that includes nodes and links, each link relating at least two of the nodes;

the article of manufacture comprising:

a storage medium; and instruction data stored by the storage medium; the instruction data including data units positioned on the storage medium so that the storage medium access device can access the data units and provide the data units to the processor in a sequence; the data units, when in the sequence, indicating instructions the processor can execute; the processor, in executing the instructions:

using the node-link data to obtain layout data; the layout data indicating positions in a layout space for parts of a node-link structure; the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch; and using the layout data to perform two or more different mappings; each mapping obtaining mapped data; the mapped data obtained by each mapping indicating positions for a subset of the set of nodes.

40. A method of operating a first machine that includes:

first memory;

a first connection to a network;

a first processor connected for accessing data stored in the first memory and for establishing connections with other machines over the network through the first connection; and instruction data stored in the first memory; the instruction data indicating instructions that can be executed by a second machine, the second machine including:

second memory;

a second connection to the network;

a second processor connected for accessing data stored in the second memory and for establishing connections with other machines over the network through the second connection; and node-link data stored in the second memory; the node-link data defining a node-link structure that includes nodes and links, each link relating at least two of the nodes;

the method comprising:

operating the first processor to establish a connection to the second processor over the network through the first and second connections; and operating the first processor to transfer the instruction data over the network to the second processor so that the second processor can store the instruction data in the second memory and can execute the instructions indicated by the instruction data; the second processor, in executing the instructions indicated by the instruction data:

using the node-link data to obtain layout data; the layout data indicating positions in a layout space for parts of a node-link structure;

the layout space being a space with negative curvature; the node-link structure including nodes and links, each link relating at least two of the nodes; the layout data indicating positions in the layout space for a set of the nodes; the set of nodes forming a branch that includes two or more levels of nodes including a top level and at least one lower level, the top level including a top level node and the lower levels including lower level nodes, each node at each lower level having a parent node at a next higher level to which the node is related through one link; for each of a set of two or more parent nodes, the layout data indicating:

a parent position in the layout space for the parent node; and child positions that lie approximately along a circle in the layout space for a number of lower level nodes that share the parent node, the parent position being approximately at the center of the circle; the number of lower level nodes being two or more; adjacent child positions along the circle being separated by approximately a base spacing;

the circles having radii that, together, approximate a function that increases slowly with number of lower level nodes such that the radii and spacings between adjacent child positions along circles are all approximately uniform within the branch; and using the layout data to perform two or more different mappings; each mapping obtaining mapped data; the mapped data obtained by each mapping indicating positions for a subset of the set of nodes.

\* \* \* \* \*